(12) United States Patent
Ratkovic et al.

(10) Patent No.: US 11,625,293 B1
(45) Date of Patent: Apr. 11, 2023

(54) INTENT DRIVEN ROOT CAUSE ANALYSIS

(71) Applicant: Apstra, Inc., Menlo Park, CA (US)

(72) Inventors: Aleksandar Luka Ratkovic, Palo Alto, CA (US); Chi Fung Michael Chan, Mountain View, CA (US)

(73) Assignee: Apstra, Inc., Menlo Park, CA (US)

( * ) Notice: Subject to any disclaimer, the term of this patent is extended or adjusted under 35 U.S.C. 154(b) by 0 days.

(21) Appl. No.: 17/397,493

(22) Filed: Aug. 9, 2021

Related U.S. Application Data

(63) Continuation of application No. 16/400,936, filed on May 1, 2019, now Pat. No. 11,086,709.

(60) Provisional application No. 62/702,104, filed on Jul. 23, 2018.

(51) Int. Cl.
*G06F 11/00* (2006.01)
*G06F 11/07* (2006.01)

(52) U.S. Cl.
CPC ........ *G06F 11/079* (2013.01); *G06F 11/0709* (2013.01); *G06F 11/0751* (2013.01)

(58) Field of Classification Search
CPC ............... G06F 11/079; G06F 11/0739; G06F 11/3006; G06F 11/30; G06F 11/0709; G06F 11/366
See application file for complete search history.

(56) References Cited

U.S. PATENT DOCUMENTS

| | | | |
|---|---|---|---|
| 6,012,152 A * | 1/2000 | Douik ................ | G06F 11/0709 714/E11.027 |
| 9,807,229 B1 | 10/2017 | Gutierrez, Jr. et al. | |
| 10,063,428 B1 | 8/2018 | Karam et al. | |
| 10,277,461 B1 | 4/2019 | A et al. | |
| 10,313,206 B1 | 6/2019 | Karam et al. | |
| 10,333,776 B2 | 6/2019 | Karam et al. | |
| 10,374,872 B2 | 8/2019 | Ratkovic et al. | |
| 10,389,573 B2 | 8/2019 | Karam et al. | |
| 10,516,761 B1 | 12/2019 | A et al. | |
| 10,558,542 B1 | 2/2020 | A et al. | |
| 10,630,540 B2 | 4/2020 | Karam et al. | |
| 10,698,714 B2 | 6/2020 | Krishnamurthy et al. | |
| 10,756,983 B2 | 8/2020 | Ratkovic et al. | |
| 2011/0185229 A1 | 7/2011 | Lapiotis et al. | |

(Continued)

OTHER PUBLICATIONS

U.S. Appl. No. 16/360,660, filed Mar. 21, 2019, naming inventors Rachamadugu et al.

(Continued)

*Primary Examiner* — Charles Ehne
(74) *Attorney, Agent, or Firm* — Shumaker & Sieffert, P.A.

(57) ABSTRACT

A fault model representation of a computer network is generated, wherein the computer network includes a set of connected computer network elements that was at least in part configured based on a specified declarative intent in forming the computer network. A symptom representation for the computer network is determined based on telemetry data of one or more elements of the set of connected computer network elements and a behavior specification repository identifying symptoms and their associated root causes. The fault model representation and the symptom representation are provided to a root cause analysis to determine one or more root causes of one or more detected symptoms of the computer network.

19 Claims, 41 Drawing Sheets

(56) References Cited

U.S. PATENT DOCUMENTS

| | | | |
|---|---|---|---|
| 2017/0244614 A1* | 8/2017 | Wu | H04L 47/762 |
| 2018/0210927 A1 | 7/2018 | Karam et al. | |
| 2018/0316576 A1 | 11/2018 | Kang et al. | |
| 2019/0165988 A1* | 5/2019 | Wang | H04L 41/0631 |
| 2019/0238423 A1 | 8/2019 | Karam et al. | |
| 2019/0306015 A1 | 10/2019 | Ratkovic et al. | |
| 2019/0319830 A1 | 10/2019 | Karam et al. | |
| 2020/0007495 A1 | 1/2020 | Balamurugan et al. | |
| 2020/0136917 A1 | 4/2020 | Kang et al. | |
| 2020/0213189 A1 | 7/2020 | Karam et al. | |
| 2020/0328949 A1 | 10/2020 | Ratkovic et al. | |

OTHER PUBLICATIONS

U.S. Appl. No. 17/104,804, filed Nov. 25, 2020, naming inventors Hafeez et al.

Bjorklund, "YANG—A Data Modeling Language for the Network Configuration Protocol (NETCONF)," Internet Engineering Task Force (IETF), RFC 6020, Oct. 2010, 174 pp.

Enns et al., "Network Configuration Protocol (NETCONF)," Internet Engineering Task Force (IETF), RFC 6241, Jun. 2011, 114 pp.

Enns, "NETCONF Configuration Protocol," Network Working Group, RFC 4741, Dec. 2006, 96 pp.

Harrington et al., "An Architecture for Describing Simple Network Management Protocol (SNMP) Management Frameworks," Network Working Group, RFC 3411, Dec. 2002, 65 pp.

Prakash et al., "PGA: Using Graphs to Express and Automatically Reconcile Network Policies," SIGCOMM '15 Proceedings of the 2015 ACM Conference on Special Interest Group on Data Communication, Aug. 2015, pp. 29-42, https://doi.org/10.1145/2785956.2787506, 14 pp.

Prosecution History for U.S. Appl. No. 16/400,936, dated Nov. 13, 2020 to May 3, 2021, 27 pp.

\* cited by examiner

```
{
    "elementType": {
        "connection_endpoint": {
            "telemetry": {
                "operational_status": {
                    "telemetry_metadata": {}
                }
            },
            "symptom": {
                "down": {
                    "operational_status": "down"
                }
            }
        },
        "connection": {
            "symptom": {
                "faulty_or_broken_propagation": { "propagatesTo": [
                    "connectsTo connection_endpoint/down"
                ]
                }
            },
            "rootCauseSymptom": {
                "faulty_or_broken_propagation": { "rootCauseName":
                    "faulty_or_broken"
                }
            }
        }
    }
}
```

FIG. 5A

```
node(type="switch")                  ⎤—1860
.out("hostedinterfaces")             ⎤—1862
.node("interface")                   ⎤—1864
.out("link")
.node("link")
.out("interfaces")
.node("interface")
.out("hosted_on")
.node("switch")
```

FIG. 18C

```
node(type="switch", label = "local_device")  ⎤—1880
.out("hostedinterfaces")
.node("interface")
.out("link")
.node("link")
.out("interfaces")
.node("interface")
.out("hosted_on")
.node("switch")
```

FIG. 18D

```
class Schema(schema.Schema):
    nodes = {
        'system': {
            'system_type': schema.Enum(['switch', 'server']),
            'role': schema.Enum(['spine', 'leaf',
                        'l2_server', 'l3_server',
                        'external_router']),
            'hostname': schema.Optional(schema.String()),
            'system_id': schema.Optional(schema.String()),
            'deploy_mode': schema.Optional(schema.Enum(['deploy', 'undeploy',
                                'ready'])),
            'position': schema.Optional(schema.Integer()),
            'logical_device': schema.Optional(schema.String()),
        },
        'redundancy_group': {
        },
        'link': {
            'link_type': schema.Enum(['ethernet', 'aggregate_link']),
            'role': schema.Enum(['spine_leaf', 'leaf_l2_server', 'leaf_l3_server',
                        'leaf_pair_l2_server', 'leaf_pair_l3_server',
                        'leaf_peer_link', 'to_external_router']),
        },
        'interface': {
            'if_type': schema.Enum(['ip', 'loopback', 'ethernet', 'vlan', 'svi',
                        'port_channel', 'mlag_port_channel']),
            'if_name': schema.Optional(schema.String()),
            'mode': schema.Optional(schema.Enum(['trunk', 'access'])),
            'ipv4_addr': schema.Optional(schema.IpAddress()),
            'port_channel_id': schema.Optional(schema.Integer()),
            'mlag_id': schema.Optional(schema.Integer()),
            'protocols': schema.Optional(schema.Enum(['ebgp', 'lacp'])),
        },
        'domain': {
            'domain_type': schema.Enum(['autonomous_system', 'area', 'mlag']),
        },
        'virtual_network': {
            'vn_type': schema.Enum(['vlan', 'vxlan']),
            'vn_id': schema.Integer(),
            'description': schema.Optional(schema.String()),
            'ipv4_subnet': schema.Optional(schema.IpNetworkAddress()),
            'virtual_mac': schema.Optional(schema.MacAddress()),
            'virtual_gateway_ipv4': schema.Optional(schema.IpAddress()),
        },
```

FIG. 19

```
    'vn_instance': {
        'vlan_id': schema.VlanId(),
    },
    'vn_endpoint': {
        'tag_type': schema.Enum(['vlan_tagged', 'untagged']),
    },
} relationships = [
    {
        'source': 'link',
        'type': 'composed_of',
        'target': 'link',
    },
    {
        'source': 'link',
        'type': 'part_of',
        'target': 'link',
    },
    {
        'source': 'system',
        'type': 'hosted_interfaces',
        'target': 'interface',
    },
    {
        'source': 'interface',
        'type': 'hosted_on',
        'target': 'system',
    },
    {
        'source': 'interface',
        'type': 'composed_of',
        'target': 'interface',
    },
    {
        'source': 'interface',
        'type': 'part_of',
        'target': 'interface',
    },
    {
        'source': 'interface',
        'type': 'link',
        'target': 'link',
    },
```

```
{
  'source': 'link',
  'type': 'interfaces',
  'target': 'interface',
},
{
  'source': 'domain',
  'type': 'composed_of_systems',
  'target': 'system',
},
{
  'source': 'system',
  'type': 'part_of_domain',
  'target': 'domain',
},
{
  'source': 'domain',
  'type': 'composed_of_redundancy_group',
  'target': 'redundancy_group',
},
{
  'source': 'redundancy_group',
  'type': 'redundancy_group_domain',
  'target': 'domain',
},
{
  'source': 'domain',
  'type': 'composed_of_interfaces',
  'target': 'interface',
},
{
  'source': 'interface',
  'type': 'part_of_domain',
  'target': 'domain',
},
{
  'source': 'system',
  'type': 'part_of_redundancy_group',
  'target': 'redundancy_group',
},
{
  'source': 'redundancy_group',
  'type': 'composed_of_systems',
  'target': 'system',
},
```

```
{
    'source': 'interface',
    'type': 'hosted_on',
    'target': 'redundancy_group',
},
{
    'source': 'redundancy_group',
    'type': 'hosted_interfaces',
    'target': 'interface',
}, {
    'source': 'virtual_network',
    'type': 'instantiated_by',
    'target': 'vn_instance',
},
{
    'source': 'vn_instance',
    'type': 'instantiates',
    'target': 'virtual_network',
},
{
    'source': 'virtual_network',
    'type': 'member_endpoints',
    'target': 'vn_endpoint',
},
{
    'source': 'vn_endpoint',
    'type': 'member_of',
    'target': 'virtual_network',
},
{
    'source': 'system',
    'type': 'hosted_vn_endpoint',
    'target': 'vn_endpoint',
},
```
— 1924

FIG. 19 (Cont)

```
@rule(match(
    node('domain', name='domain', domain_type='autonomous_system')    ⎤―2150
    .where(lambda domain: domain.domain_id)
    .out('composed_of_systems')    ⎤―2151
    .node('system', name='device')    ⎤―2152
    .where(lambda device: device.system_id)
    .out('hosted_interfaces')
    .node('interface', name='loopback', if_type='loopback')
    .where(lambda loopback: loopback.ipv4_addr),
    node(name='device')    ⎤―2153
    .out('hosted_interfaces')
    .node('interface', name='interface')
    .out('link')
    .node('link', name='link')
    .out('interfaces')
    .node('interface', name='remote_interface')
    .where(lambda interface, remote_interface: interface != remote_interface and
        interface.ipv4_addr)
    .out('hosted_on')
    .node('system', name='remote_device', role='external_router')
    .out('part_of_domain')
    .node('domain', name='remote_domain', domain_type='autonomous_system')
    .where(lambda remote_domain: remote_domain.domain_id),
    node(name='remote_device')
    .out('hosted_interfaces')
    .node('interface', name='remote_loopback', if_type='loopback')
    .where(lambda remote_loopback: remote_loopback.ipv4_addr)
))
```

```
def render_loopback_peering(self, path, action):
    def expect_bgp(path):
        expect = {
            'role': path['device'].role,
            'identity': {
                'source_ip': path['loopback'].ipv4_addr,
                'source_asn': path['domain'].domain_id,
                'dest_ip': path['remote_loopback'].ipv4_addr,
                'dest_asn': path['remote_domain'].domain_id
            },
            'expected': {
                'value': 'up'
            },
        }
        return expect
    if action in ['added', 'updated'] and self.should_render(path):
        self.expectation_store.add(path['device'].system_id,
                    'bgp',
                    self.expect_id(path),
                    expect_bgp(path))
    elif path['device'].system_id:
        self.expectation_store.remove(path['device'].system_id,
                    'bgp',
                    self.expect_id(path))
```

```
class InterfaceRenderer(ExpectationRenderingPlugin):
    OMITTED_NODE_ROLES = ['external_router', 'leaf_pair']
    UNMANAGED_NODE_ROLES = ['external_router', 'l2_server']

def render_interface(self, role, intf, state):
        return {
            'role': role,
            'identity': {
                'interface_name': intf,
            },
            'expected': {
                'value': state,
            }
        } def should_render_path(self, path):
        device = path['device']
        if device.role in self.OMITTED_NODE_ROLES:
            return False if device.deploy_mode == 'undeploy':
            return False link = path['link']
        # Exclude aggregate interface in pre-deploy state
        if link.link_type == 'aggregate_link' and device.deploy_mode != 'deploy':
            return False

# Always include interfaces facing unmanaged nodes
        remote_device = path['remote_device']
        if remote_device.role in self.UNMANAGED_NODE_ROLES:
            return True

# Exclude interfaces facing undeployed managed nodes
        if not remote_device.system_id or remote_device.deploy_mode == 'undeploy':
            return False return True
```

FIG. 22B

```
@rule(match(
    node('system', name='device').where(lambda device: device.system_id)    ⎫—2250
    .out('hosted_interfaces')    ⎤—2252                                     ⎪
    .node('interface', name='interface')⎤—2254                              ⎪
    .out('link')                                                            ⎪
    .node('link', name='link')                                              ⎬—2220
    .out('interfaces')                                                      ⎪
    .node('interface', name='remote_interface')                             ⎪
    .where(lambda interface, remote_interface: interface != remote_interface)⎪
    .out('hosted_on')                                                       ⎪
    .node('system', name='remote_device')))                                 ⎭
def render_interfaces(self, path, action):
    id = (path['device'].system_id, 'interface', path['interface'].if_name)
    if action in ['added', 'updated'] and self.should_render_path(path):
        self.expectation_store.add(
            *id,
            element_data=self.render_interface(
                path['link'].role,
                path['interface'].if_name,                                  ⎬—2256
                'up'
            )
        )
    else:
        self.expectation_store.remove(*id)
```

FIG. 22B
(Cont)

INTENT DRIVEN ROOT CAUSE ANALYSIS

CROSS REFERENCE TO OTHER APPLICATIONS

This application is a continuation of U.S. patent application Ser. No. 16/400,936, filed 1 May 2019, which claims the benefit of U.S. Provisional Patent Application No. 62/702,104, filed 23 Jul. 2018, the entire content of each application is incorporated herein by reference.

BACKGROUND OF THE INVENTION

Ensuring that a computer network is operating correctly and efficiently typically requires addressing and solving problems associated with the computer network as they arise. One may address the initially observable faults or symptoms but unless a root cause is identified and addressed, symptoms will likely re-occur. Root causes are not always directly observable, but are rather deduced from symptoms.

BRIEF DESCRIPTION OF THE DRAWINGS

Various embodiments of the invention are disclosed in the following detailed description and the accompanying drawings.

FIGS. 5A-5B illustrate examples of behavior specifications.

FIG. 18C is an example of a triggering pattern.

FIG. 18D is an example of a triggering pattern.

FIG. 21B shows an example of an implementation of an agent.

FIG. 22B shows an example of an implementation of an agent.

DETAILED DESCRIPTION

Figure 1:
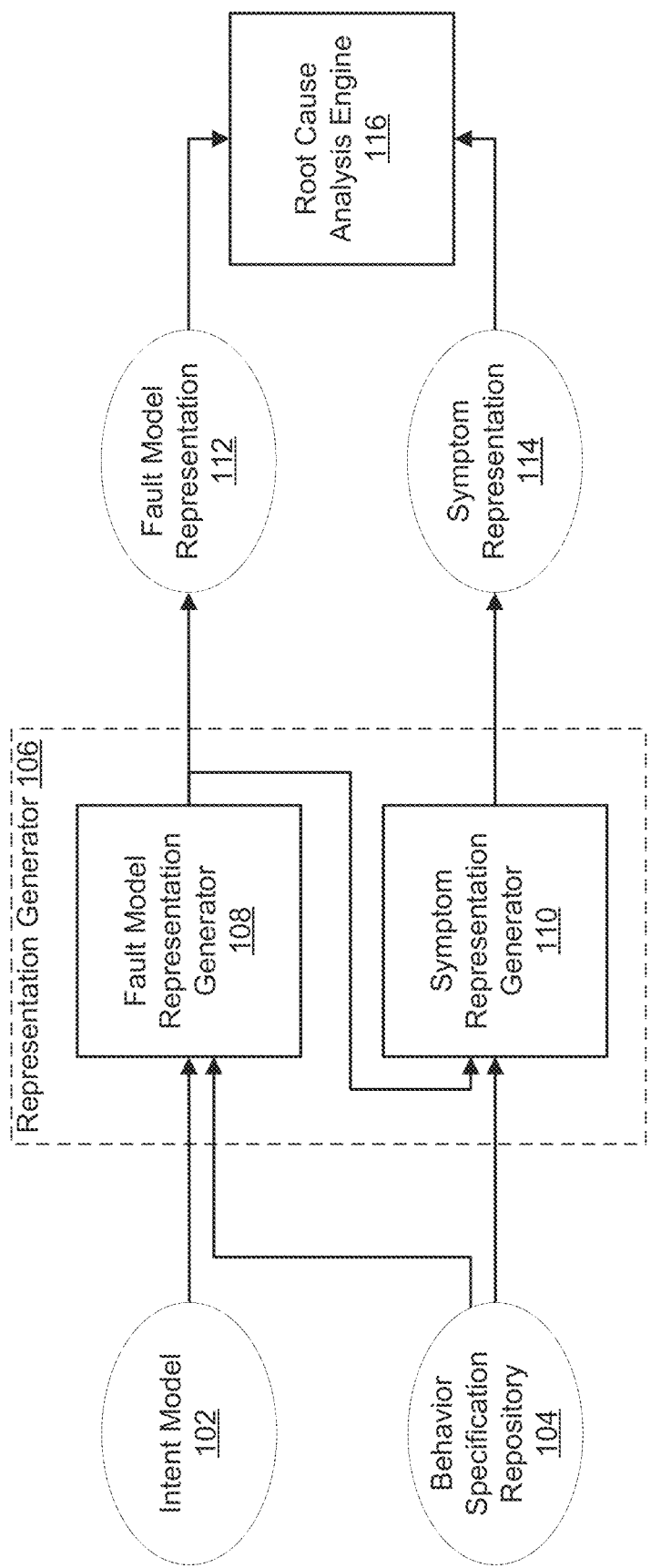
FIG. 1 is a block diagram illustrating an embodiment of components for providing fault and symptom representations of a computer network to a root cause analysis.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Collecting, organizing, and analyzing data about a computer network to be able to apply root cause analysis is a resource-intensive process that often cannot be performed manually. There may exist vast amounts of data associated with the computer network and its elements. Symptoms may appear in elements not directly tied to the root cause. The computer network may change over time.

Computer networks, which may also be referred to herein as networks, computing infrastructure, infrastructure, etc., (e.g., those associated with enterprise data center infrastructures) are becoming increasingly complex and the need for management tools to efficiently address and remedy faults and problems (also referred to as symptoms) associated with computer networks is of paramount importance. Root cause analysis (RCA) can be applied to identify root causes of symptoms associated with computer networks. Due to diverse computer network topologies, ever more complex computer networks, and ever more inter-connected computer networks, modeling computer networks and collecting associated symptom-related data in order to apply RCA is challenging. Furthermore, symptoms may be dynamic and frequently appear in elements related to the element having a root cause problem. In these situations, symptoms have "propagated" to these related elements. These propagated symptoms in turn can cause new sets of "propagated" symptoms. As a consequence, a single root cause may cause a large set of symptoms to appear. This, coupled with the fact that these symptoms, while they can be treated on their own, will likely re-occur if root cause is not identified and fixed makes RCA a very important aspect of systems management.

Presentation of fault and symptom representations of a computer network to a root cause analysis is disclosed. The disclosed method comprises generating a fault model representation of the computer network, wherein the computer network includes a set of connected computer network elements that was at least in part configured based on a specified declarative intent (which may also be referred to herein as declarative requirements, declarative specifications, intent, declarative network requirements, desired network requirements, declarative input requirements, declarative instructions, etc.) in forming the computer network, determining a symptom representation for the computer network based on telemetry data of one or more of the connected network elements and a behavior specification repository identifying faults and their propagation for root causes, and providing the symptom representation and the fault model representation to a root cause analysis to determine one or more root causes of one or more detected faults of the computer network. A system comprising a processor configured to execute the method and a memory configured to provide the processor with instructions is disclosed.

In some embodiments, the fault model representation of the computer network is derived from a graph representation (which may also be referred to herein as a graph model, model, graph, graph representation data model, graphical representation, etc.) of an intent model of the computer network. The graph representation may include computer network elements such as nodes and edges. Based on received declarative requirements for a desired computer network configuration, a graph representation of the desired computer network configuration may be generated and utilized to trigger and build the configuration of the desired computer network. In various embodiments, the fault model representation incorporates behavior specifications from a behavior specification repository. The behavior specification repository may use a domain specific language (DSL) to provide definitions associated with computer network elements, including root causes and symptoms that may occur with respect to the computer network elements as well as relationships with other elements in the computer network, symptom propagation specifications from one element to another according to relationships between elements, and symptom definitions based on observable metrics (e.g., how a metric is analyzed and how existence of a symptom is determined based on the metric).

In various embodiments, the symptom representation is generated based on collected data of potential symptoms of the computer network (which may also be referred to herein as symptom data, telemetry data, etc.) associated with computing elements specified in the behavior specification repository. In various embodiments, the symptom representation incorporates intent that is captured in the fault model representation. For example, because the computer network is composed and configured in a specific manner in order to deliver useful functionality (service), intent can include a totality of declarative specifications governing how to compose the heterogenous computer network in order to deliver services. Consequently, elements in the computer network may fail or their metrics may meet certain thresholds (root cause), which may cause symptoms in other elements as well as symptoms in services (loss or poor quality of service). In some embodiments, in addition to raw data representing observed metric values, there is metadata including but not limited to semantics (e.g., packet loss and delay), type of metric (e.g., average, minimum, and maximum), timestamp, as well as identity of an element. For these reasons, the symptom representation may be referred to as a "context rich" symptom representation. In some embodiments, the fault model representation and the symptom representation are automatically generated based on a graph representation of the computer network and the behavior specification repository.

The fault model representation and the symptom representation are provided to a root cause analysis to determine one or more root causes of one or more detected symptoms of the computer network. In various embodiments, the root cause analysis is performed by a root cause analysis engine that acts as a matching engine that performs algorithmic matching (between elements of the fault model representation and the symptom representation) to calculate potential root causes. In various embodiments, any of various different root cause analysis engines provided by different vendors can be utilized.

FIG. 1 is a block diagram illustrating an embodiment of components for providing fault and symptom representations of a computer network to a root cause analysis. In some embodiments, representation generator 106 and/or root cause analysis engine 116 is executed in management server 902 of FIG. 9. In the example shown, intent model 102 and behavior specification repository 104 are inputs to representation generator 106. Representation generator 106 includes fault model representation generator 108 and symptom representation generator 110. In the example illustrated, fault model representation generator 108 receives as input intent model 102 and behavior specification repository 104 in order to generate fault model representation 112. Symptom representation generator 110 receives as input behavior specification repository 104 and the output of fault model representation generator 108 in order to generate symptom representation 114. In the example shown, fault model representation 112 and symptom representation 114 are provided to root cause analysis engine 116.

In the example illustrated in FIG. 1, intent model 102 is an input from which, at least in part, fault model representation 112 is generated. Examples of intent model 102 include any hardware and/or software system, component, process, application, computer code, and/or data object. In some embodiments, intent model 102 is represented as one or more data objects specified in JavaScript Object Notation (JSON) (see FIG. 4A and the associated description for further details). In some embodiments, intent model 102 is a graph representation data model (e.g., with nodes and edges) that is utilized along with a management tool to configure and set operational state expectations for a computing infrastructure. As follows, graph model, graph representation, and graph may be used interchangeably to refer to a graph representation data model. The graph representation allows modeling richness with a small set of foundational constructs—nodes and edge relations. The management tool utilizing the graph representation is a deeply extensible and effective way to curtail complexity in modeling, allowing creation of domain specific data models for representing specific network designs/topologies.

With respect to a graph model, system resources may be configured to enable a desired computer network configuration. In some embodiments, expectations that an operational state must satisfy are calculated. In some embodiments, at least a portion of the computing infrastructure is represented as a graph representation of computing infrastructure elements, including computing infrastructure nodes and computing infrastructure edges. For example, based on received declarative requirements of a desired network configuration, a graph representation of computing infrastructure elements of the desired network configuration may be generated and utilized to trigger and build the configuration of the desired network. Examples of components that a node may represent include a server, a switch, a network interface, a virtual network, virtual network endpoints, a rule, a policy, etc. with associated properties. Edges represent connections between the nodes and their associated properties. By using the graph representation, the configuration and structure of computing infrastructure elements can be organized into discrete objects and associated connections that allow easy detection of any changes and relationships affected by the changes.

The graph representation may change as the requirements change and properties associated with graph representation elements are updated. In some embodiments, a change in the graph representation is detected and it is determined whether the change affects a triggering graph representation pattern. For example, processing agents that perform processing may each be associated with one or more triggering patterns that trigger processing of the associated agent. In the event the detected change affects the triggering pattern of a processing agent, the change may be reported to the agent associated with the triggering pattern. For example, rather than utilizing a single pipelined process to configure and implement an entire set of declarative requirements, many different agents that perform a different assigned portion of the configuration and implementation may be utilized in combination. By dividing the processing into portions handled by various different agents, changes to the declarative requirements may be implemented by only invoking the specific agents related to the implementing change rather than exciting an entire monolithic pipelined process to implement a minor change. In some embodiments, each agent is associated with a triggering pattern that identifies a portion of the graph representation of interest that will trigger processing of the agent. If the graph representation includes at least a portion that matches a triggering pattern of an agent (e.g., a change to declarative requirements changes the graph representation portion that matches the triggering pattern specified for an agent), a processing function of the matched agent may be invoked to allow the processing function to perform processing associated with the matched graph representation portion. FIGS. 4 and 9-24 and the descriptions associated therewith describe generation of graph representations in more detail. FIGS. 9-24 also describe in further detail how graph models are used to configure, monitor, and analyze computer networks (e.g., via agents, triggering patterns, and callback functions).

Figure 5B:
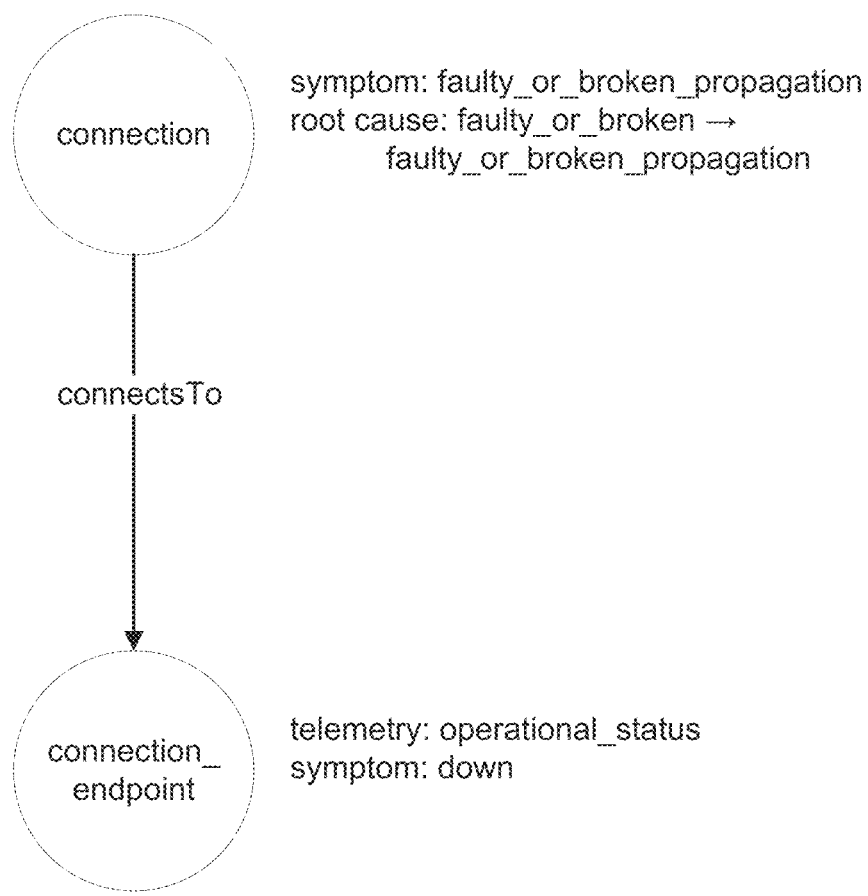

In the example illustrated in FIG. 1, behavior specification repository 104 is an input to fault model representation generator 108 and symptom representation generator 110. Examples of intent model 102 include any hardware and/or software system, component, process, application, computer code, and/or data object. In some embodiments, behavior specification repository 104 is represented as one or more data objects specified in a domain specific language (see FIG. 5A for examples of behavior specifications specified in JSON). In various embodiments, behavior specification repository 104 uses a domain specific language to provide definitions associated with computer network elements, including root causes and symptoms that may occur with respect to the computer network elements as well as relationships with other elements in the computer network, symptom propagation specifications from one element to another according to relationships between elements, and symptom definitions based on observable metrics (e.g., how a metric is analyzed and how existence of a symptom is determined based on the metric). For example, FIG. 5B illustrates relationship, symptom, root cause, etc. definitions with respect to the elements specified in FIG. 5A.

In the example illustrated in FIG. 1, fault model representation generator 108 generates fault model representation 112. Examples of fault model representation generator 108 include any hardware and/or software system, component, process, and/or application. In various embodiments, the output of fault model representation generator 108 is fault model representation 112. In some embodiments, fault model representation 112 is a transformation of intent model 102 into a model that is expressed in terms of elements of behavior specification repository 104. For this reason, in the example illustrated in FIG. 1, both intent model 102 and behavior specification repository 104 are inputs to fault model representation generator 108. Stated alternatively, in some embodiments, fault model representation 112 is an instantiation of behavior specification repository 104 for a specific intent with respect to a computer network configuration as specified by intent model 102. Examples of fault model representation 112 include any hardware and/or software system, component, process, application, computer code, and/or data object. In some embodiments, fault model representation 112 is represented in the same format as intent model 102 and/or behavior specification repository 104. FIG. 6 illustrate examples of portions of fault model representations generated from intent models.

In the example illustrated in FIG. 1, symptom representation generator 110 generates symptom representation 114. Examples of symptom representation generator 110 include any hardware and/or software system, component, process, and/or application. In various embodiments, the output of symptom representation generator 110 is symptom representation 114. In some embodiments, symptom representation 114 is a collection of symptoms, whose definitions can be found in behavior specification repository 104, associated with a network represented by fault model representation 112. For this reason, in the example illustrated in FIG. 1, both behavior specification repository 104 and fault model representation 112 are inputs to symptom representation generator 110. Fault model representation 112 provides symptom representation generator 110 with declarative requirements of a desired computer network configuration so that symptom representation generator 110 can determine which computer network elements need to be monitored for symptoms.

Figure 9:
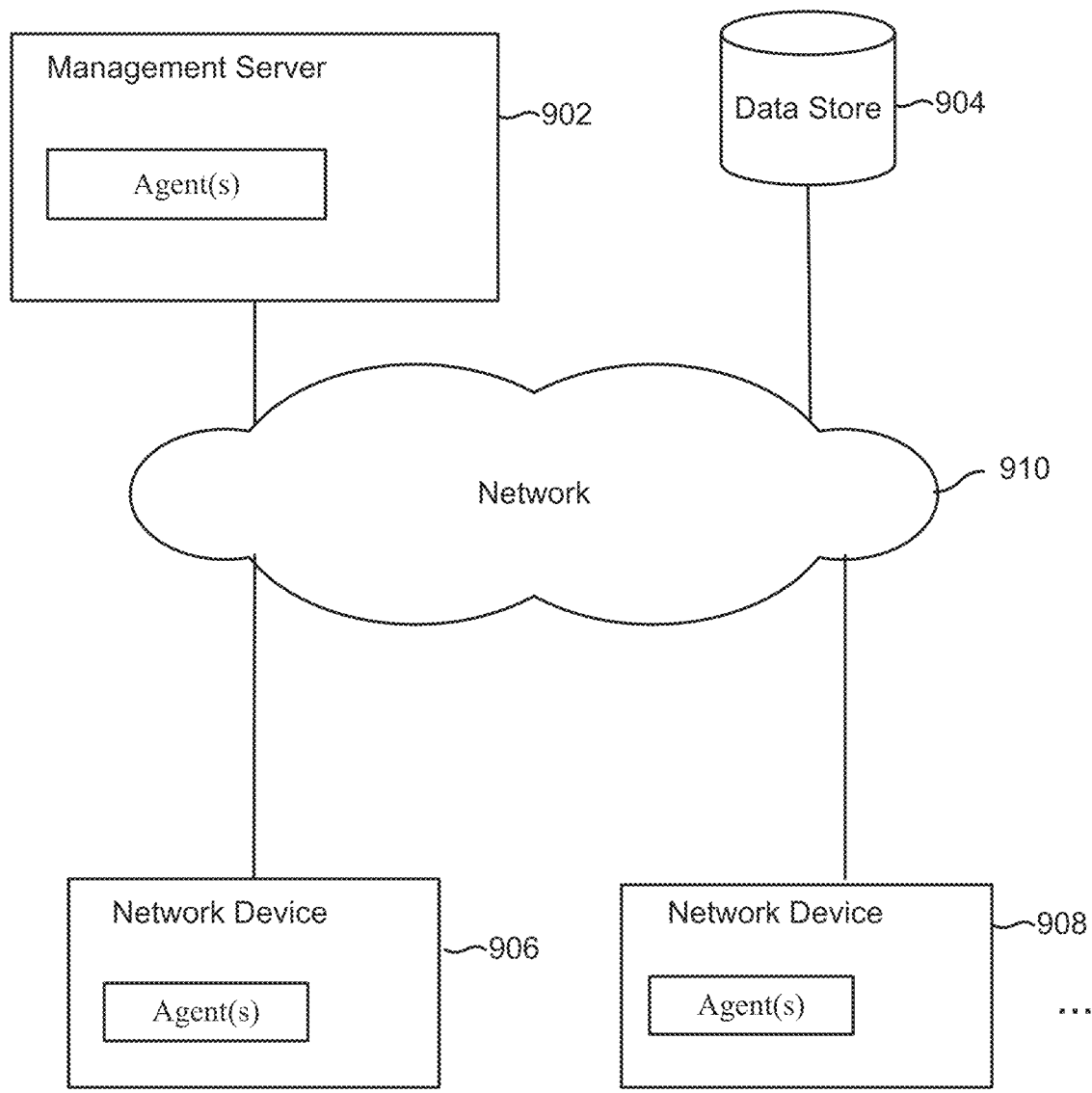
FIG. 9 is a diagram illustrating an embodiment of a network management environment.

In the example shown, such declarative requirements are passed to symptom representation generator 110 in the form of fault model representation 112, but it would also be possible to pass intent model 102 to symptom representation generator 110. Without any information regarding the computer network for which RCA is to be performed, it would not be feasible to generate an appropriate symptom representation. Stated alternatively, in some embodiments, symptom representation 114 is an instantiation of a collection of telemetry data on elements of a computer network that need to be monitored for the presence of symptoms. FIGS. 9-24 provide further details regarding telemetry for intent driven computer networks. For example, telemetry data of network device 906 of FIG. 9 is collected by an agent within network device 906 and provided to management server 902 of FIG. 9 for use in root cause analysis.

Examples of declarative requirements include operational status requirements (e.g., a connection between two specified elements in the computer network is maintained or elements specified in the computer network are up and running). Thus, these computer network elements would need to be monitored (telemetry would need to be acquired) for the presence of operational status symptoms (e.g., no connectivity or no functionality). As described in further detail herein (e.g., see FIG. 8), declarative requirements may also be broader. Complex symptoms may require temporal and/or spatial telemetry aggregation. Declarative requirements may include performance and/or service requirements (e.g., maintaining intended levels of service, resource utilization, response time, etc.). For these types of declarative requirements, the presence or absence of symptoms is especially dependent on declarative intent in the sense that it would be difficult to determine such symptoms by just interpreting basic connectivity data collected on an element-by-element basis (e.g., whether each element is up and running and connected to other specified elements). Examples of symptom representation 114 include any hardware and/or software system, component, process, application, computer code, and/or data object. In some embodiments, symptom representation 114 is represented in the same format as intent model 102 and/or behavior specification repository 104.

In the example illustrated in FIG. 1, root cause analysis engine 116 receives as inputs fault model representation 112 and symptom representation 114. In various embodiments, root cause analysis engine 116 determines one or more root causes of one or more detected faults of a computer network with fault model representation 112 based on symptom representation 114. Examples of root cause analysis engine 116 include any hardware and/or software system, component, process, and/or application. In various embodiments, root cause analysis engine 116 is a matching engine that performs algorithmic matching between elements of fault model representation 112 and symptom representation 114 to calculate potential root causes. In various embodiments, any of various different root cause analysis engines provided by different vendors can be utilized as root cause analysis engine 116. In some embodiments, fault model representation 112 and/or symptom representation 114 are processed (e.g., compiled and/or converted) into a format suitable for root cause analysis engine 116 prior to RCA being performed. In some embodiments, root cause analysis engine 116 creates a table in which each row contains a root cause and a plurality of symptoms associated with a type of fault that may occur in the computer network being monitored. The root causes and the symptoms in this table may be derived from fault model representation 112. In some embodiments, flags are associated with each of the symptoms in each of the rows of the table so that each of the symptoms in each of the rows can be marked as either present or not present. Collected symptom data in symptom representation 114 may be used to mark the flags associated with symptoms in the table. In some embodiments, each row in the table is analyzed to determine which root causes are associated with a sufficient subset of symptoms that are present such that it is determined that the root cause(s) exist. For example, in a row, if a threshold portion of all symptoms in the row are detected (e.g., a specified percentage of the symptoms in the row), then it may be determined that the root cause in the row exists. Formulas including weights assigned to specified symptoms may also be used.

In the example illustrated in FIG. 1, portions of the communication path between the components are shown. Other communication paths may exist, and the example of FIG. 1 has been simplified to illustrate the example clearly. Although single instances of components have been shown to simplify the diagram, additional instances of any of the components shown in FIG. 1 may exist. The number of components and the connections shown in FIG. 1 are merely illustrative. Components not shown in FIG. 1 may also exist.

Figure 2:
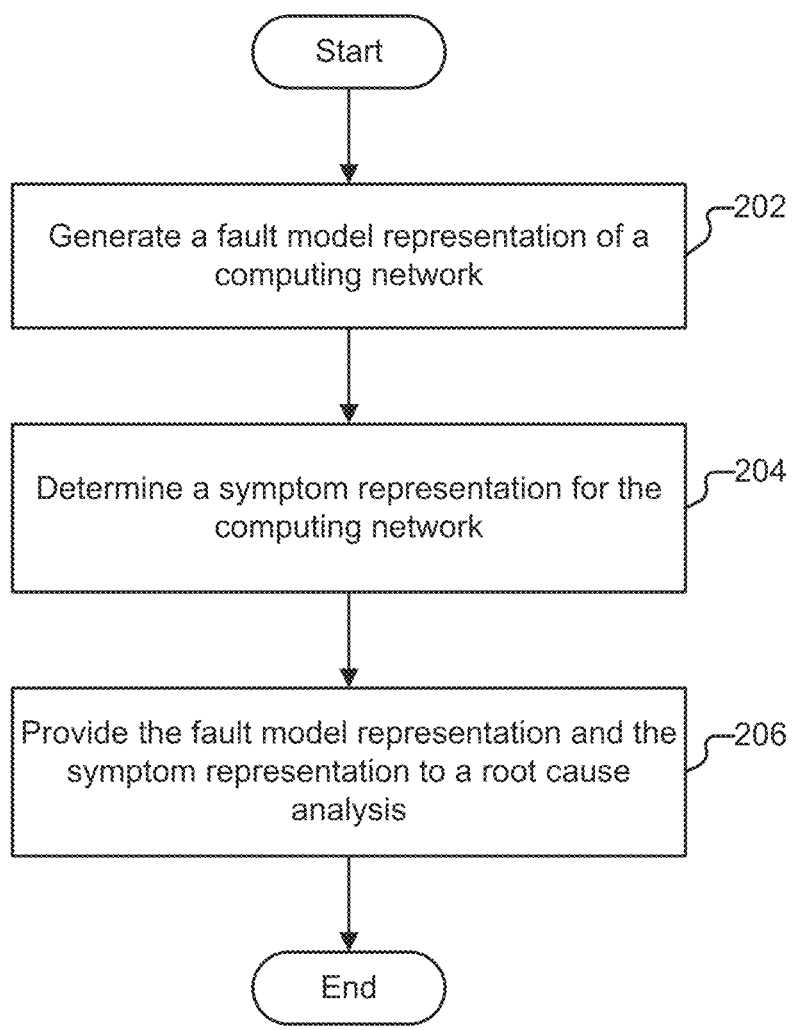
FIG. 2 is a flow chart illustrating an embodiment of a process for providing fault and symptom representations of a computer network to a root cause analysis.

FIG. 2 is a flow chart illustrating an embodiment of a process for providing fault and symptom representations of a computer network to a root cause analysis. In some embodiments, this process is performed at least in part by representation generator 106 of FIG. 1.

At 202, a fault model representation of a computer network is generated. In some embodiments, the fault model representation generated is fault model representation 112 of FIG. 1 generated by fault model representation generator 108 of FIG. 1. In various embodiments, the computer network includes a set of connected computer network elements that was at least in part configured based on a specified declarative intent in forming the computer network. In some embodiments, the set of connected computer network elements and specified declarative intent associated with the computer network are represented by intent model 102 of FIG. 1. Intent model 102 may be a graph representation that uses nodes and edges to represent computer network components, relationships between the components, policies, and so forth associated with the computer network. Furthermore, intent model 102 may include performance and/or service-related specified declarative intent. Examples of these types of specified declarative intent include maintaining a specified level of service, maintaining bandwidth utilization at a specified level, running the computer network at a specified oversubscription ratio, maintaining throughput at a specified level, etc. It may also be specified that different performance levels are expected to be maintained for different classes of network computing services running on the computer network. The fault model representation may be expressed in terms of elements of behavior specification repository 104 of FIG. 1.

At 204, a symptom representation for the computer network is determined. In some embodiments, the determined symptom representation is symptom representation 110 of FIG. 1 generated by symptom representation generator 110 of FIG. 1. In various embodiments, the symptom representation is determined based on telemetry data of one or more of the connected network elements and a behavior specification repository identifying faults and their propagation for root causes. In various embodiments, what telemetry data is required (e.g., how the connected network elements should be monitored) is based at least in part on specified declarative intent for the computer network. For example, an intent model may specify intended network elements and connections between them, thereby indicating that at least some of these network elements and connections should be monitored for connectivity and functionality. In addition, specified declarative intent represented in the intent model may indicate that aggregate measurements be made (e.g., averages, minimums, and maximums of measurements with respect to network elements and connections, such as average utilization) or that different levels of telemetry be collected for different network elements (e.g., collect more telemetry for network elements supporting what are specified as more important network services and less or no telemetry for network elements supporting what are specified as less important network services). The symptom representation may be expressed in terms of elements of behavior specification repository 104 of FIG. 1.

At 206, the fault model representation and the symptom representation are provided to a root cause analysis. In some embodiments, the fault model representation and the symptom representation are provided to root cause analysis engine 116 of FIG. 1. In various embodiments, the root cause analysis determines one or more root causes of one or more detected faults of the computer network. In some embodiments, the root cause analysis performs algorithmic matching to associate one or more root causes in the fault model representation with collected symptom data in the symptom representation.

Figure 3:
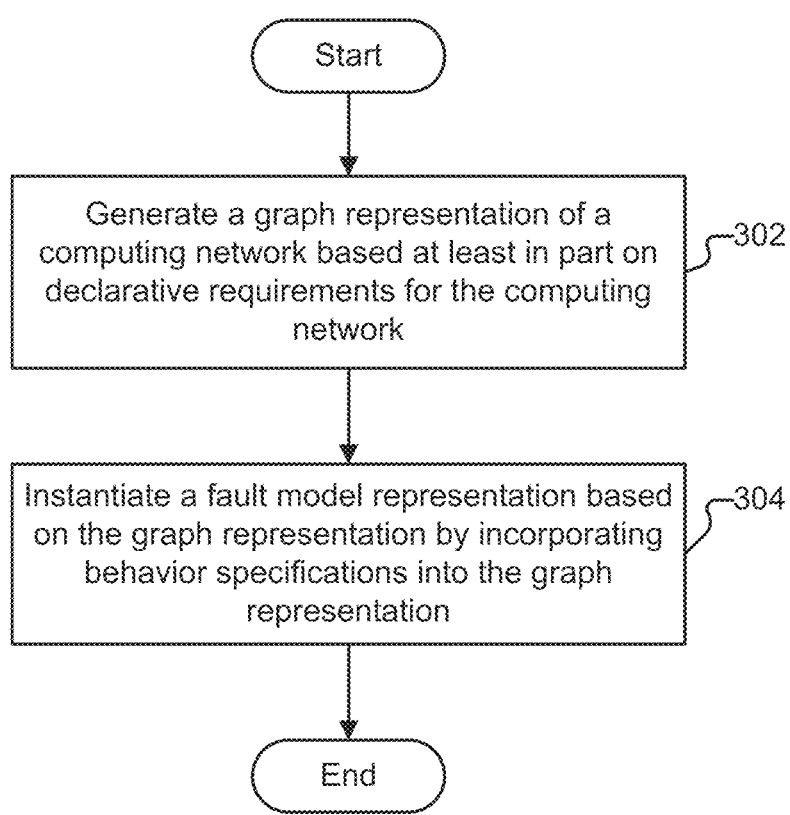
FIG. 3 is a flow chart illustrating an embodiment of a process for generating a fault model representation.

FIG. 3 is a flow chart illustrating an embodiment of a process for generating a fault model representation. In some embodiments, the process of FIG. 3 is performed by fault model representation generator 108 of FIG. 1. In some embodiments, at least a portion of the process of FIG. 3 is performed in 202 of FIG. 2.

At 302, a graph representation of a computer network is generated based at least in part on declarative requirements for the computer network. Examples of declarative requirements include computer network topology (e.g., which elements are intended to be present in the computer network and how they are connected to each other), types of devices (e.g., based on manufacturer) to be used in the computer network, operational status requirements (e.g., a connection between two specified elements in the computer network is maintained or elements specified in the computer network are up and running), and performance and/or service requirements (e.g., maintaining intended levels of service, resource utilization, response time, etc.). In some embodiments, the declarative requirements for the computer network are incorporated into an intent model (e.g., intent model 102 of FIG. 1). In some embodiments, the graph representation includes nodes representing network elements (e.g., server, switch, interface, rule, policy, etc.) and relationships between nodes. In some embodiments, an intent model is transformed into the graph representation. For example, nodes of an intent model may be transformed into nodes of the graph representation, and edges of the intent model may be transformed into relationships in the graph representation. A detailed description of nodes and edges in an intent model is given below (e.g., see FIGS. 9-24, and in particular FIG. 17). In some embodiments, when the intent model and graph representation are similar in structure, minimal (if any) processing is needed to transform the intent model into the graph representation.

Figure 4A:
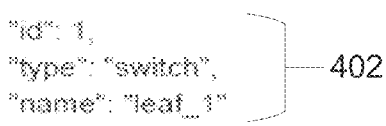
FIGS. 4A-4C are specifications illustrating examples of graph representations.
Figure 4B:
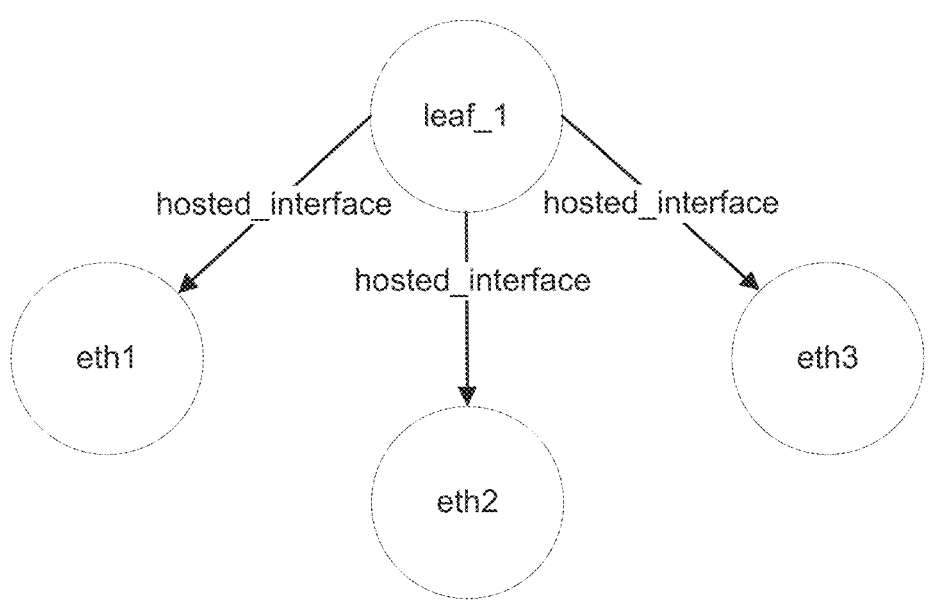

FIG. 4A shows an example specification specifying nodes and relationships of a graph representation (e.g., FIG. 4A specifies a portion of a computer network). The specification of FIG. 4A is in JSON format. Specifying a graph representation in alternative formats is also possible. In various embodiments, nodes have unique ids, have specific types, and have properties. Portion 402 of FIG. 4A is a representation of a node representing a switch in which an "id" field specifies a unique identifier of the node, a "type" field specifies a node type, and "name" specifies a name, which can be a mandatory property. In various embodiments, relationships are parametrized by ids of source and target nodes, id, type, and optional properties. The JSON snippet shown in FIG. 4A is a graph representation that indicates that a switch named "leaf_1" hosts three ethernet interfaces: eth1, eth2 and eth3. In various embodiments, ethernet interfaces may include any hardware and/or software interfaces between two pieces of ethernet equipment or protocol layers in a computer network. In the example shown, the relationship type "hosted_interface" relates the switch named "leaf_1" (source node) to the three interfaces hosted on it (target nodes). FIG. 4B shows the corresponding diagram of the graph representation specified by the JSON snippet shown in FIG. 4A. In FIG. 4B, each node is shown as a circle with its name inside the circle, nodes are connected to each other by lines, and relationships are shown along the lines connecting nodes.

Figure 4C:
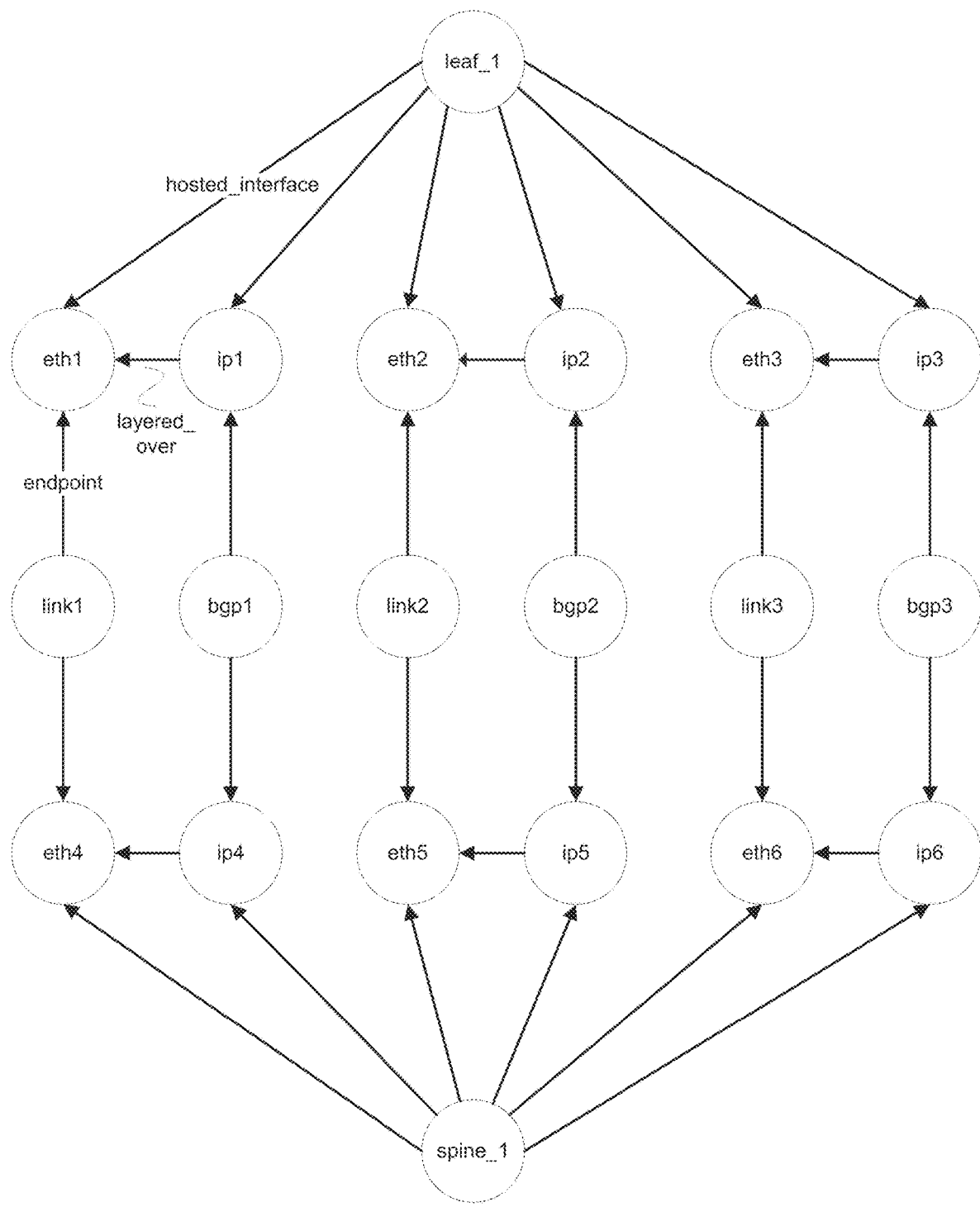

FIG. 4C shows another example of a graph representation (in pictorial diagram form). The diagram in FIG. 4C includes two switches, "leaf_1" and "spine_1." In the example shown, "leaf_1" may be a lower-tier switch in the leaf layer of a spine-and-leaf network topology, and "spine_1" may be a backbone switch in the spine layer interconnecting leaf switches. As shown in FIG. 4C, the two switches are connected via links (link1, link2, and link3 in FIG. 4C) that exist between ethernet interfaces (eth1, eth2, eth3, eth4, eth5, and eth6). The links (link1, link2, and link3) may include data link (e.g., ethernet protocol) and/or physical (e.g., physical wiring) layers. In the example shown, the two switches are also connected via border gateway protocol (BGP) sessions (bgp1, bgp2, and bgp3 in FIG. 4C) that exist between internet protocol (IP) interfaces (ip1, ip2, ip3, ip4, ip5, and ip6 in FIG. 5C). In FIG. 4C, as is the case with FIG. 4B, the relationships between nodes are shown along the lines connecting them. For clarity of illustration, a few representative relationships are labeled in FIG. 4C. In the example shown, the relationship between switches and interfaces is that of "hosted_interface" (e.g., between leaf land eth1); the relationship between interfaces and connections is that of "endpoint" (e.g., between link1 and eth1), and the relationship between interfaces is that of "layered_over" (e.g., between eth1 and ip1).

Returning to FIG. 3, at 304, a fault model representation based on the graph representation is instantiated by incorporating behavior specifications into the graph representation. In some embodiments, behavior specifications are supplied by behavior specification repository 104 of FIG. 1. An example behavior specification is as follows: suppose what is desired is modeling a generic behavior such that when a bi-directional connection "c" between two connection endpoints, "a" and "b", is broken (root cause), the problem will propagate, and both elements will experience symptoms (e.g., inability to reach each other and "operational status" is down). In this example, a behavior specification could be that if both symptoms ("a" cannot reach "b" AND "b" cannot reach "a") are present, then the likely root cause is "c" is faulty. If only one of the symptoms is present (e.g., "a" cannot reach "b", but "b" can reach "a"), then there is likely a different root cause. FIG. 5A shows a JSON specification of the behavior specification described above, and FIG. 5B shows the corresponding pictorial diagram of the behavior specification shown in FIG. 5A. In some embodiments, behavior specifications are specified in a domain specific language (e.g., JSON).

Symptoms can also propagate. If two interfaces are down, then more symptoms can appear elsewhere (e.g., hundreds of symptoms due to propagation). A faulty connection, as described above, can cause interface to not be able to communicate, which can cause other connections associated with the interfaces to not function, which can cause additional routing symptoms. It is also possible to have more than one root cause at a time causing overlapping sets of symptoms. In some embodiments, behavior specifications are associated with computer network elements. Computer network elements may be classified by type (e.g., switch and interface as shown in FIG. 4A) and other properties (e.g., manufacturer). In some embodiments, a hardware compatibility list specifies manufacturer specific components whose behaviors have been catalogued (e.g., in behavior specification repository 104 of FIG. 1). Behavior specifications may exist for various elements, for which lists of root cause/symptoms pairings are stored.

Figure 6A:
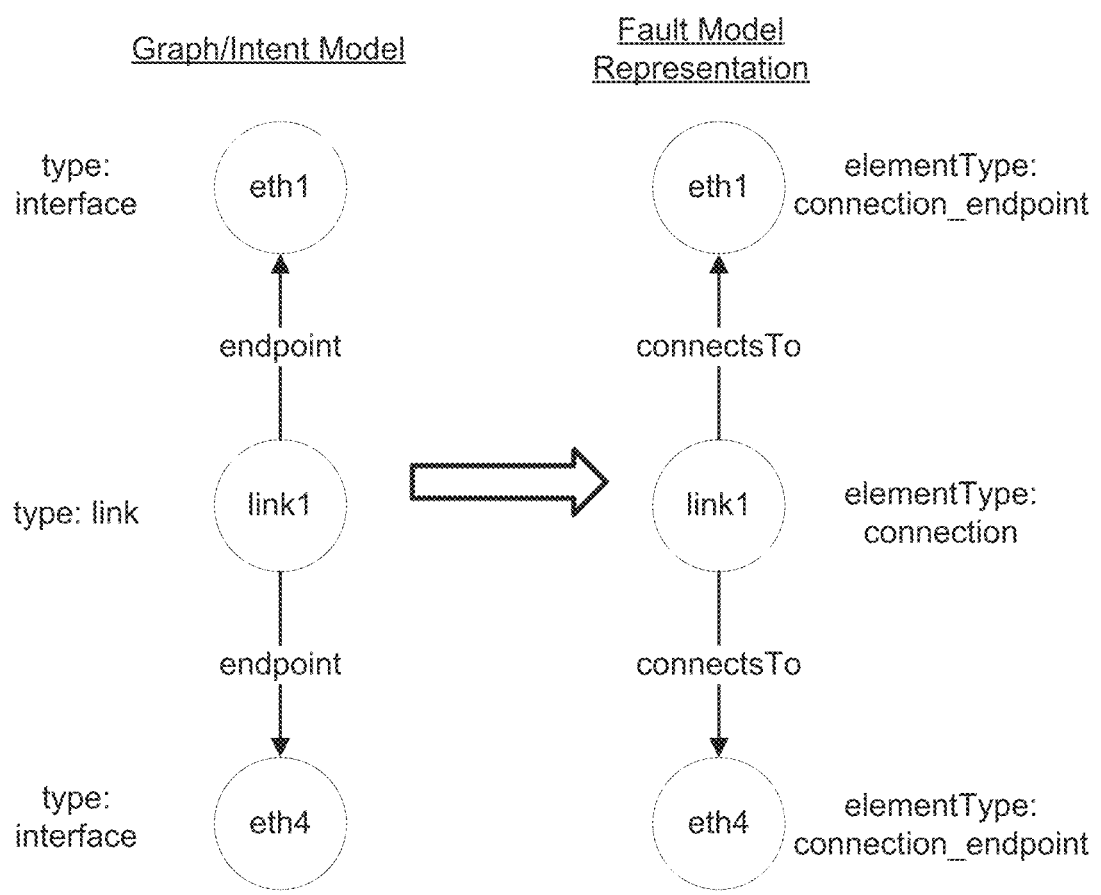
FIGS. 6A-6C illustrate examples of transformations of portions of a graph representation of a computer network into corresponding portions of a fault model representation.
Figure 6B:
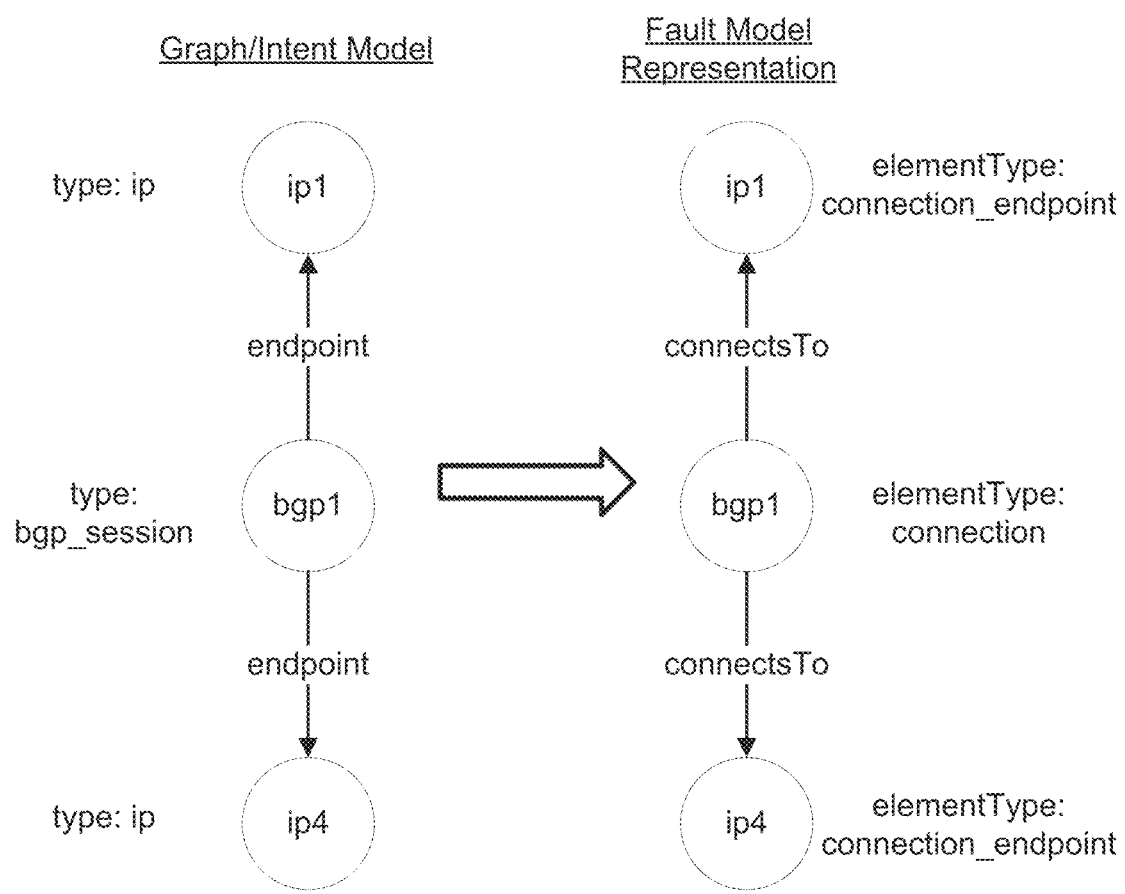
Figure 6C:
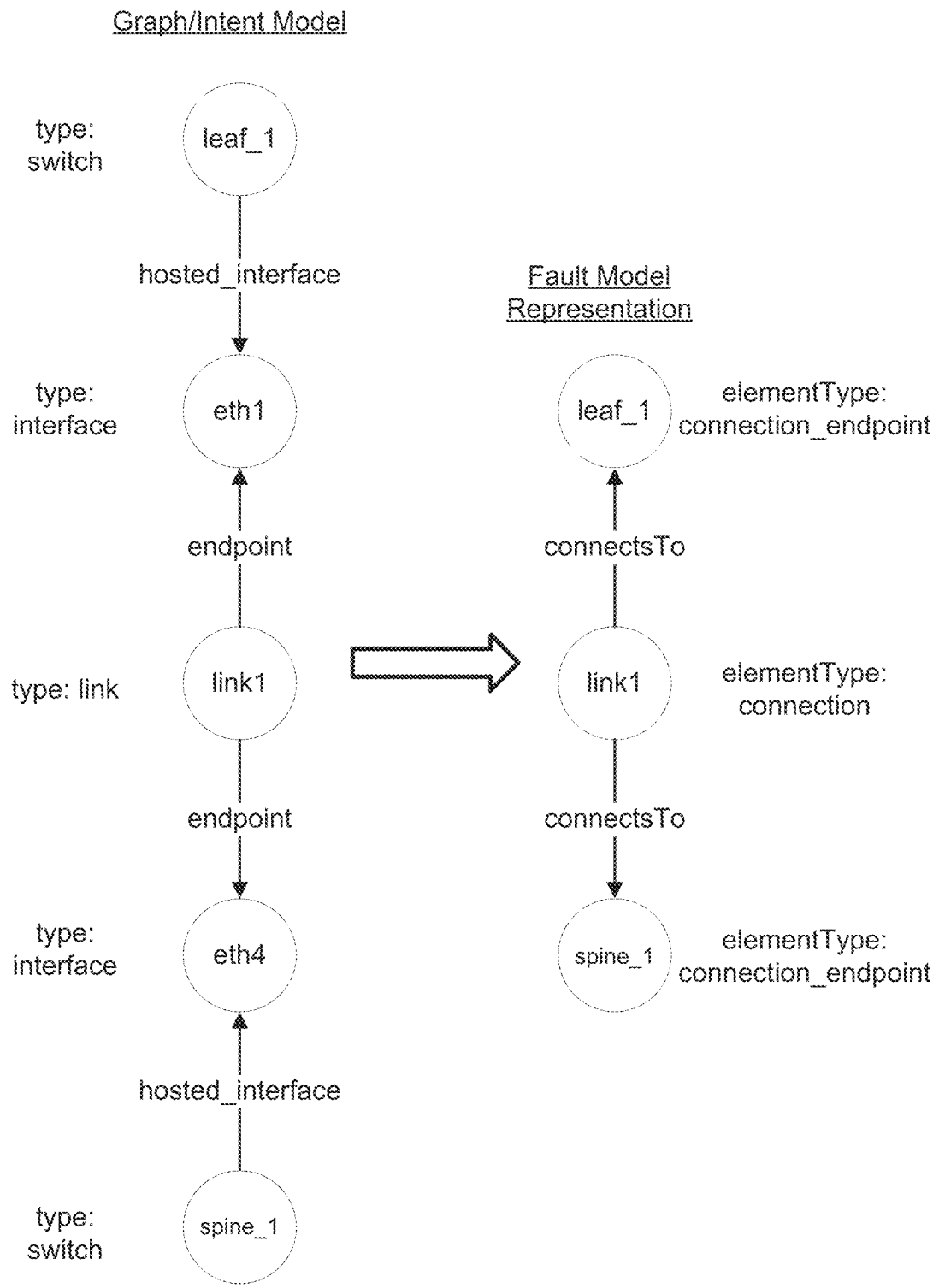

In various embodiments, the instantiation of the fault model representation based on the graph representation includes transforming the graph representation into the fault model representation. Example transformations of portions of a graph representation of a computer network into corresponding portions of a fault model representation are shown in FIGS. 6A-6C. In various embodiments, graph representations are derived from intent models that include declarative requirements for the computer network (e.g., see step 302). In some embodiments, the graph representation is similar or identical to the intent model (e.g., when the graph representation is a one-to-one mapping from the intent model). In the example shown in FIG. 6A, the graph representation shown on the left side is a portion of the intent model shown in FIG. 4C (see leftmost non-switch nodes of FIG. 4C). In various embodiments, the fault model representation is expressed in terms of behaviors specifications (e.g., as shown in FIGS. 5A and 5B). For example, in FIG. 6A, "type" associated with the graph representation is converted to a behavior specification format "elementType" (e.g., the type "interface" in FIG. 4A corresponds to the elementType "connection_endpoint" in FIG. 5A, the type "link" in FIG. 4A corresponds to the elementType "connection" in FIG. 5A, and "endpoint" in FIG. 4C corresponds to "connectsTo" in FIG. 5B). In the example shown in FIG. 6A, the graph/intent model (left side of FIG. 6A) maps to the fault model representation (right side of FIG. 6A) on an element-by-element basis in a way that corresponds to the mapping between the intent model of portions of FIG. 4 to behavior specifications from FIG. 5.

In various embodiments, the fault model representation that is expressed in terms of behavior specifications (e.g., behavior specifications from behavior specification repository 104 of FIG. 1 and as illustrated in FIG. 5) is an abstract representation, and the same behavior specifications may apply to different concrete models. Thus, an advantage of transforming the graph representation into the fault model representation is creating abstract model instances (e.g., of behavior) that are capable of corresponding to multiple concrete model instances (e.g., of intent). In the example shown in FIG. 6A, a link and interface concrete model is transformed into a connectivity behavior model. The same connectivity behavior model can also be applied to an IP and BGP session model according to FIG. 6B. In the fault model representation portion of FIG. 6B, the elementType fields are the same as in the fault model representation portion of FIG. 6A (and similarly, "connectsTo" replaces "endpoint") even though the underlying concrete model is an IP and BGP session model instead of a link and interface concrete model. Thus, the same connectivity behavior model can be applied to distinct concrete models. The graph/intent model portion of FIG. 6B corresponds to the second from the leftmost non-switch nodes in FIG. 4C (ip1, bpg1, and ip4), and as indicated above, the graph/intent model portion of FIG. 6A corresponds to the leftmost non-switch nodes in FIG. 4C (eth1, link1, and eth4). Thus, in this example, the same connectivity behavior is applicable to different portions of an intent model (intent model shown in the graph representation of FIG. 4C). It is also possible for a single portion of the fault model representation expressed in terms of behavior specifications to include multiple transitive relationships in a concrete model. For example, the graph/intent model portion of FIG. 6C is the same as the graph/intent model portion of FIG. 6A except the "leaf_1" and "spine_1" switch nodes (and their associated relationships) from FIG. 4C have been added and can be transformed to a fault model representation that directly connects "leaf_1" to "spine_1" through a link. In the example shown, it is possible to represent switch "leaf_1" being connected to switch "spine_1" if there is a path from "leaf_1" via interface, link, and interface to "spine_1." Stated alternatively, an instantiated fault model representation may collapse transitive relationships from a graph representation.

FIGS. 4A-4C illustrate examples of graph representations. FIG. 4A is an example of a graph representation in JSON format that includes nodes and relationships. Specifying a graph representation in alternative formats is also possible. FIG. 4B illustrates in pictorial form the nodes and relationships specified in FIG. 4A. FIG. 4C shows an example of a graph representation (in pictorial form) of a portion of a computer network with two switches. Further description of FIGS. 4A-4C is provided above in the description of step 302 of FIG. 3.

FIGS. 5A-5B illustrate examples of behavior specifications. FIG. 5A is an example of a behavior specification in JSON format that includes symptoms and root causes associated with elements. FIG. 5B is a pictorial diagram illustrating the behavior specification shown in FIG. 5A. Further description of FIGS. 5A-5B is provided above in the description of step 304 of FIG. 3.

FIGS. 6A-6C illustrate examples of transformations of portions of a graph representation of a computer network into corresponding portions of a fault model representation. FIG. 6A is an example of a transformation of a link and interface portion of a graph representation. FIG. 6B is an example of a transformation of an IP and BGP session portion of a graph representation. FIG. 6C illustrates collapsing transitive relationships from a graph representation. Further description of FIGS. 6A-6C is provided above in the description of step 304 of FIG. 3.

Figure 7:
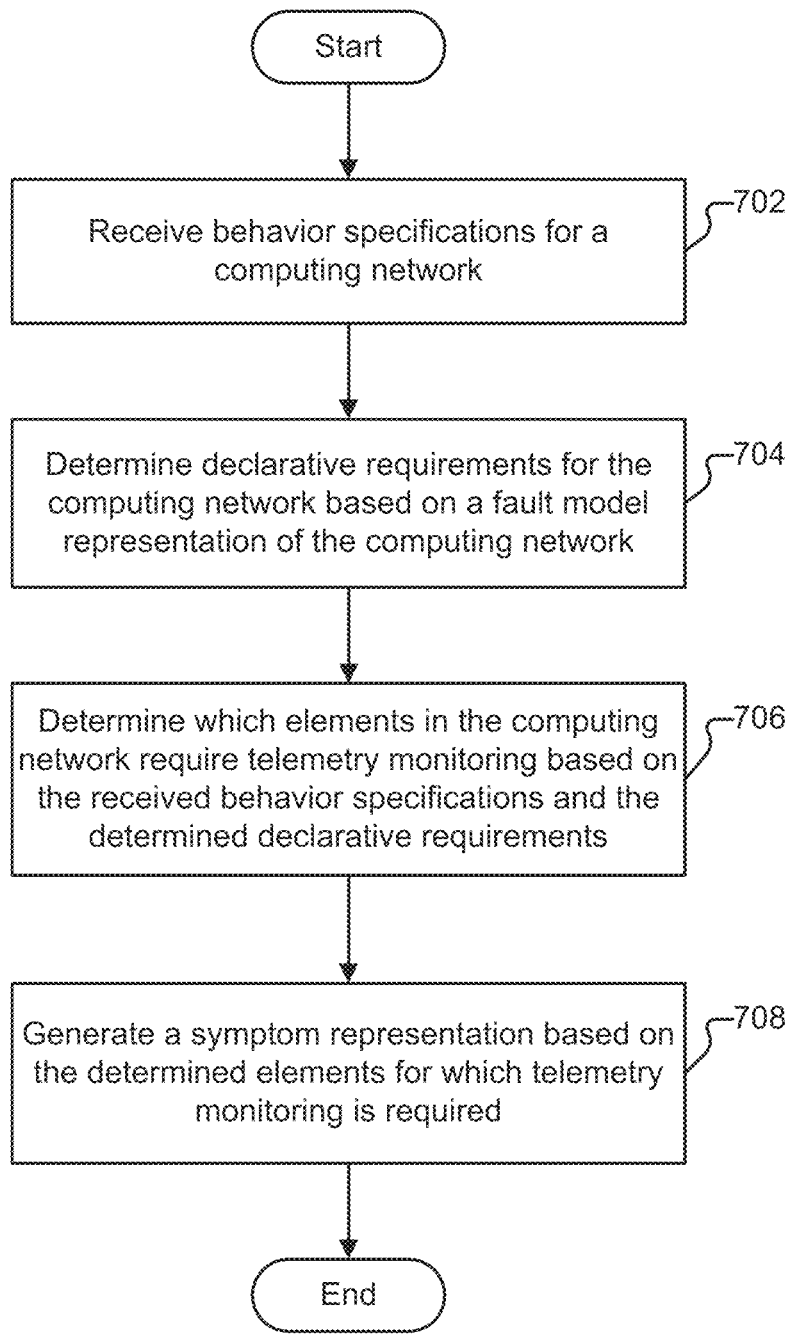
FIG. 7 is a flow chart illustrating an embodiment of a process for generating a symptom representation.

FIG. 7 is a flow chart illustrating an embodiment of a process for generating a symptom representation. In some embodiments, the process of FIG. 3 is performed by symptom representation generator 110 of FIG. 1. In some embodiments, at least a portion of the process of FIG. 7 is performed in 204 of FIG. 2.

At 702, behavior specifications for a computer network are received. In some embodiments, behavior specifications are received from behavior specification repository 104 of FIG. 1. The symptom representation may be expressed in terms of behavior specification elements. A domain specific language may be used to provide definitions associated with computer network elements, including root causes and symptoms that may occur with respect to the computer network elements as well as relationships with other elements in the computer network, symptom propagation specifications from one element to another according to relationships between elements, and symptom definitions based on observable metrics (e.g., how a metric is analyzed and how existence of a symptom is determined based on the metric). For example, FIG. 5B illustrates relationship, symptom, root cause, etc. definitions with respect to the elements specified in JSON format in FIG. 5A.

At 704, declarative requirements for the computer network are determined based on a fault model representation of the computer network. For example, declarative requirements may be determined from fault model representation 112 of FIG. 1. In some embodiments, fault model representations are generated from intent models that include declarative requirements; thus, declarative requirements may also be accessed from fault model representations. Examples of declarative requirements include computer network topology (e.g., which elements are intended to be present in the computer network and how they are connected to each other), types of devices (e.g., based on manufacturer) to be used in the computer network, operational status requirements (e.g., a connection between two specified elements in the computer network is maintained or elements specified in the computer network are up and running), and performance and/or service requirements (e.g., maintaining intended levels of service, resource utilization, response time, etc.).

At 706, elements in the computer network which require telemetry monitoring are determined based on the received behavior specifications and the determined declarative requirements. Because the symptom representation may be expressed in terms of behavior specification elements, behavior specifications, in conjunction with computer network intent derived from the fault model representation, can indicate which elements need to be monitored. For example, the fault models shown in FIGS. 6A-6C include numerous examples of "connection" connects to "connection endpoint" structures (e.g., eth1 to link1 and link1 to eth4 in FIG. 6A). Behavior specifications can indicate symptoms and root causes associated with these structures. For example, FIG. 5B shows that if a connection endpoint is down, a potential root cause is a faulty or broken connection. For this example, using both structural information from the fault model representation and the behavior specifications, it is possible to determine that connection endpoint telemetry should include monitoring for operational status (e.g., monitor connection endpoints to look for symptoms such as the connection endpoints being down in order to deduce that underlying connections are faulty or broken). In terms of FIG. 6A, this would mean that eth1 could be monitored for connection endpoint symptoms in order to deduce a root cause associated with link1.

In situations such as this, telemetry can be regarded as a type of threshold monitoring (e.g., some value is greater than some other value or does not match some other value) in order to determine operational or functional status. In these situations, declarative requirements are in operational and/or functional terms (e.g., connection endpoints should be able to communicate and connections should be maintained). In other situations, aggregation (e.g., time averaging) for telemetry data may be needed and complex symptoms may be calculated. Stated alternatively, declarative requirements, and thus intent, can be broader in concept than topology. Declarative requirements can include performance (e.g., intend to run a computer network at 50% oversubscription with a specified bandwidth utilization). Computer networks running slowly and other performance degradations may be symptoms (e.g., gray failures). Examples of declarative requirements (and thus intent) that go beyond topology and how they indicate what telemetry is required are shown in FIGS. 8A-8B.

Figure 8A:
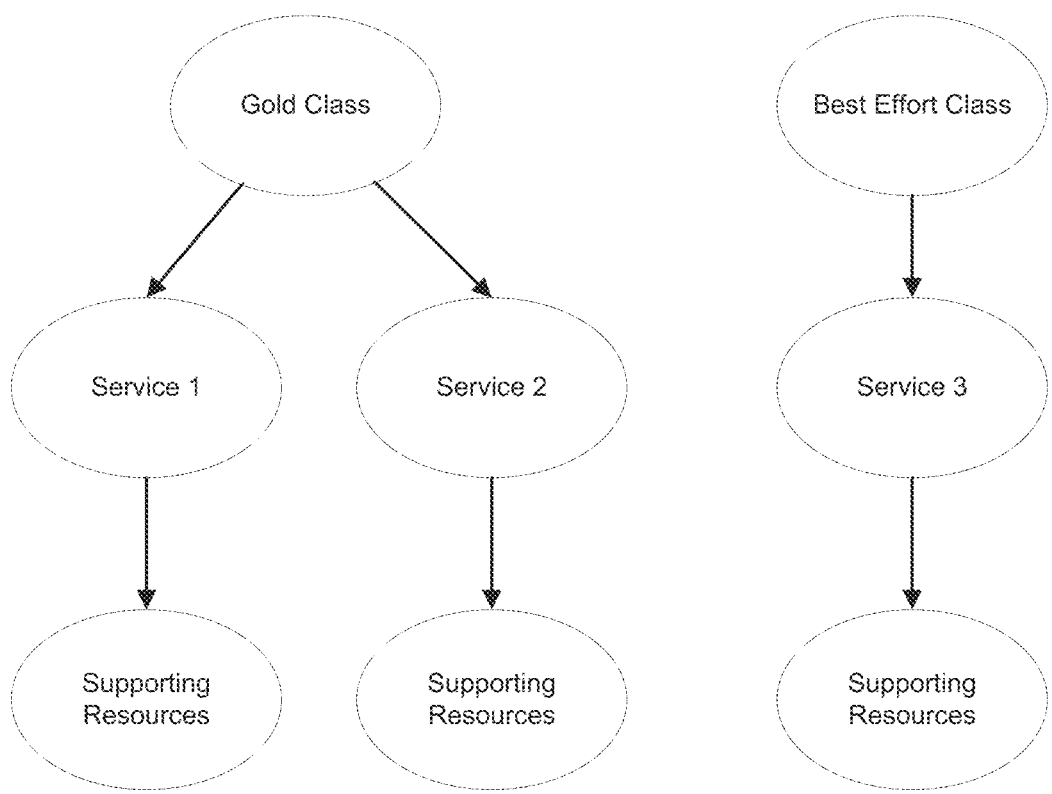
FIGS. 8A and 8B illustrate examples of complex symptoms

With respect to FIGS. 8A, suppose that root cause analysis is to be performed only on resources that are supporting services of class "gold". Examples of services include any hardware, software, and/or application that provides data storage, manipulation, presentation, communication or other capability that is implemented using a computer network. The benefit of flexibility with respect to performing root cause analysis only for specified service classes is the ability to expend computational resources (e.g., telemetry and root cause analysis) only for services that are premium and not for all services (and not at all times), which may not scale or may be computationally too expensive or infeasible. In some embodiments, this information is derived dynamically from intent (e.g., declarative requirements) and would need to be in at least periodic synchronization with telemetry in order to conduct correct root cause analysis. A dynamic nature of resource to service allocation indicates that a set of resources supporting a service can change over time. In addition, service attributes (such as class of service) may change depending on intent (e.g., changing service class from "gold" to "best effort" due to quotas/credits being exceeded, payment not received, etc.), which can only be derived from intent. Telemetry collectors associated with functional/operational status of computer network elements are not aware of service attribute changes and therefore there needs to be telemetry driven by a broader conceptualization of intent. FIG. 8A displays an example of specifying service attribute intent. In the example of FIG. 8A, service 1 and service 2 are intended to be "gold" class services, while service 3 is intended to be a "best effort" class service whose supporting resources are to be monitored in a different way than supporting resources for service 1 and service 2.

In the example shown in FIG. 8A, service 1 and service 2 are members of the gold class and their supporting resources (e.g., interfaces, links, etc.) would need to be instrumented so that root cause analysis can be performed. Supporting resources for service 3 would not need to be instrumented as service 3 is a best effort class service. In various embodiments, at any moment in time, it is possible for a service to change its class as well as for a set of resources supporting the service to change, which affects what elements require active instrumentation (telemetry collection). In some embodiments, as illustrated in FIG. 6C, supporting resources relationships may be transitive relationships that include multiple relationships forming a path that indicates the existence of a supporting resource relationship. In various embodiments, this complex dynamic dependency is enabled by graph representations of intent and dynamic calculation of intent.

Figure 8B:
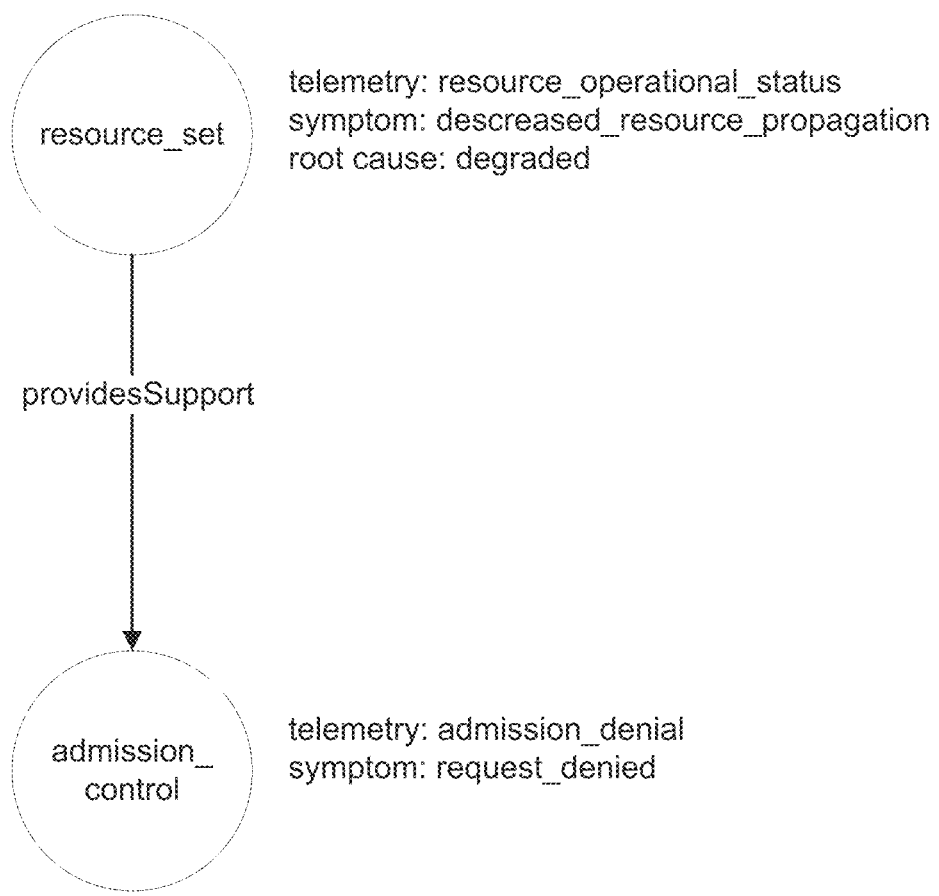

With respect to FIG. 8B, suppose that an admission control algorithm accepts new services if aggregate performance of resources is not degraded. A corresponding behavior specification is shown in FIG. 8B. FIG. 8B shows that the presence of a "request denied" symptom of an admission control module has a root cause in a "degraded" operational state of the resource set. Stated alternatively, the "degraded" state of the resource set propagates to the admission control module, which then starts rejecting requests. In various embodiments, calculating complex "degraded" state symptoms for resource sets is derived from intent. For example, "degraded" may be defined as more than 20% of supporting resources (e.g., links) having utilization of more than 70% (the parameters 20% and 70% being aggregate measures calculated from intent). A change in the intent may cause reconfiguration, resulting in changes to which resources are part of the "resource set". Thus, by changing these parameters via intent, symptoms may appear or disappear without any change in the operational state of the infrastructure. Stated alternatively, intent includes context, which cannot otherwise be derived from gathering functional status (e.g., running or not running) data on individual components in a computer network. Thus, FIG. 8B illustrates complex symptom calculation and what is referred to as a context-rich symptom representation.

At 708, a symptom representation is generated based on the determined elements for which telemetry monitoring is required. In various embodiments, the symptom representation includes complex and context-rich symptoms as described above. In order to generate the symptom representation, a collection of required telemetry is instantiated by recognizing which elements in the computer network need to be checked for presence of symptoms. In many scenarios, the telemetry has to be subject to temporal and spatial aggregation in order for complex symptoms to be generated (e.g., as described above, temporal aggregation to determine when a service class has changed and spatial aggregation to calculate "degradation" across a plurality of links). Thus, in some scenarios, the presence or absence of symptoms is determined based on complex settings that are part of declarative intent and not derivable from interpreting functional status (e.g., running or not running) data collected for individual components in a computer network. In various embodiments, telemetry semantics (including potential need for aggregation) is expressed as metadata in a behavior specification repository (e.g., behavior specification repository 104 of FIG. 1). In various embodiments, the symptom representation comprises collected telemetry data.

FIGS. 8A and 8B illustrate examples of complex symptoms. FIG. 8A illustrates an example of a time-dependent symptom. FIG. 8B illustrates a symptom for which an aggregation calculation is required. Further description of FIGS. 8A-8B is provided above in the description of step 706 of FIG. 7.

FIG. 9 is a diagram illustrating an embodiment of a network management environment. Management server 902 is connected to data store 904, network device 906, and network device 908 via network 910. In some embodiments, management server 902 provides a network configuration, monitoring, and management solutions. For example, a user may utilize a solution at least in part provided by management server 902 to set up a network configuration, set up a network device, calculate operational state expectations, monitor performance or operational state of a network, monitor devices of a network, automate tasks, and otherwise perform management of devices of the network. In the example shown, management server 902 is utilized to manage at least network device 906 and network device 908. Management server 902 processes/executes agents (e.g., agents performing functions triggered when a portion of a graph representation matches a specified triggering graph representation pattern of a corresponding agent). In some embodiments, management server 902 is specialized custom hardware. In some embodiments, management server 902 is utilized to configure hardware network switches.

In some embodiments, management server 902 facilitates interactions with users to receive and provide desired requirements, specifications, and status updates. For example, a user utilizes a user interface (e.g., web interface, application interface, command line interface, application programming interface (API), configuration file interface, etc.) provided directly and/or remotely (e.g., via display, wired connection, network, etc.). Using the user interface, a user may provide high level requirements that specify a desired configuration of a desired network/device and/or receive information regarding status of devices/components of the desired network and/or an implementation status regarding the desired configuration requirements.

In some embodiments, management server 902 selects processing agents among a plurality of processing agents (e.g., triggered by patterns matching at least a portion of a graph representation) to achieve/complete a desired network requirement. In some embodiments, agents are accessed by a user via an API (e.g., RESTful API). For example, HTTP methods (e.g., GET, PUT, POST, DELETE, etc.) are utilized to access and manage information via the API. URIs may be utilized to reference state and resources. The declarative requirements may be specified at one or more selected stages/levels among a plurality of stages/levels. In some embodiments, a user specifies one or more constraints (e.g., resources, policies, etc.) of a desired network configuration.

In some embodiments, at least a portion of a computing infrastructure to implement the declarative requirements is represented as a graph model/representation of computing infrastructure elements including computing infrastructure nodes and computing infrastructure edges. Examples of data associated with each node of the graph representation include: an identifier, a node type (e.g., server, switch, interface, rule, policy, etc.), a descriptive label (e.g., description of node), a tag, and other properties (e.g., one or more key value pairs). Examples of data associated with each edge of the graph model include: an identifier, an edge type (e.g., hosted interfaces, hosted on, etc.), a source node connected by an edge, a target node connected by an edge, a descriptive label (e.g., description of edge), a tag, and other properties (e.g., one or more key value pairs).

When a change in the graph representation of computing infrastructure elements is detected, it is determined whether the change affects any triggering graph representation pattern. In the event the change affects the triggering pattern, the change is notified to a processing agent associated with the affected triggering pattern. For example, processing agents are declaratively authored with a set of one or more triggering patterns with associated callback functions. The function of each agent may perform portions of the processing required to generate configurations and deploy the computing infrastructure. For example, the callback functions of various agents perform semantic validation, gather telemetry and execution data, and/or detect anomalies during execution.

The system invokes the callback of an agent anytime the graph representation elements' corresponding triggering pattern of the agent is 'added,' 'updated,' and/or 'removed' in the associated portion of the graph representation. Thus, each agent is dealing with a subset of a graph model/representation that is relevant to its own objectives and it does not get invoked for changes not relevant to it. Each processing agent focuses only on the parts of the graph representation relevant to the business logic it implements. Agents need not keep track of all changes to the graph, and only need to re-execute parts of its business logic based on incremental changes in the graph representation portion of interest. By having all processing related to the computing infrastructure implemented as agents of the graph model, the computing infrastructure can be optimized and scaled independent of any complex central processing given the decentralization of the processing agents.

The agents thus coded in the above fashion can incrementally perform their duties. In some embodiments, on startup, the agent evaluates its inputs and outputs and performs initial processing to ensure that inputs and outputs satisfy constraints defined in its business logic. This initial processing may involve processing multiple components of the graph matching the agent's defined triggering patterns. After initial start-up processing, the agent has reached a steady state. In the steady state, an agent may choose to only react to incremental changes to the graph representation that are relevant to its business logic, and performs incremental processing on such changes on top of the steady state.

In some embodiments, a triggering pattern of a processing agent specifies identifiers of graph representation elements that describe at least a portion of a graph representation of interest, and when the triggering pattern matches a portion of the graph representation of interest or no longer matches a previously matched portion of the graph representation, the associated processing function is executed. The invoked function of the agent is provided pointers to the graph representation elements included in the matching portion to allow the invoked function to utilize/modify the associated graph representation elements. In some embodiments, an API is provided to allow modification and use of the graph representation via the API. Execution of the API invokes one or more associated agents to perform the necessary processing required to achieve the desired result of the API invocation. In some embodiments, telemetry data collected during use and execution of the computing infrastructure is mapped to corresponding graph representation elements to provide (e.g., visually) a representation of the telemetry data in the graph representation format.

This paradigm may support any programming language to be used for authoring agents. Code execution is efficient because each piece of code is explicitly associated with only a portion of the graph representation of interest (e.g., small portion) and is only invoked when necessary. The agents are also modular because each agent can have any number of rules, each with a callback function, thereby cleanly separating the code along the boundaries of triggering patterns. It is also scalable because there can be multiple agent instances and multiple systems to dispatch changes to interested agents. This enables a real-time state (e.g., not message) based publish/subscribe communication mechanism implemented on top of graph-based live queries, therefore enabling reacting to incremental graph changes and triggering incremental processing. The asynchronous, reactive capability of the system allows the system to scale. Support for new features offered by modern infrastructure platforms may be easily added (e.g. by adding new agents). In some embodiments, components of the system communicate in reaction to a change in intent.

Management server 902 implements and manages various graph representation processing agents. In some embodiments, agents provide device requirement instructions to and receive status information from various devices of a network being managed. For example, using desired network requirements, agents determine individual device requirements to implement the desired network requirements. In some embodiments, in translating the desired network requirements to the device requirements, a plurality of different successive processing stages/levels may be utilized. The network requirements may be specified for any of the different processing stage levels. For example, network requirements may be specified at the most general and highest level and/or at a lower and more specific stage/level. Each processing stage/level may translate an input declarative requirement to an output declarative requirement that may be utilized as the input declarative requirement for the next subsequent lower processing stage/level. For each processing stage/level, agents merge an input declarative requirement with one or more constraints (e.g., resources available, policies to follow, etc.) to determine the output declarative requirement. By being able to provide desired declarative network requirements of any selected stage/level of a plurality of different processing stages/levels, a user is given the option to tune the level/amount of control desired by the user in configuring the network. For example, a network administrator who desires to quickly set up a default configuration network may specify declarative requirements at the highest stage/level while a network administrator who desires to set up a more customized and specific network may specify declarative requirements at a lower stage/level. In some embodiments, each processing stage/level performs a different function. For example, one processing stage/level determines a logical connectivity in its output declarative requirements, another processing stage/level determines physical connectivity in its output declarative requirements, and another processing stage/level determines a cabling diagram in its output declarative requirements.

In various embodiments, any number of agents may exist. Each agent may perform the same and/or different functions that may be triggered by one or more associated triggering patterns. In some embodiments, an agent coordinates and performs verification that a service is functioning. For example, the desired configuration of a desired network/device service that has been received is utilized to generate one or more device verification models for one or more devices that are utilized. Each device verification model may identify one or more parameters to be verified/detected for the specific device of the verification model. The device verification model is different from device requirements provided to a device to implement the device requirements to configure the device. For example, device requirements are provided to configure/set up a device to provide service whereas the device verification model is provided to verify a status and/or configuration of the service. In some embodiments, in response to the device verification model, a status report is received from the corresponding device that identifies status of the one or more parameters identified in the verification model. An agent may then aggregate and analyze one or more status reports to determine whether the service has been properly implemented/configured and/or is properly functioning.

One or more processing agents executed by network device 906 receive device requirements for network device 906 and one or more processing agents executed by network device 908 receive device requirements for network device 908. Each of these agents may generate and/or implement/execute native hardware instructions implementing device requirements to configure its associated individual network device.

In some embodiments, an agent hosted by network device 906 receives a device verification model for network device 906 and an agent hosted by network device 908 receives a device verification model for network device 908. Each of these agents may determine one or more status parameters to be reported to verify the corresponding device verification model and gather/detect the determined status parameters. Then each agent may provide a status report of the gathered/detected status parameters to another agent that is handling the verification of the service being provided. In some embodiments, each agent reports information about a status, an operation, and/or other information of its associated device(s). A different agent may then collect and process the reported information to report the information and/or to perform a responsive action. For example, when an agent provides a status update that its associated device is overloaded, another agent (e.g., hosted by management server 902) may add a new device to a network to offload processing and/or to move a processing task of the overloaded device to another network device. The collected status information may be provided by an agent as a report and/or a request for action.

Data store 904 stores the data of the graph model. Data store 904 may be included in a networked storage service. In the example shown, agents access data store 904 via network 910. In some embodiments, data store 904 is directly connected to management server 902 via a non-shared connection. In various embodiments, data store 904 is included in any of the components shown in FIG. 9. For example, data store 904 is included in server 902. Data store 904 may include a server that manages data stored in data store 904. Examples of data store 904 include a database, a highly available storage, a distributed storage, a cloud storage, a data service, or any other type of data storage.

Network device 906 and network device 908 may be any type of device connected to network 910. Examples of network device 906 and network device 908 include a server, a network switch, a network router, a cache server, a storage device, a hypervisor switch, a virtual router, a load balancer, a firewall, a network fabric device, a virtual network device, a software device, a software component, or any type of computer or networking device that may be physical or virtual. The shown agents are software and/or hardware components included in corresponding components. Examples of network 910 include one or more of the following: a direct or indirect physical communication connection, a mobile communication network, Internet, intranet, Local Area Network, Wide Area Network, Storage Area Network, and any other form of connecting two or more systems, components, or storage devices together. Other communication paths may exist and the example of FIG. 9 has been simplified to illustrate the example clearly.

Although single instances of many of the components shown in FIG. 9 have been shown to simplify the diagram, additional instances of any of the components shown in FIG. 9 may exist. For example, any number of management servers, storages, and network devices may exist. Management server 902 may be a cluster of servers and storage 904 may be a distributed storage. Any number of agents may exist. A single server/device may include any number of agents. Although the example shown in FIG. 9 shows each agent included/installed in their respective associated system components, the agents may be included in different servers/devices. For example, a single agent may be assigned to processing across a plurality of network devices. Components not shown in FIG. 9 may also exist. In some embodiments, each resource (e.g., each agent, server, and network device) of FIG. 9 may belong to a domain. For example, resources belonging to the same domain are interoperable and may function together to perform a network configuration and/or management task. In some embodiments, each resource may only belong to one domain and only resources within the same domain are guaranteed to be interoperable to perform a network configuration and/or management task. Certain resources may belong to a plurality of domains. A plurality of domains may be utilized to manage a single network. The components shown in FIG. 9 may be components of one or more domains. Any of the components shown in FIG. 9 may be a physical or a virtual component.

Figure 10:
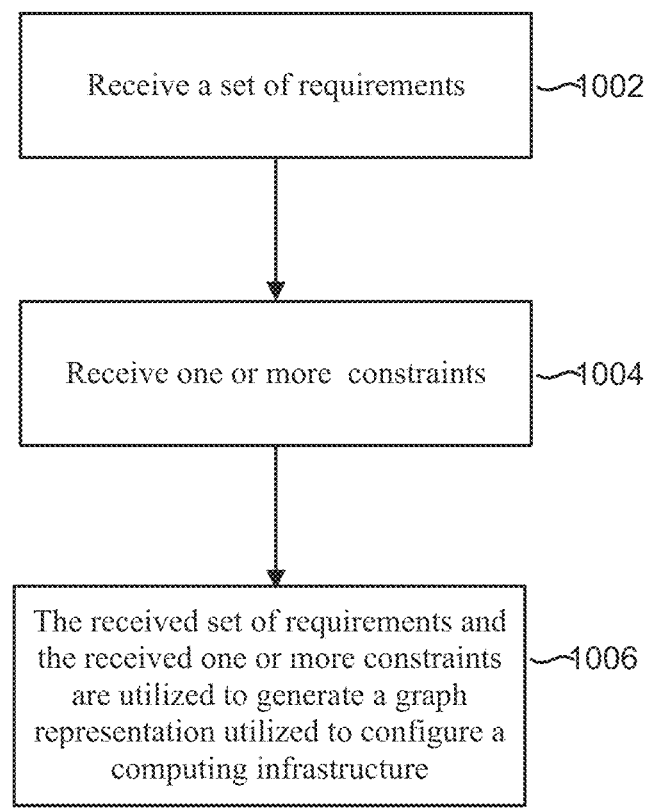
FIG. 10 is a flowchart illustrating an embodiment of a process for publishing network requirements.

FIG. 10 is a flowchart illustrating an embodiment of a process for publishing network requirements. The process of FIG. 10 may be implemented on management server 902 of FIG. 9.

At 1002, a set of requirements is received. In some embodiments, the set of requirements includes a specification of an intent that identifies a desired service and an associated reference design to be used to implement the intent. The reference design may identify a standard manner in which component systems and devices are to be organized to provide a service. For example, the reference design identifies a network topology and protocol(s) to be utilized to provide an intended network service. The intent may specify one or more requirements (e.g., declarative network requirements) of the desired service independent of the reference design to be utilized. For example, the intent may specify that 20 servers are to be networked together. The intent is to be implemented using the specified reference design and by changing the specification of the reference design, implementation of the same intent may be changed to utilize the newly specified reference design. By separating the specification of the intent and the reference design, different reference design implementations of the intent may be achieved by simply specifying different reference designs along with the same intent.

In some embodiments, the set of requirements includes a desired configuration, setting, topology, and/or other specifications of a network/service and/or one or more devices connected or able to be connected to the network. In some embodiments, the set of requirements includes a set of declarative requirements. For example, declarative requirements express a desired configuration of network components without specifying an exact native device configuration and control flow. By utilizing declarative requirements, what should be accomplished may be specified rather than how it should be accomplished. Declarative requirements may be contrasted with imperative instructions that describe the exact device configuration syntax and control flow to achieve the configuration. By utilizing declarative requirements rather than imperative instructions, a user and/or user system is relieved of the burden of determining the exact device configurations required to achieve a desired result of the user/system. For example, it is often difficult and burdensome to specify and manage exact imperative instructions to configure each device of a network when various different types of devices from different vendors are utilized. The types and kinds of devices of the network may dynamically change as new devices are added and device failures occur. Managing various different types of devices from different vendors with different configuration protocols, syntax, and software versions to configure a cohesive network of devices is often difficult to achieve. Thus, by only requiring a user/system to specify declarative requirements that specify a desired result applicable across various different types of devices, management and configuration of the network devices becomes more efficient.

In various embodiments, the set of requirements specifies a desired configuration, a desired action, a command, or any other instruction or desired result of one or more devices. One example of the set of network requirements is a set of requirements to establish a connected network of endpoints. For example, endpoints may represent servers, virtual machines, containers, or applications.

For example, the intent is connect 500 servers together and the reference architecture is a mesh network (e.g., Layer 3 Clos Network). In a Clos Network reference architecture, every lower-tier switch (e.g., leaves) is connected to each of the top-tier switches (e.g., spines) in a full-mesh topology. A portion of an example intent that specifies an instruction to establish an L3 Clos network configuration received via a received requirements file is below:
   Network architecture=Clos/BGP
   # of servers connected=144500
   IP address pool=10.0.0.0/20
   ASN pool=[1000-1100]
The above requirements specify that a network with 500 network servers should be established and the network architecture topology of the network to be established is a Clos network using Border Gateway Protocol (BGP) with required IP addresses allocated from the range 10.0.0.0 through 10.0.15.255 and ASNs (autonomous system numbers) to be allocated from the range 1000 to 1100.

In some embodiments, the set of requirements is verified for validity and correctness. For example, it is verified that the set of network requirements has been received from an authorized and validated source, the provided requirement specification syntax is correct, valid requirements have been provided, all required parameters for a desired result have been specified, and provided requirements are able to be achieved via available hardware/software resources/devices.

In some embodiments, the set of requirements is a set of declarative requirements that specify a desired configuration, a desired action, a desired mapping result, a command, or any other desired result of one or more declarative requirement processing stages/levels. In some embodiments, the set of requirements may be specified for one or more selected processing stages/levels of successive declarative requirement processing stages/levels. For example, there exists a plurality of processing successive stages/levels that successively require more specific/lower stage/level declarative requirements at each lower stage/level and a user may specify declarative requirements for any one of the stages/levels. In some embodiments, each of the processing stages/levels determines additional aspects of a network to be configured. For example, the output of each processing stage/level includes additional declarative requirements that further define additional aspects of the desired network.

In some embodiments, the set of declarative requirements is specified for a selected processing stage/level. For example, network declarative requirements can be specified for the most general and highest processing stage/level or for a lower and more specific processing stage/level based on the amount of customization and detail desired to be controlled when automatically setting up a network defined by the specified declarative requirements. Each processing stage/level may translate an input requirement to an output requirement that may be utilized as the input requirement for the next processing stage/level, if applicable. For example, by successively converting declarative requirements to a lower stage/level declarative requirement with more specificity at each of the plurality of processing levels/stages, declarative requirements for each specific device to be configured by each processing agent of each specific device are determined.

In some embodiments, rather than requiring a user to specify declarative requirements that conform to a single specificity level, the user is able to specify declarative requirements at any of a plurality of different specificity levels corresponding to the plurality of processing levels/stages. Thus, by being able to provide desired network declarative requirements at any of a plurality of different selected levels, a user is given the option to specify the level/amount of control desired by the user in configuring the network. For example, a network administrator who desires to quickly set up a default configuration network may specify declarative requirements at the highest stage/level (e.g., number of servers to be supported) while a network administrator who desires to set up a more customized and specific network may specify declarative requirements at a lower stage/level (e.g., specific cable connection mapping between network switches).

In some embodiments, each stage processes an input requirement using one or more constraints (e.g., resources available, policies to follow, etc.) to determine the output requirement. In some embodiments, constraints are received at the agent. For example, a user provides the constraints (e.g., resources available, policies to follow, etc.) for storage in a data store for use in one or more processing stages. In some embodiments, if a required declarative requirement has not been specified by a user, a default declarative requirement that is consistent with the specified declarative requirement is utilized. In some embodiments, declarative requirements may be specified for a plurality of different processing stages/levels. For example, a user may specify a high-level declarative requirement for the starting processing stage/level but also for another lower processing stage/level to customize a desired aspect. In some embodiments, the declarative requirements are specified in JavaScript Object Notation (i.e., JSON) format.

At 1004, one or more constraints are received. In some embodiments, one or more constraints are received from a user via an interface. For example, constraints (e.g., resources available, policies to follow, etc.) are received via a user interface (e.g., web interface, application interface, command line interface, application programming interface (API), RESTful API, configuration file interface, etc.). In some embodiments, the constraints have been automatically determined. For example, the constraints include a list of network switches available and the available resources have been automatically discovered. In some embodiments, the constraints include information identifying resources. For example, identification information about hardware and/or software resources available to be utilized to determine an output declarative requirement is received. In some embodiments, the constraints include specification of one or more policies. For example, a policy specification of how to determine an output requirement is specified by a policy constraint (e.g., how to assign device names, how to assign port mappings, etc.). In some embodiments, the policy constraint may include one or more rules, logic, program code, and/or mappings that at least in part specify how to determine an output from an input declarative requirement. In some embodiments, the constraints may be utilized together with an input declarative requirement by agents to determine an output requirement for at least one processing stage/level of a plurality of processing stages/levels. In some embodiments, the received constraint is associated with at least one specific processing stage/level.

At 1006, the received set of requirements and the received one or more constraints are utilized to generate a graph representation utilized to configure a computing infrastructure. In some embodiments, operational state expectations are set for the computing infrastructure and subsequently validated. In some embodiments, the received set of network requirements and the received one or more constraints are utilized to determine a set of output requirements. For example, the received set of input requirements and the received one or more applicable constraints are utilized to determine a lower level of output declarative requirements. In some embodiments, the received set of network requirements is a set of declarative requirements that are to be processed using the one or more constraints to ultimately determine a set of declarative device requirements for one or more devices to be configured to implement a desired network. In some embodiments, a progression of one or more processing stages/levels is achieved via processing agents to determine a final output set of declarative requirements. In some embodiments, a directed graph progression of one or more processing stages/levels is utilized to determine a final output set of declarative requirements.

In one example, the set of requirements to establish the L3 Clos network described previously is utilized to generate a graph representation of the intended network configuration and operational state. Examples of data associated with each node of the graph model include: an identifier, a node type (e.g., server, switch, interface, rule, policy, etc.), a descriptive label (e.g., description of node), a tag, and other properties (e.g., one or more key value pairs). Examples of data associated with each edge of the graph model include: an identifier, an edge type (e.g., hosted interfaces, hosted on, etc.), a source node connected by an edge, a target node connected by an edge, a descriptive label (e.g., description of edge), a tag, and other properties (e.g., one or more key value pairs).

Various processing agents perform processing to create, implement, verify, and/or modify the graph representation. Each agent is associated with one or more triggering graph representation patterns that will trigger the associated agent and when the graph representation is created or modified due to the initial specification and/or as a result of processing by another agent that modifies the graph representation, it is determined whether the change affects any triggering pattern. In the event the change affects the triggering pattern, the change is notified to a processing agent associated with the affected triggering pattern. For example, processing agents are declaratively authored with a set of one or more rules with associated callbacks. The call back function and business logic function of each agent may perform portions of the processing required to generate configurations and deploy the computing infrastructure. For example, the call back functions of various agents perform semantic validation, gather telemetry and execution data, and/or detect anomalies during execution.

In some embodiments, the agents together in effect analyze the received requirements and determine and identify devices that will be utilized to implement the desired network configuration of the received network requirements. The example L3 Clos network requirements specify the number of spine network switch devices to be 6 and the number of leaf network switch devices to be 32. In total, the agents will determine and identify 38 devices that will need to be configured to implement the desired Clos network. For each of the devices that are to be utilized, the agents determine the individual device requirements in implementing the desired Clos network. For the L3 Clos network example, below is one example of device requirements for one of the 38 different device requirements.

Role=spine
IP address=10.0.0.3
ASN=1000
Neighbors=[(Leaf-1, 10.0.0.7, 1010), (Leaf-2, 10.0.0.15, 1011), . . . (Leaf-32, 10.0.0.176), 1042]
Status=defined The above device requirements specify that in a Clos network, one network switch device is to be a spine switch with a BGP router identifier defined as IP address 10.0.0.3 and ASN 1000. The leaf switches connected to this spine switch device have been also identified, as well as their IPs and ASNs.

In some embodiments, the processing performed in 1006 includes performing processing for one or more processing stages/levels of a plurality of successive declarative requirement processing stages/levels. For example, a processing for one processing stage/level is performed using one or more agents and the output declarative requirement of this process level is used to add/modify data to the graph representation that may trigger other triggering patterns of other agents that in effect serve as an input declarative requirement for the next processing stage, if applicable. In some embodiments, if a declarative requirement is not specified for a particular processing stage/level, the required input declarative requirement for the processing stage/level may be determined automatically based on the received declarative requirements (e.g., to be consistent) and/or a default declarative requirement for the processing stage/level is utilized.

In some embodiments, utilizing the one or more constraints includes utilizing information identifying resources to assign a configuration to/from hardware/software resources. For example, devices to be configured are selected from a list of device resources. In another example, a configuration parameter is selected from a list of available configuration parameter ranges. In some embodiments, utilizing the constraint includes utilizing a specification of one or more policies. For example, a policy specification of how to determine the output requirement from the input requirements is specified by a policy (e.g., how to assign device names, how to assign port mappings, etc.). In some embodiments, a policy includes one or more rules, logic, program code, and/or mappings that at least in part specify how to determine the output declarative requirements from the input declarative requirements.

In some embodiments, the agents utilized to determine the output requirements is configurable/customizable. For example, a user may modify, extend, and/or configure the triggering patterns and/or call back function processing performed by the agents. The agents may be configurable/customizable via an interface such as an API.

In some embodiments, the set of output requirements is verified. In some embodiments, verifying the set of output requirements includes performing one or more tests to determine whether the set of output requirements is valid and matches an intent of input requirement(s). In some embodiments, the test to be performed may depend on the processing stage/level of the set of output requirements, content of the input requirements, content of the output requirements, the agent utilized, one or more constraints utilized, and/or processing performed to determine the output declarative requirements. In some embodiments, the graph representation is verified to ensure that it conforms to a schema that defines allowed elements of the graph representation and how the graph representation is allowed to be structured/connected. For example, an agent that is triggered by a new/modified element or connection of the graph representation executes via its callback function a verification of the new/modified element or connection to ensure that it satisfies the rules of the schema.

Figure 11A:
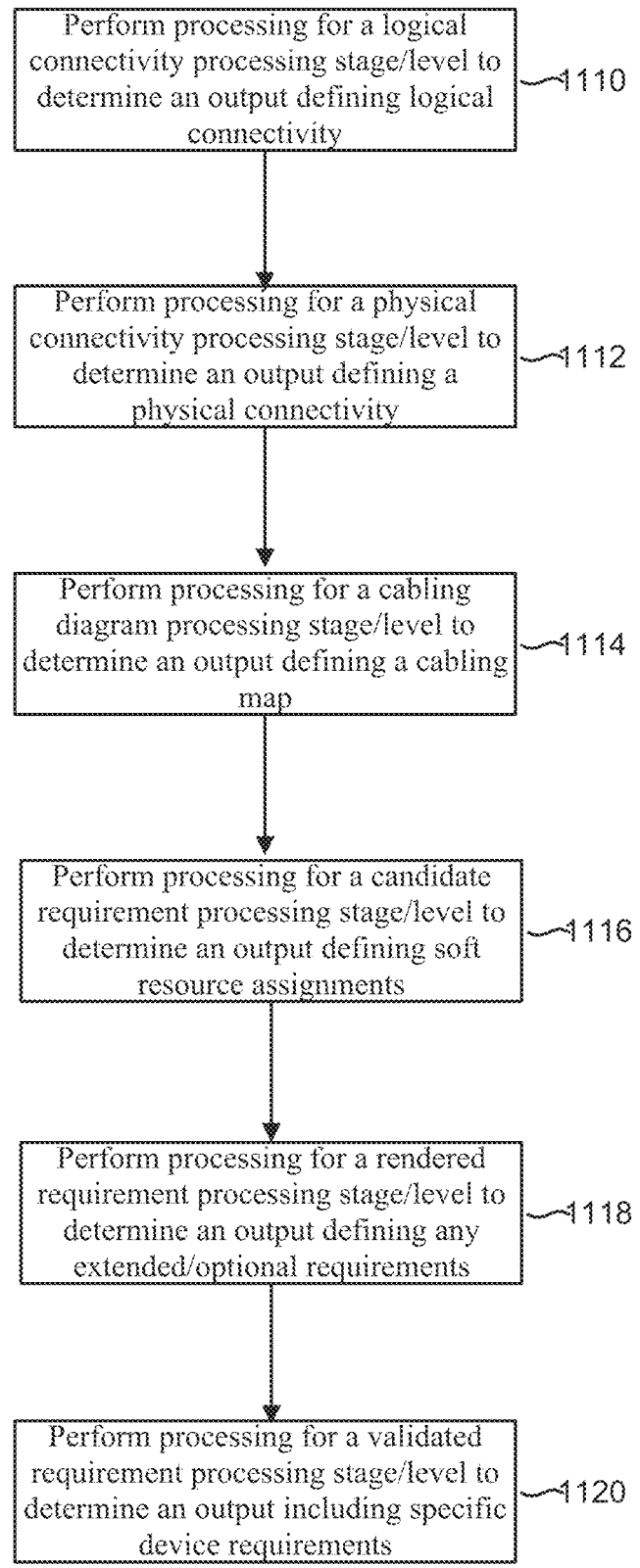
FIG. 11A is a flowchart illustrating an embodiment of an example process for automatically configuring a network using received declarative requirements.

FIG. 11A is a flowchart illustrating an embodiment of an example process for automatically configuring a network using received declarative requirements. The process of FIG. 11A may be implemented on management server 902 of FIG. 9. In some embodiments, the process of FIG. 11A is performed at least in part by one or more different agents. For example, each processing stage/level may be performed by one or more agents. In some embodiments, at least a portion of the process of FIG. 11A is included in 1006 of FIG. 10. In some embodiments, the process of FIG. 11A is utilized to automatically configure an L3 Clos network. For example, the process of FIG. 11A is utilized to configure an L3 Clos network for a specific network domain and network point of delivery (i.e., PoD).

In some embodiments, the process of FIG. 11A may be flexibly started/entered at any of the steps of the process depending upon a level of input declarative requirements provided by a user. In some embodiments, after declarative requirements to configure a network are received (e.g., received at 1002 of FIG. 10), the processing stage/level of the declarative requirement processing stages/levels corresponding to the received declarative requirements is determined. For example, the received declarative requirements are analyzed to determine the level/type of requirements specified in the received declarative requirements and the processing stage/level of a plurality of processing stages/levels corresponding to the received declarative requirements is identified. In some embodiments, it is determined which step (e.g., which one of steps 1110 to 1120) of the process of FIG. 11A corresponds to the identified processing stage/level and the process of FIG. 11A is entered/started at the determined step.

At 1110, processing for a logical connectivity processing stage/level is performed to determine an output defining logical connectivity. In some embodiments, the logical connectivity is determined at a processing stage/level of a plurality of declarative requirement processing stages/levels. In some embodiments, processing the logical connectivity processing stage/level includes determining output declarative requirements using input declarative requirements. In some embodiments, the input declarative requirements are at least in part received in 1002 of FIG. 10. In some embodiments, processing the logical connectivity processing stage/level includes determining output declarative requirements identifying logical connections between leaf network switches and spine network switches to implement input declarative requirements defining a desired L3 Clos network. The input declarative requirements of this processing stage/level may specify one or more of the following: the number of servers to be connected using the L3 Clos network to be established; and the oversubscription ratio (e.g., maximum amount of bandwidth theoretically that could be required for a network switch port vs. actual maximum bandwidth capacity of the network switch port). In some embodiments, constraints are obtained (e.g., obtained in 1004 of FIG. 10) and utilized (e.g., utilized in 1006 of FIG. 10) to determine the output declarative requirements. For example, profiles (e.g., number of switch-facing ports, number of server-facing ports, etc.) of devices (e.g., network hardware switches) available to be utilized to create the L3 Clos network (e.g., without identifying specific exact machine) are obtained and utilized in selecting the types of devices to be utilized in the output declarative requirement identifying the mesh network. In some embodiments, only devices identified in the constraints may be the switches identified in the output declarative requirements.

In some embodiments, the input declarative requirements of the logical connectivity processing stage/level include one or more declarative requirements provided by a user. For example, the input declarative requirements of the logical connectivity processing stage/level include declarative requirements received in 1002 of FIG. 10. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 1110 is not performed in the event a user provided a lower/later level/stage of input declarative requirements. For example, the process of FIG. 11A is entered at 1112. In some embodiments, the output declarative requirements are verified to ensure performance expectations and/or an intent of the input declarative requirements is met. In some embodiments, the output declarative requirements are verified to verify the number and/or type of network switches utilized and/or devices utilized in the output declarative requirements.

At 1112, processing for a physical connectivity processing stage/level is performed to determine an output defining a physical connectivity. In some embodiments, the transformation from a logical connectivity to a physical connectivity involves assigning switch models to the logical devices and performing validation to ensure that the selected switch models have the necessary prerequisites (such as number of ports with specific line rates) to participate in the network configuration. In some embodiments, the physical connectivity processing stage/level is one of a plurality of declarative requirement processing stages/levels. In some embodiments, processing the physical connectivity processing stage/level includes determining output declarative requirements using input declarative requirements. The input declarative requirements of this processing stage/level may be the output declarative requirements of the processing stage/level of 1110. In some embodiments, the input declarative requirements are at least in part received in 1002 of FIG. 10. In some embodiments, processing the physical connectivity processing stage/level includes determining an output declarative requirement identifying physical connections between specific device types corresponding to logical connections specified in the input declarative requirements. In some embodiments, constraints are obtained (e.g., obtained in 1004 of FIG. 10) and utilized (e.g., utilized in 1006 of FIG. 10) to determine the output declarative requirements. For example, profiles of specific device types (e.g., specific model/vendor of network hardware switches) available to be utilized to create the L3 Clos network are obtained and utilized in selecting the specific device types to be utilized in the output declarative requirement identifying the L3 Clos mesh network. In some embodiments, specific device types are assigned to logical devices of the input declarative requirements to determine the output declarative requirements for this processing stage.

In some embodiments, the input declarative requirements of the physical connectivity processing stage/level include one or more declarative requirements provided by a user. For example, the input declarative requirements of the physical connectivity processing stage/level include declarative requirements received in 1002 of FIG. 10. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 1112 is not performed in the event a user provided a lower/later level/stage of input declarative requirements than the level of the physical connectivity processing stage/level. For example, the process of FIG. 11A is entered at 1114. In some embodiments, the output declarative requirements are verified to ensure correct route tables are consistent with the input declarative requirements. In some embodiments, the output declarative requirements are verified to verify route tables and/or specific device types included in the output declarative requirements.

At 1114, processing for a cabling diagram processing stage/level is performed to determine an output defining a cabling diagram/map. In some embodiments, the cabling diagram processing stage/level is one of a plurality of declarative requirement processing stages/levels. In some embodiments, processing the cabling diagram processing stage/level includes determining output declarative requirements using input declarative requirements. The input declarative requirements of this processing stage/level may be the output declarative requirements of the processing stage/level of 1112. In some embodiments, the input declarative requirements are at least in part received in 1002 of FIG. 10. In some embodiments, processing the cabling diagram processing stage/level includes determining an output declarative requirement identifying a cabling diagram/map defining connections between ports of L3 Clos switches specified in the input declarative requirements. In some embodiments, constraints are obtained (e.g., obtained in 1004 of FIG. 10) and utilized (e.g., utilized in 1006 of FIG. 10) to determine the output declarative requirements. For example, constraints of port maps/identifications and port resources of specific devices (e.g., network hardware switches) to be utilized to create the L3 Clos network are obtained and utilized in determining the specific cable connections between ports of the switches of the L3 Clos mesh network. In some embodiments, various roles (e.g., server facing, spine, edge, etc.) are assigned for specific ports in determining the output declarative requirements for this processing stage. In some embodiments, one or more policy/rule/code constraints are utilized in determining the cabling diagram output declarative requirement.

In some embodiments, the input declarative requirements of the cabling diagram processing stage/level include one or more declarative requirements provided by a user. For example, the input declarative requirements of the cabling diagram level include declarative requirements received in 1002 of FIG. 2. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 1114 is not performed in the event a user provided a lower/later level/stage of input declarative requirements than the level of the cabling diagram processing stage/level. For example, the process of FIG. 11A is entered at 1116. In some embodiments, the output declarative requirements are verified to ensure correct cabling and/or port (e.g., port function) mappings.

At 1116, processing for a candidate requirement processing stage/level is performed to determine an output defining soft resource assignments. In some embodiments, the candidate requirement processing stage/level is one of a plurality of declarative requirement processing stages/levels. In some embodiments, processing the candidate requirement processing stage/level includes determining output declarative requirements using input declarative requirements. The input declarative requirements of this processing stage/level may be the output declarative requirements of the processing stage/level of 1114. In some embodiments, the input declarative requirements are at least in part received in 1002 of FIG. 10. In some embodiments, processing the candidate requirement processing stage/level includes determining an output declarative requirement identifying assigned soft resources of connections identified in the input declarative requirements. In some embodiments, constraints are obtained (e.g., obtained in 1004 of FIG. 10) and utilized (e.g., utilized in 1006 of FIG. 10) to determine the output declarative requirements. For example, constraints including a listing of soft resources (e.g., IP address ranges, autonomous system number (ASN) ranges, etc.) available to be assigned are utilized in assigning soft resources to the network switch connections. In some embodiments, one or more policy/rule/code constraints are utilized in assigning soft resources specified in the output declarative requirements.

In some embodiments, the input declarative requirements of the candidate requirement processing stage/level include one or more declarative requirements provided by a user. For example, the input declarative requirements of the candidate requirement level include declarative requirements received in 1002 of FIG. 10. In some embodiments, at least a portion of the input declarative requirements has not been directly specified by a user and a default and/or dynamically determined declarative input requirement is utilized. The dynamically determined declarative input requirements may be determined to be consistent with at least in part a user provided input declarative requirement. In some embodiments, step 1116 is not performed in the event a user provided a lower/later level/stage of input declarative requirements than the level of the candidate requirement processing stage/level. For example, the process of FIG. 11A is entered at 1118. In some embodiments, the output declarative requirements are verified to ensure correct IP assignments, ASNs, Border Gateway Protocol (BGP) sessions, etc. Although ASN examples have been described, other reference architectures and routing protocols may be utilized in various embodiments. For example, a different routing protocol such as Open Shortest Path First (OSPF) that does not require ASNs may be utilized.

At 1118, processing for a rendered requirement processing stage/level is performed to determine an output defining any extended/optional requirements. In some embodiments, the rendered requirement processing stage/level is one of a plurality of declarative requirement processing stages/levels. In some embodiments, processing the rendered requirement processing stage/level includes determining output declarative requirements using input declarative requirements. The input declarative requirements of this processing stage/level may be the output declarative requirements of the processing stage/level of 1116. In some embodiments, the input declarative requirements are at least in part received in 1002 of FIG. 10. In some embodiments, processing the rendered requirement processing stage/level includes determining an output declarative requirement identifying final configurations including any extended/optional requirements/configurations of the L3 Clos network to be established. In some embodiments, constraints are obtained (e.g., obtained in 1004 of FIG. 10) and utilized (e.g., utilized in 1006 of FIG. 10) to determine the output declarative requirements. For example, a specification of extended/optional configurations (e.g., configurations to be added/substituted from candidate configurations, parameters, etc.) to be assigned for specific types of devices is utilized in determining extended/optional requirements/configurations of the final requirements specified in the output declarative requirements. In some embodiments, one or more policy/rule/code constraints are utilized in determining the rendered requirement output declarative requirements.

In some embodiments, the input declarative requirements of the rendered requirement processing stage/level include one or more declarative requirements provided by a user. For example, the input declarative requirements of the rendered requirement level include declarative requirements received in 1002 of FIG. 10. In some embodiments, at least a portion of the input declarative requirements has not been directly specified by a user and a default and/or dynamically determined declarative input requirement is utilized. The dynamically determined declarative input requirement may be determined to be consistent with at least in part a user provided input declarative requirement. In some embodiments, step 1118 is not performed in the event a user provided a lower/later level/stage of input declarative requirements than the level of the rendered requirement processing stage/level. For example, the process of FIG. 11A is entered at 1120. In some embodiments, the output declarative requirements are verified to ensure correct final configurations.

In some embodiments, performing processing for the rendered requirement processing stage/level includes identifying and invoking, for each component of the system (e.g., device) to be configured to provide the desired service, a function to generate rendered requirements for the component of the system. In some embodiments, there exists a plurality of different functions that are each specific to a particular reference architecture and system component role within the reference architecture. For example, for each system component to be utilized to provide the intended network service, the rendered requirement to configure the system component is generated by a particular program function that is specific to the reference architecture and role of the system component. In some embodiments, in order to support a new reference architecture, a separate function for each possible role (e.g., device type) within the reference architecture is to be provided such that the function can be located and invoked to implement the reference architecture when needed.

At 1120, processing for a validated requirement processing stage/level is performed to determine an output including specific device requirements. In some embodiments, the validated requirement processing stage/level is the final processing stage/level of a plurality of declarative requirement processing stages/levels. In some embodiments, processing the validated requirement processing stage/level includes determining output declarative requirements using input declarative requirements. The input declarative requirements of this processing stage/level may be the output declarative requirements of the processing stage/level of 1118. In some embodiments, the input declarative requirements are at least in part received in 1002 of FIG. 10. In some embodiments, processing the validated requirement processing stage/level includes determining an output declarative requirement assigning final configurations to specific network devices to be configured to implement the L3 Clos network. In some embodiments, constraints are obtained (e.g., obtained in 1004 of FIG. 10) and utilized (e.g., utilized in 1006 of FIG. 10) to determine the output declarative requirements. For example, constraints including a specification of specific device profiles, availability of specific actual devices, and/or unique identifiers (e.g., serial numbers) of specific devices are received to determine specific device/switch assignments to be specified in the output declarative requirements. In some embodiments, one or more policy/rule/code constraints are utilized in assigning specific devices assigned in the validated requirement output declarative requirements.

In some embodiments, the input declarative requirements of the validated requirement processing stage/level include one or more declarative requirements provided by a user. For example, the input declarative requirements of the rendered requirement level include declarative requirements received in 1002 of FIG. 10. In some embodiments, at least a portion of the input declarative requirements has not been directly specified by a user and a default and/or dynamically determined declarative input requirement is utilized. The dynamically determined declarative input requirements may be determined to be consistent with at least in part a user provided input declarative requirement. In some embodiments, step 1120 is not performed in the event a user provides final validated requirements identifying specific devices. In some embodiments, the output declarative requirements are verified to ensure correct specific device assignments. In some embodiments, the output declarative requirements are to be pushed to specific agents to configure specific devices/switches. For example, the output declarative requirements of this stage/level are received at 1202 of FIG. 12.

In some embodiments, processing in 1118 and/or 1120 includes identifying and invoking for each system component (e.g., node, device, etc.) to be configured to provide the desired service, a configuration/service rendering program function to generate rendered/output requirements for the component. In some embodiments, there exists a plurality of different functions that are each specific to a particular reference architecture and system component role within the reference architecture. For example, for each system component to be utilized to provide the intended network service, the rendered/output requirement to configure the system component is generated by a particular program function that is specific to the reference architecture and role of the system component. In some embodiments, in order to support a new reference architecture, a separate function for each possible role (e.g., device type) within the reference architecture is to be provided such that the function can be located and invoked to implement the reference architecture when needed.

In some embodiments, processing in 1118 and/or 1120 includes identifying and invoking, for each component of the system (e.g., node, device, etc.) to be configured to provide the desired service, a verification model rendering function to generate a verification model for the component of the system. In some embodiments, there exists a plurality of different functions that are each specific to a particular reference architecture and system component role within the reference architecture to generate a corresponding verification model. For example, for each system component to be utilized to provide the intended network service, the verification model is generated by a particular program function (e.g., verification model rendering function is different from the service rendering function that generates the rendered/output requirements for the system component) that is specific to the reference architecture and role of the system component. The verification model may be utilized by one or more agents to perform a verification of the nodes/components and/or elements of an associated graph representation.

Although a simple linear progression of processing stages/levels has been shown in the example of FIG. 11A to simplify the example, various processing agents may perform the workflow shown in FIG. 11A using various processing orders and paths that may be at least in part parallel.

Figure 11B:
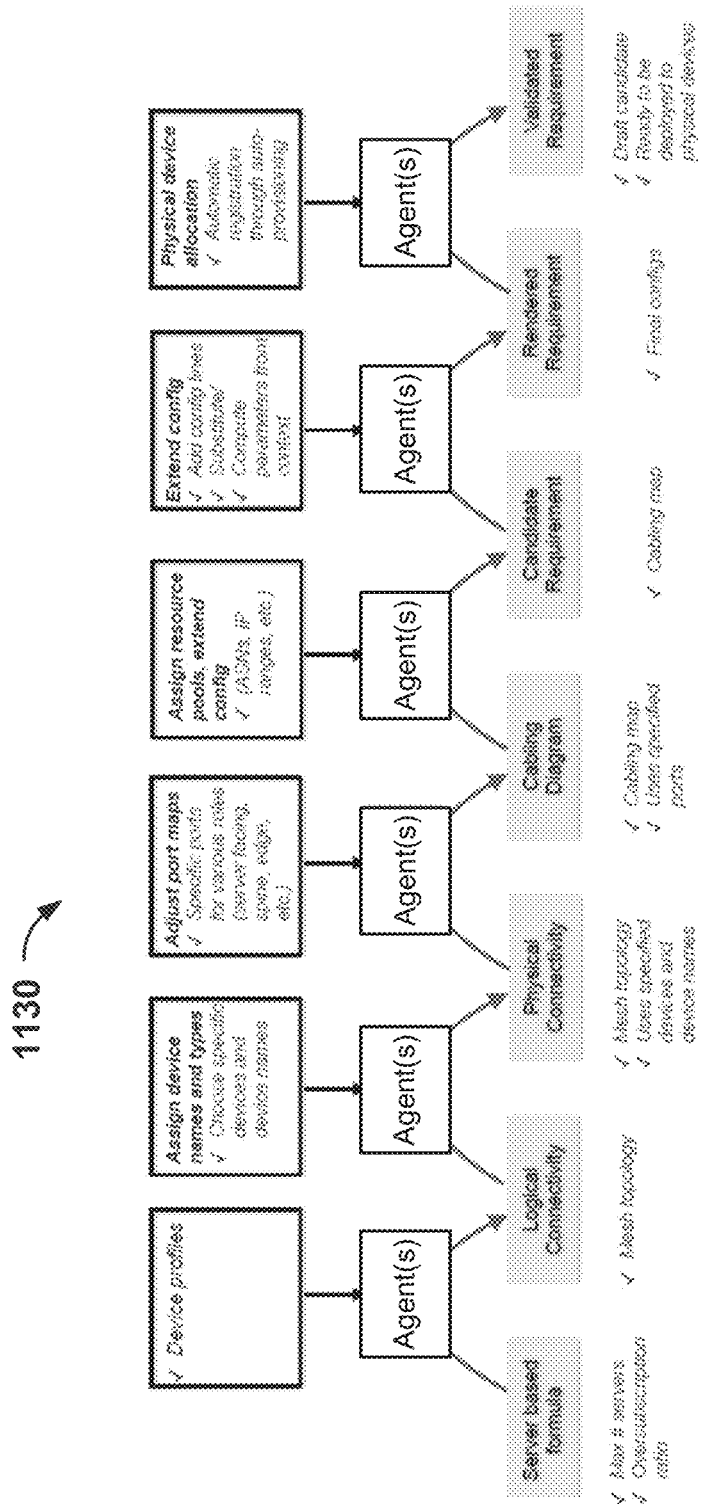
FIG. 11B is a block diagram illustrating processing stages/levels of an example process for automatically configuring an L3 Clos network.

FIG. 11B is a block diagram illustrating processing stages/levels of an example process for automatically configuring an L3 Clos network. The processing shown in FIG. 11B may be implemented on management server 902 of FIG. 9. In some embodiments, the processing shown in FIG. 11B is performed at least in part by one or more different processing agents triggered by at least a portion of an associated graph representation (e.g., graph representation portion matching triggering pattern of the agent). In some embodiments, the processing shown in FIG. 11B is included in 1006 of FIG. 10. In some embodiments, FIG. 11B illustrates the process of FIG. 11A. In some embodiments, a user is able to flexibly enter the processing shown in FIG. 11B at any one of the successive processing stages/levels depending on a level of input declarative requirements provided by a user. As shown in diagram 1130, output of a previous/higher level stage is utilized by one or more agents of the next lower level as its input declarative requirements. For example, output of a previous level agent updates a portion of a graph representation and the update triggers a pattern of a next level agent. The agents may utilize the output of a previous agent along with predefined input constraints to determine the output to update the graph representation.

Figure 12:
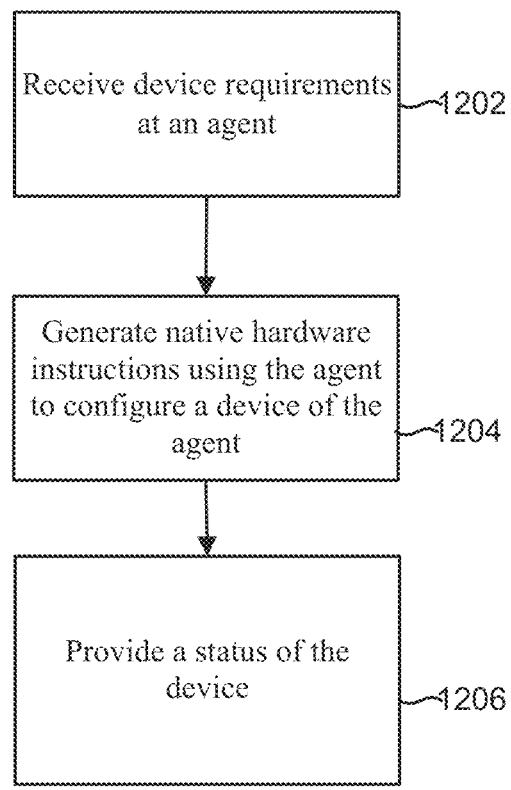
FIG. 12 is a flowchart illustrating an embodiment of a process for generating native hardware instructions.

FIG. 12 is a flowchart illustrating an embodiment of a process for generating native hardware instructions. The process of FIG. 12 may be implemented on network device 906 and/or 908 of FIG. 9. In some embodiments, the process of FIG. 12 is performed by one or more processing agents of network device 906 and/or 908 of FIG. 9.

At 1202, device requirements are received at an agent. In some embodiments, the agent is an agent executed by network device 906 and/or 908 of FIG. 9. In some embodiments, the agent is a software and/or hardware component that manages and implements device requirements for an associated/assigned device. In some embodiments, different types/versions of agents exist for different network devices. For example, an agent provides conversion functionality between a device requirement and implementing native instructions specific to a device and the agent that can generate native instructions for a specific device (e.g., specific to vendor, operating system, protocol, version, etc. of the device) is selected for the specific device. Because the agent needs to handle specific native instructions of a device, when a new type or version of a device is added to a network, only a new agent for the new device is required while agents that perform other functions may remain unchanged. For example, an interaction agent that facilitates interactions with users to receive and provide desired requirements, specifications, and status updates or an application agent that implements and manages the desired network requirements, configurations, and status updates across various network devices are not required to change. This may allow simplified administration of various different types of devices of a network. The agent may be installed on a device managed by the agent. In some embodiments, the agent is remote from the managed device. In some embodiments, one agent may manage a plurality of devices. For example, a single agent may manage a plurality of devices of the same type. In some embodiments, the device-specific instructions are generated at a server and provided to the agent that is responsible for applying the provided instructions on the device and reporting the status of applying the provided instructions.

In some embodiments, the received device requirements are the device requirements specified in a graph representation generated in 1006 of FIG. 10 for a device. In some embodiments, each different agent is associated with a triggering pattern of the graph model that identifies the device associated with the corresponding agent. In some embodiments, the receiving the device requirements includes receiving an indication that the device requirements have been stored to a data store due to a subscription and the agent requests and obtains the device requirements from the data store. In some embodiments, the receiving the device requirements includes automatically receiving content of device requirements from a data store due to a subscription. In some embodiments, receiving the device requirements includes directly receiving the device requirements from an agent.

At 1204, native hardware instructions are generated using the agent to configure a device of the agent. In some embodiments, native hardware instructions are generated in a software library and the generated native hardware instructions are utilized by an agent. In some embodiments, the device requirements received by the agent are processed by the agent to generate the native hardware instructions implementing the received device requirements. For example, received declarative instructions are converted to imperative instructions. In some embodiments, the native hardware instructions are in the native programming/configuration syntax of the device. For example, the native hardware instructions are generated in a format native to a configuration software interface of the device. In some embodiments, the native hardware instructions are in a form that can be directly utilized by the device to configure the device. In some embodiments, the native hardware instructions are executed by the device. For example, the generated native hardware instructions are issued for execution on the device.

In one example, the device requirements to become a spine switch of the L3 Clos network configuration described previously in the specification are received at the agent and the agent analyzes the received device requirements and generates native network switch device instructions to configure the network switch device to become a spine switch of a Clos network with the specified BGP router identifier and specified neighbors.

At 1206, a status of the device is provided. In some embodiments, step 1206 is optional and may not be performed. In some embodiments, providing the status includes updating data in a corresponding node in a graph representation, an identifier of the status. In some embodiments, providing the status includes providing an indication of status of achieving the received device requirements. For example, a status indication of a stage of the processing of the device requirements is provided.

In some embodiments, the status of the device indicates a status of implementing device requirements on the device. For example, the status may be one of six states. The initial first example state is a "defined" state that indicates that the device requirement has been successfully updated. A second example state is a "staged" state that indicates that resources have been allocated to implement the device requirements. A third example state is a "rendered" state that indicates that native hardware instructions corresponding to the device requirements have been generated. A fourth example state is a "deployed" state that indicates the generated native hardware instructions for execution on the device. A fifth example state is an "operational" state that indicates that the generated native hardware instructions are successfully executed on the device. However, when an error is encountered, a sixth example "error" state may be indicated to indicate that an error has been encountered.

In some embodiments, the status of the device indicates a health state of the device. For example, indication of information such as processing load, CPU utilization, storage utilization, memory utilization, version identification, errors encountered, network status, network bandwidth, network latency, etc. may be provided. In some embodiments, the status of the device indicates a packet drop rate. For example, an indication of a Ternary Content Addressable Memory (i.e., TCAM) utilization of the device is provided by the agent. In another example, an indication is provided when a TCAM table is overflowed.

Figure 13:
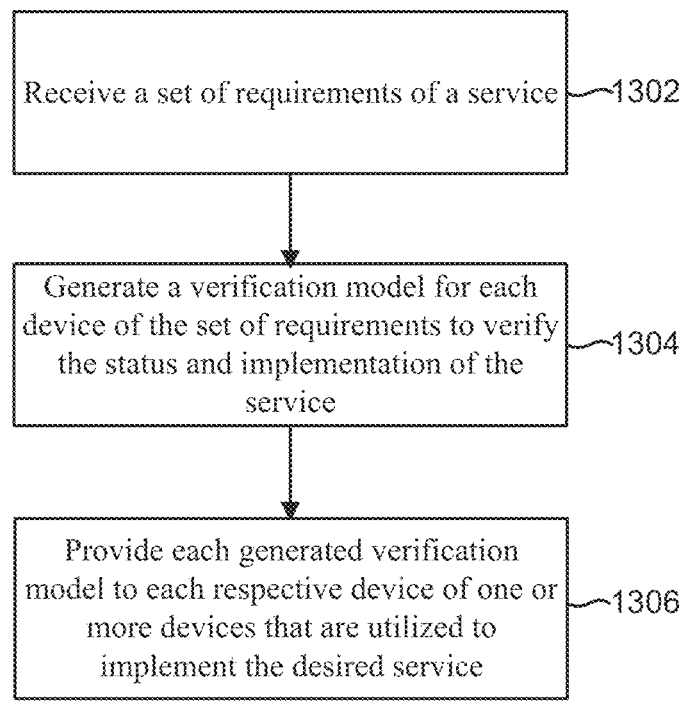
FIG. 13 is a flowchart illustrating an embodiment of a process for generating a verification model.

FIG. 13 is a flowchart illustrating an embodiment of a process for generating a verification model. The process of FIG. 13 may be implemented on management server 902 of FIG. 9.

At 1302, a set of requirements of a service is received. In some embodiments, the received set of requirements is the set of network requirements received in 1002 of FIG. 10. The service may be a network service and/or other type of service. In some embodiments, the set of requirements includes a set of declarative requirements. For example, declarative requirements express a desired configuration of network components without specifying an exact native device configuration and control flow. By utilizing declarative requirements, what should be accomplished may be specified rather than how it should be accomplished.

At 1304, a verification model for each device of the set of requirements is generated to verify the status and implementation of the service. In some embodiments, generating the verification model includes using the received set of requirements along with one or more received constraints associated with the set of requirements to determine a more complete set of requirements to be utilized to generate one or more verification models and one or more device configurations. For example, the output of step 1116 of FIG. 11A is utilized to generate one or more verification models for one or more devices to be utilized to implement the service to be verified. In this example, the output of step 1116 is utilized to generate both the specific device requirements to be utilized to configure devices to provide the service (e.g., utilized to generate output of steps 1118/1120 of FIG. 11A) as well as separate verification models for each of the devices to verify that each device is properly functioning and has been properly configured for the set of requirements. In some embodiments, validation test procedures are executed and the results are compared against generated expectations. In some embodiments, the received set of requirements has been processed to include information such as a cabling diagram/map using at least a portion of the process of FIG. 11A. For example, the set of requirements received in 1302 has been processed to specify topology of connections between network components.

At 1306, each generated verification model is provided to each respective device of one or more devices that are utilized to implement the desired service. In some embodiments, providing the generated verification model includes sending the generated verification model to an agent of the respective device. For example, an agent of management server 902 sends a generated verification model to an agent of network device 906 and sends another generated verification model to proxy an agent of network device 908 of FIG. 9. In some embodiments, providing each generated verification model includes storing each generated verification model in data of nodes of a graph representation stored in a data store (e.g., data store 904 of FIG. 9) to allow one or more agents to read and access its respective verification model from the nodes of the graph representation. Thus, rather than directly communicating the verification models to devices, an agent stores the verification models to the nodes of a graph representation to communicate the information.

Figure 14:
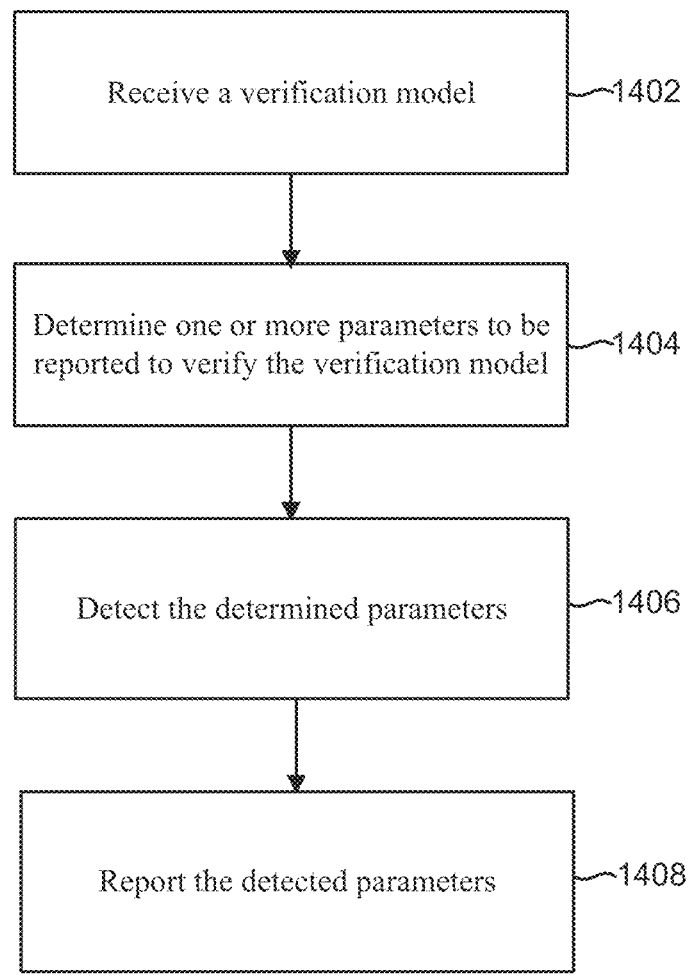
FIG. 14 is a flowchart illustrating an embodiment of a process for detecting status parameters.

FIG. 14 is a flowchart illustrating an embodiment of a process for detecting status parameters. The process of FIG. 14 may be implemented on network device 906 and/or network device 908 of FIG. 9. For example, at least a portion of the process of FIG. 14 is performed by one or more agents of network device 906 and/or network device 908.

At 1402, a verification model is received. In some embodiments, an agent receives a verification model. The agent may be an agent configured to handle the verification using the verification model. This agent may be the same or different from the agent utilized in FIG. 12 to configure the device. In some embodiments, the received verification model is the verification model provided in 1306 of FIG. 13. For example, an agent of a device being verified obtains the verification model from another agent.

In some embodiments, the received verification model is the verification model provided in 1306 of FIG. 13 for a device of the agent. In some embodiments, receiving the verification model includes detecting (e.g., via a matching triggering pattern) that the verification model has been stored in a node of a graph representation. In some embodiments, the verification model includes a list of one or more connections and associated parameters of the connections, and the associated device/agent of the verification model is to report/verify the existence, status, and/or parameters of the listed connections.

In some embodiments, the verification model includes a list of one or more service processes that should be operating on the associated device of the verification model and the associated device/agent is to report/verify the existence, status, and/or parameters of the listed service processes. In some embodiments, the verification model includes a list of one or more IP addresses that should be configured and are operating on the associated device of the verification model and the associated device/agent is to report/verify the existence, status, and/or parameters of the listed IP addresses. In some embodiments, the verification model includes a list of one or more interfaces of the associated device that should be verified and the associated device/agent is to report/verify the existence, status, and/or parameters of the listed interfaces. In some embodiments, the verification model includes a list of one or more connections between interfaces of the associated device and the other connected device that should be configured and operating and the associated device/agent is to report/verify the existence, status, and/or parameters of the listed interface connections. In some embodiments, the verification model includes a list of one or more device identifications of the associated device and the associated device/agent is to report/verify the existence, status, and/or parameters of the listed device identifications.

At 1404, one or more parameters to be reported to verify the verification model are determined. In some embodiments, the verification model identifies the one or more parameters. For example, the verification model includes a list of parameters of interest and a status/verification of each of these parameters that are to be reported. Examples of the parameters and status include parameters/status of connection sessions, services, IP addresses, interfaces, interface connections, device configurations, device properties, ports, quality of service metrics, etc. In some embodiments, the verification model identifies a higher conceptual item to be verified rather than specific parameters to be verified and one or more parameters that need to be verified to verify the item are identified. For example, the verification model identifies a connection to be verified and one or more parameters of the connection that need to be verified are identified. In some embodiments, determining the one or more parameters includes generating a list of status parameters that need to be detected from the device based on the verification model. In some embodiments, determining the one or more parameters includes identifying device/operating system specific parameters to be verified to verify an item of the verification model. For example, the verification model includes a verification instruction/parameter that is not specific to a particular device type and/or device operating system and an agent translates the verification instruction to a device type/operating system specific instruction/parameter. By allowing the protocol/format/instruction of the verification model to be specific vendor/operating system agnostic, generation of the verification model is simplified. Because each agent may be specific for a particular type of device vendor/operating system, the agent is the most efficient entity to perform the translation between a generic verification item of the verification model to a specific item particular to the device.

At 1406, the determined parameters are detected. In some embodiments, parameter detection is performed when the verification model is received. For example, an initial verification is performed to ensure that the service of the verification model has been properly initialized/configured in the graph representation. In some embodiments, parameter detection is performed periodically. For example, verification is performed at a periodic interval on an ongoing basis to ensure proper functioning of the service continually. In some embodiments, parameter detection is performed periodically (e.g., every periodic interval). In some embodiments, parameter detection is performed dynamically. For example, when a potential material change is detected (e.g., in the graph representation), parameter detection is invoked and performed to ensure that the service is properly functioning despite the change. Examples of the change may include a change to one or more of the following: a network connection, a device hardware, a device operating system, an application of the device, an error event, and any status of the device associated with the verification model. In another example, when a device (e.g., switch) operating system is informed about a change (e.g., changes to a route/routing table), the operating system notifies the agent that in response triggers parameter detection.

In some embodiments, detecting the determined parameters includes obtaining a status of a parameter. For example, a status of a network connection is obtained. In another example, it is determined whether an identified process is still functioning. In some embodiments, detecting the determined parameters includes obtaining a value of a parameter. For example, a network identifier (e.g., IP address) of an identified network connection is determined. In some embodiments, detecting the determined parameters includes obtaining information reported to the device from another device. For example, the device performing the verification detection receives status reports/messages from its neighbor devices and information included in these reports/messages is obtained. In some embodiments, detecting the determined parameters includes performing an inquiry to another device connected to the device performing the verification detection. For example, an inquiry message is sent to another device to detect the parameter. In another example, a ping message or a request for information may be sent. In some embodiments, detecting the determined parameters includes obtaining a received message from a connected node/device identifying a parameter/status. For example, a Link Layer Discovery Protocol (LLDP) message is received from a peer switch and this message is reported/analyzed to perform verification.

At 1408, the detected parameters are reported. For example, one or more of the detected parameters are detected by one or more agents (e.g., an agent of the management server 902 that is tasked with performing the verification) and stored in one or more nodes of the graph representation. In some embodiments, reporting the detected parameters includes performing an analysis to determine a verification result. For example, one or more detected parameters are detected by agents that are triggered by a change to parameters of a node of the graph model and the call-back function of the agent performs a comparison with one or more expected values of the parameters to determine whether the expected values have been detected and an identification of the result of the comparison is included in a report. In some embodiments, reporting detected parameters includes determining, using a call-back function of an agent triggered by an associated triggering pattern, a summary of one or more of the detected parameters. For example, the detected parameters are categorized, organized, analyzed, tallied, and/or statistically analyzed and one or more results are included in a provided report.

In some embodiments, reporting detected parameters includes storing a report in one or more nodes of the graph representation and/or providing the report to a user. In some embodiments, the report includes a determined aggregated summary/count of one or more parameters. For example, the number of interfaces that are active, inactive, expected, etc. is determined and included in the report in addition to a listing of individual status/parameters (e.g., status identifier, status last update time, etc.) of each interface. In another example, the number of sessions (e.g., BGP sessions) that are active, inactive, expected, etc. is determined and included in the report in addition to a listing of individual status/parameters (e.g., session state, status last update time, source/destination IP address/ASN, etc.) of each session. In some embodiments, the report includes identification of LLDP messages and one or more parameters (e.g., identification of sending/receiving interfaces and devices, message timestamps, etc.) of the messages that have been exchanged between the device and its peer device.

Figure 15:
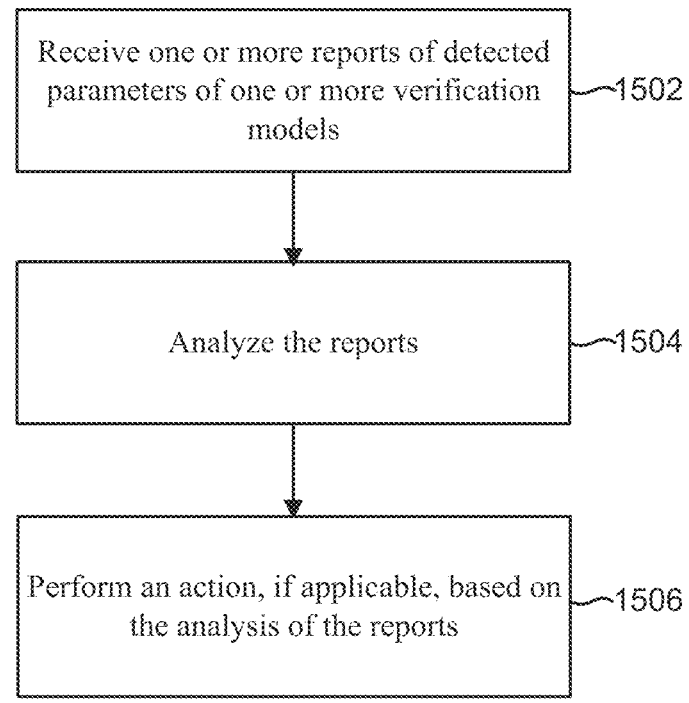
FIG. 15 is a flowchart illustrating an embodiment of a process for analyzing verification reports.

FIG. 15 is a flowchart illustrating an embodiment of a process for analyzing verification reports. The process of FIG. 15 may be implemented on management server 902 of FIG. 9. In some embodiments, at least one or more portions of the process of FIG. 15 are performed by one or more agents.

At 1502, one or more reports of detected parameters of one or more verification models are received. In some embodiments, the received reports are reports provided in 1408 from one or more different agents at one or more instances. For example, a report is received from each device that has been configured to provide a service being verified. In some embodiments, receiving the reports includes receiving the reports directly from one or more devices. In some embodiments, receiving the reports includes obtaining/receiving the reports from one or more nodes of a graph representation.

At 1504, the reports are analyzed. For example, reported data included in the received reports is correlated, compared, and otherwise analyzed to determine whether the service has been properly implemented/configured and/or is properly functioning. In some embodiments, one or more expected values and/or expected status corresponding to a properly functioning state of the service are known and the reports are analyzed to verify that the expected values/status have been detected. In some embodiments, analyzing the reports includes determining whether an error message and/or an indication of an unexpected state has been reported in the reports.

In some embodiments, an expectation associated with the received reports is verified. For example, one or more rules or tests are performed to verify that a value included in the report is as expected, specified, and/or within a range. In some embodiments, the expectation includes one or more tests to be performed to verify that a set of requirements has been successfully achieved. For example, the received set of network requirements in 1002 of FIG. 10 specifies one or more tests to be performed to verify that the set of network requirements has been successfully achieved. For example, in the L3 Clos network example discussed throughout the specification, a test to verify that routing tables have been successfully updated and leaf switch nodes are aware of neighbors to reflect the Clos network configuration is received along with the network requirements received in 1002 of FIG. 10. This test may be published by one or more agents along with the requirements in 1004 of FIG. 10 and one or more agents receive the test as the expectation for verification. In some embodiments, the expectation identifies an acceptable range for a resource utilization indicator. In some embodiments, the expectation identifies an error state of the received status.

In some embodiments, performing the analysis includes determining that throughput and/or quality of service/performance metrics are met. In some embodiments, performing the analysis includes determining whether all required connections between devices to provide the desired service have been properly configured/detected across all reports from the devices providing the service. For example, rather than merely checking each report in isolation, data reported in multiple reports from different devices are correlated to determine that connection data/parameters between two devices that are supported to be connected match to create a valid connection. In some embodiments, performing the analysis includes determining whether one or more parameters/connections that are extraneous (or not supposed to exist to provide the desired service) exist. In some embodiments, performing the analysis includes verifying isolation of domains and/or ensuring that one domain is not over utilizing resources.

At 1506, an action, if applicable, is performed based on the analysis of the reports. In some embodiments, no action is performed if the data included in the received reports is as expected, specified, and/or within a range. For example, it is determined that the service is properly functioning and/or has been properly configured. In some embodiments, it is determined that the service is not properly functioning and/or has not been properly configured and a message is provided to indicate this error (e.g., via an agent). In some embodiments, an expectation identifies the responsive action to be performed based on the data of the received reports. In some embodiments, performing the action includes reporting a data of the reports. For example, a result of a test is reported (e.g., report a result of a test to verify that the set of network requirements has been successfully achieved). In some embodiments, reporting the data of the reports includes summarizing data of the reports. Reporting the data of the reports may include providing the report/status to an agent (e.g., the agent may provide the report/status to a user).

In some embodiments, performing the action includes configuring, moving, removing, and/or adding a device of a network and/or a process/program of a device of the network. For example, an agent generates instructions (e.g., publishes device requirements to a system data store for an agent to implement on a device) to automatically mitigate/fix an error indicated by the status (e.g., repair/replace device that has encountered an error). In one example, when an agent provides a status update that its associated device is overloaded, the agent may add a new device to a network to offload processing and/or move a processing task of the overloaded device to another network device. The collected status information may be provided by an agent as a report and/or a request for action.

In some embodiments, performing the action includes allowing an agent that is configured to perform the action to perform the action. For example, an agent that has determined that the received status indicates that the action should be performed informs another agent (e.g., due to detecting of a triggering pattern of the agent) to perform the action.

Figure 16:
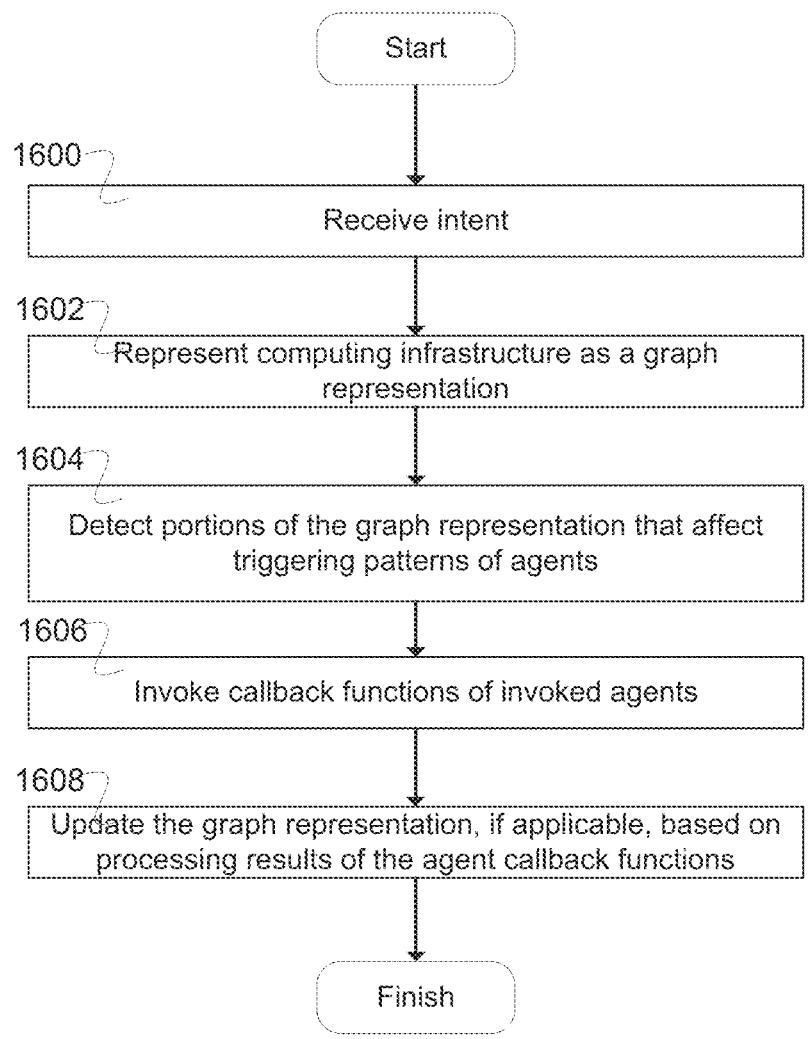
FIG. 16 is a flowchart illustrating an embodiment of a process for automatically configuring a computing infrastructure using a graph model.

FIG. 16 is a flowchart illustrating an embodiment of a process for automatically configuring a computing infrastructure using a graph model. At 1600, intent is received. The intent comprises a desired computing infrastructure configuration. The intent may specify a desired service, a reference architecture, and/or a network requirement. In some embodiments, the intent includes the set of requirements received in 1002 of FIG. 10. In some embodiments, the intent is a result of a business rule change initiated by a network operator or an operational status change (e.g. a network component is disabled). At 1602, computing infrastructure is represented as a graph representation. In some embodiments, business rules and policy elements are also represented in the graph representation. For example, the intent is processed to determine a graph of nodes and edges in implementing the intent. In some embodiments, network devices are represented by nodes whereas relationships between devices are represented by edges. In various embodiments, policies, rules, interfaces, abstract information, or any other appropriate network configuration information is represented in the graph via nodes and edges. In the event the intent indicates a change to an existing network configuration, the intent may be processed and represented as changes to an existing graph model (e.g., by modifying nodes or relationships, deleting nodes or relationships, or adding nodes or relationships). In the event the intent is a first indication of intent for a network, a new graph model may be created based on the intent. In some embodiments, the network is not deployed until sufficient configuration parameters are indicated in the intent. For example, network devices may be configured but not taken online.

At 1604, portions of the graph representation that affect triggering patterns of agents are detected. For example, an agent is associated with a specific triggering pattern of interrelated nodes and edges. In some embodiments, a triggering pattern is written in a programming language (e.g., Python, PERL, Java, etc.). A triggering pattern may describe a portion of a graph model. In some embodiments, a triggering pattern defines an attribute of a node or edge (e.g., type, property, or tag). In some embodiments, a triggering pattern defines nodes and edges of specific types and defines how the nodes and edges are interrelated in a specific configuration. Changes to the graph representation may cause a specific pattern to occur in the graph representation that was not previously present, invoking an agent associated with the specific pattern. For example, an agent is invoked based on detection of a specified chain of nodes and relationships of specific types and in a specific order indicated by the pattern. In some embodiments, a triggering pattern associated with an agent matches at least a portion of the graph representation prior to a change to the graph representation and the change to the graph representation modifies (e.g., changes or deletes) the portion of the graph representation that previously matched the triggering pattern. This may result in invocation of the agent in response to detecting that the matching graph representation portion has been modified. For example, the pattern may specify a specific configuration of two specific types of linked nodes and this pattern is detected in the graph representation. A change to a property of any node of the graph representation belonging to a graph portion matching a pattern may invoke the callback function associated with the pattern. In another example, a removal of any element of a portion of the graph representation that used to match a triggering pattern invokes that agent associated with the triggering pattern.

At 1606, callback functions of invoked agents are invoked. In some embodiments, an agent is associated with a triggering pattern and a callback function. In the event a triggering pattern of an agent is detected, the agent is invoked and a callback function associated with the agent is invoked. The callback functions execute commands (e.g., to implement at least a portion of the intent). For example, the graph model is updated and network devices are configured by the callback functions triggered by detected changes to the appropriate portions of the graph representation associated with triggering patterns. In some embodiments, using a publish-subscribe model of triggering patterns and callback functions, changes to the network configuration are able to be implemented incrementally.

At 1608, the graph representation is updated, if applicable, based on processing results of the agent callback functions. In some embodiments, a callback function causes modifications, additions, or deletions of nodes or edges in the graph representation. The graph representation is updated based on any changes caused by agent callback functions. In some embodiments, the changes to the graph representation caused by the callback function invoke one or more additional callback functions. In some embodiments, the graph representation accurately represents the network configuration at any given time. Changes to the network configuration may be implemented by changing the graph representation, wherein changing the graph representation triggers agents to perform callback functions that execute the changes.

Figure 17:
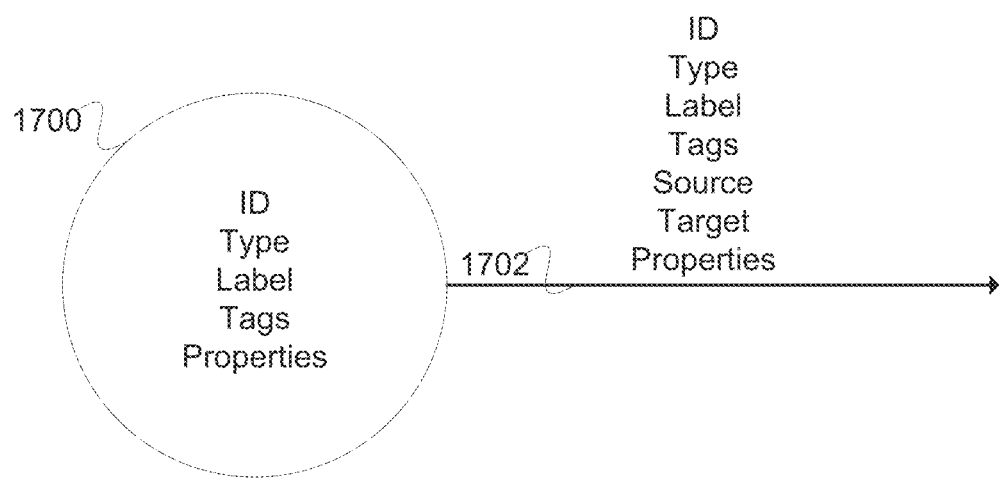
FIG. 17 is a block diagram illustrating an embodiment of a node and an edge that may be included in a graph model.

FIG. 17 is a block diagram illustrating an embodiment of a node and an edge that may be included in a graph model. In some embodiments, a graph model of computing infrastructure is comprised entirely of nodes and edges. All nodes may share the same structure whereas edges share the same structure. In the example shown, node 1700 comprises multiple attributes comprising an identifier (ID), a type, a label, tags, and properties. In some embodiments, an ID comprises a unique identifier such as a string or integer. An ID may be used to identify the node in a graph representation and distinguish it from other nodes and edges. In some embodiments, type describes an immutable type that the node is classified as. Type may be a string. In various embodiments, a node is of type server, switch, policy, rule, user, or any abstract concept. In some embodiments, label is a user-friendly caption used to identify the node. Label may be a string. For example, a node may be labeled "server3" in the event it is type server and it is the third server present in the network. In some embodiments, tag is a flexible identifier used to group network components together. For example, a tag is used by a user to encode a group that cannot be grouped based on type. A tag may be used to encode a group not available in a graph schema associated with the graph representation. A tag may be used to group together a subset of nodes of a same type, a group of edges of different types, or any combination of nodes and edges. The tag may be a user-friendly format, such as a string (e.g., "high availability servers"). In some embodiments, properties comprise properties of the node or data associated with the node. In some embodiments, properties comprise a key-value list of any data desired to be associated with the node. For example, properties may comprise information relating to a computer memory size or server speed. Properties may comprise telemetry data.

As shown, edge 1702 comprises multiple attributes comprising an ID, a type, a label, tags, a source, a target, and properties. In some embodiments, an edge in a graph representation of a network configuration comprises the same attributes as a node in the graph representation (e.g., ID, type, label, tags, properties) with the addition of a source and target.

In some embodiments, an ID comprises a unique identifier such as a string or integer. An ID may be used to identify the edge in a graph representation and distinguish it from other nodes and edges. In some embodiments, type describes an immutable type that the edge is classified as. Type may be a string. In various embodiments, an edge is of type "link," "interfaces," "hosted on," "applies to," or any abstract concept. In some embodiments, label is a user-friendly caption used to identify the edge. Label may be a string. For example, an edge may be labeled "hosted_on" because the edge is of type "hosted on." In some embodiments, tag is a flexible identifier used to group network components together. For example, a tag is used by a user to encode a group that cannot be grouped based on type. A tag may be used to encode a group not available in a graph schema associated with the graph representation. A tag may be used to group together a subset of edges of a same type, a group of nodes of different types, or any combination of nodes and edges. The tag may be a user-friendly format, such as a string (e.g., "open_connections"). In some embodiments, properties comprise properties of the edge or data associated with the edge. In some embodiments, properties comprise a key-value list of any data desired to be associated with the edge. For example, properties may comprise information relating to a computer memory size or server speed. Properties may comprise telemetry data.

In some embodiments, an edge is directional and represents a relationship between two nodes. In some embodiments, source refers to an edge's source/originating node and target refers to an edge's target/destination node. Source and target may consist of strings that refer to nodes in the graph representation. For example, a source and a target of an edge in a graph model comprise IDs of nodes present in the graph model. An edge may represent a one-way relationship between two nodes. Multiple edges may exist between two nodes. For example, a switch node (e.g., node of type "switch") has a relationship of hosting an interface node (directional from switch node to interface node) whereas the interface node has a relationship of "hosted_on"

in regards to the switch node (directional from interface node to switch node). As shown, edge 902 is directional, wherein node 900 is its source and its target is a node that it points to. In a network configuration graph representation, each edge may have a source and target node.

In some embodiments, not all attributes (e.g., ID, type, tag, etc.) are required to be specified in creation of a node or edge. Default attributes may be used. For example, given a source and target, an edge type may be inferred. In some embodiments, an edge type is inferred based on node types of the source and target. In some embodiments, an ID and label are randomly generated and/or automatically generated. For example, a label may be incremented to label nodes "server_1," "server_2," and so forth as nodes of type "server" are created. Properties may be determined based on type. A default setting for tags may comprise no tags.

In some embodiments, the graphical representation allows diverse concepts to be represented with flexibility while the structure of graph elements remains static. The graphical representation may allow for a robust and scalable system. For example, a node of type policy may comprise properties describing the policy as using a specific resource pool. An edge of type "policy_applies_to" with the node of type "policy" as a source and a node of type "switch" as a target represents that the policy is implemented on a switch. An agent with a triggering pattern of an edge of type "policy_applies_to" with a source node of type "policy" and a target node of type "switch" may invoke an agent that implements the policy in the event a portion of the graphical representation matches the pattern of edge of type "policy_applies_to" with a source node of type "policy" and a target node of type "switch."

In some embodiments, telemetry data collected during use and execution of the computing infrastructure is mapped to corresponding graph elements to provide (e.g., visually) a representation of the telemetry data in the graph model format. In some embodiments, properties of nodes or edges comprise telemetry data gathered from devices. For example, amount of traffic sent/received, number of errors, fan speed, temperature, number or type of control processes running, or any other appropriate operational data is stored. In some embodiments, the graph model is updated with real-time telemetry data. A user may use a query language (e.g., GraphQL) to access telemetry information or other information in the network configuration graph. In some embodiments, telemetry information is read-only. Telemetry data may be stored in a key-value format wherein a key comprises a parameter (e.g., fan speed) and a value comprises a measured parameter value (e.g., fan speed in rotations per millisecond).

Figure 18A:
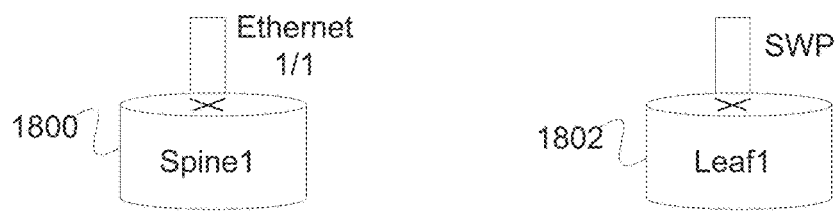
FIG. 18A is a diagram illustrating an embodiment of network devices.

FIG. 18A is a diagram illustrating an embodiment of network devices. Two switches are shown. In some embodiments, the two switches may be connected via a cable between the two. In some embodiments, the example shown is a network configuration desired by a user. For example, the intent may specify two switches with a cable connecting the two. As shown, switch 1800 is labeled "spine1" and switch 1802 is labeled "leaf1." As shown, an interface of switch 1800 is labeled "Ethernet 1/1" and an interface of switch 1802 is labeled "SWP."

Figure 18B:
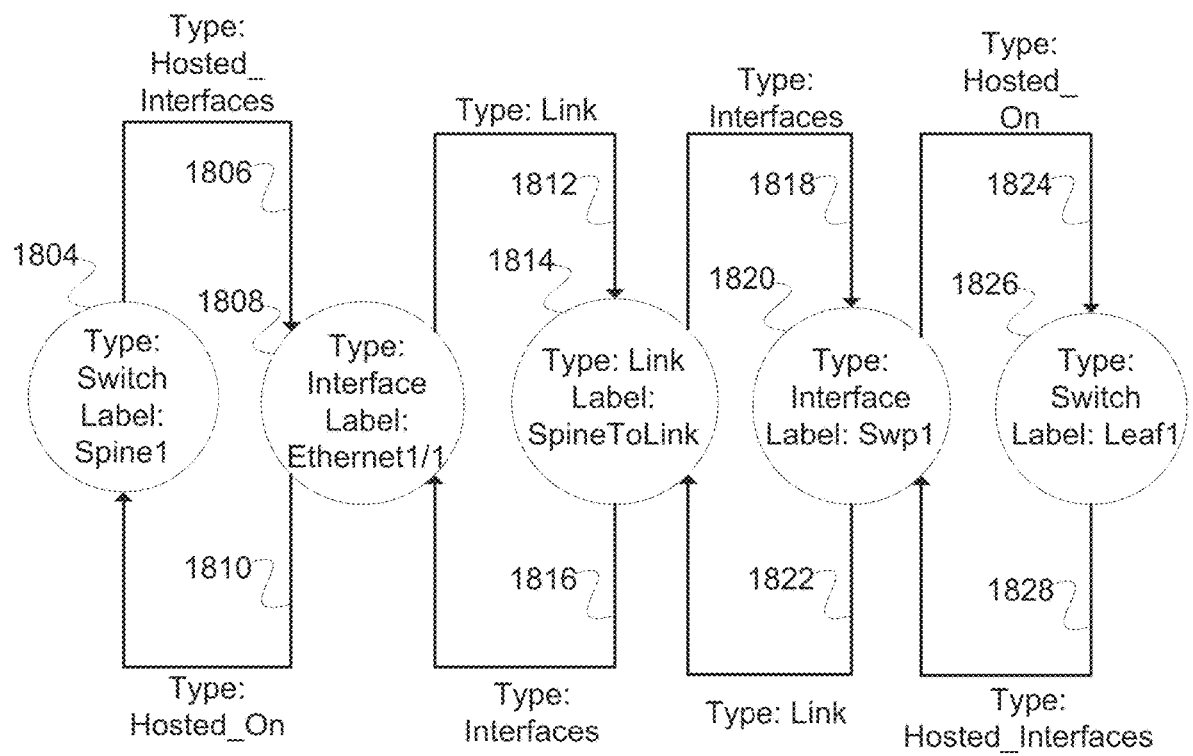
FIG. 18B is a diagram illustrating an embodiment of a portion of a graph model.

FIG. 18B is a diagram illustrating an embodiment of a portion of a graph model. In some embodiments, the graph model portion represents the network device configuration of FIG. 18A. Node 1804 is of type "switch" and label "spine1" and represents switch 1800 of FIG. 18A. Node 1826 is of type "switch" and label "leaf1" and represents switch 1802 of FIG. 18A.

Node 1808 as shown is of type "interface" and label "Ethernet 1/1." Edges 1806 and 1810 describe the relationship between the Ethernet 1/1 node (1808) and spine1 node (1804). Edge 1806 of type "hosted_interfaces" has node 1804 as a source node and node 1808 as a target node. Edge 1810 of type "hosted_on" has node 1808 as a source node and node 1804 as a target node. Node 1820 is of type "interface" and label "swp1." Edges 1824 and 1828 describe the relationship between the leaf1 node (1826) and swp1 node (1820). Edge 1824 of type "hosted_on" has node 1820 as a source node and node 1826 as a target node. Edge 1828 of type "hosted_interfaces" has node 1826 as a source node and node 1820 as a target node.

Node 1814 is of type "link" and label "spineToLink." The node has relationships with the interfaces of the spine1 node and leaf1 node. Edges 1812 and 1816 describe the relationship between the Ethernet 1/1 node and the spineToLink node. Edge 1812 of type "link" has node 1808 as a source node and node 1814 as a target node. Edge 1816 of type "interfaces" has node 1814 as a source node and node 1808 as a target node. Edges 1818 and 1822 describe the relationship between the swp1 node and the spineToLink node. Edge 1822 of type "link" has node 1820 as a source node and node 1814 as a target node. Edge 1818 of type "interfaces" has node 1814 as a source node and node 1820 as a target node.

FIG. 18C is an example of a triggering pattern. The example shows a triggering pattern expressed in a programming language (e.g., Python). In the example shown, a specific combination and order of specific nodes and edges is defined. Any appropriate programming language may be used to define a triggering pattern. In some embodiments, the example shown describes a part of the graph model portion shown in FIG. 18B. For example, "node (type='switch')" at 1860 describes node 1804 of FIG. 18B, ".out('hostedinterfaces')" at 1862 describes edge 1806 of FIG. 18B, and ".node('interface')" at 1864 describes node 1808 of FIG. 18B.

The triggering pattern as shown defines outgoing relationships from left (node 1804 of FIG. 18B) to right (node 1826 of FIG. 18B) as shown in FIG. 18B, whereas outgoing relationships from right to left as shown in FIG. 18B are not described. For example, the triggering pattern describes only a part of the graph model portion shown in FIG. 18B. In some embodiments, an agent associated with the triggering pattern shown is invoked in the event the graph model portion shown in FIG. 18B is detected in, added to, modified in, or deleted from a graph model.

FIG. 18D is an example of a triggering pattern. In some embodiments, one or more relevant data structures are specified in the triggering pattern. The one or more relevant data structures may be specified using labels (e.g., label attributes of nodes or edges). In some embodiments, a callback function associated with the triggering pattern is called with a reference to a data structure that is specified in the triggering pattern (e.g., by label). For example, in the event a portion of a network configuration graph matches a triggering pattern of an agent, the agent is provided a path to a specific node or edge. In some embodiments, the specific node or edge is present in the portion of the graph model that matches the triggering pattern. The agent's callback function is called with the reference or path to the specific node or edge, allowing the function to be implemented on the specific node or edge. For example, a callback function comprises a label in the callback function that matches a label in the triggering pattern. The label allows the callback function to execute an action on a node or edge in the graph model, wherein the node or edge in the graph model matches the labeled node or edge in the triggering pattern. The use of a graph model and the label attribute allows a reference to a data structure to be easily passed on. In some embodiments, the callback function is called with multiple references to multiple data structures.

In the example shown, the triggering pattern defines "node(type='switch', label='local_device')" at 1880. In some embodiments, in the event a portion of the graph representation matches the triggering pattern, a node that matches the node defined at 1880 is labeled as "local_device." A callback function associated with an agent that is associated with the triggering function is defined with "local_device" as an input. A reference to the node in the graph representation that matches the node defined at 1880 is passed to the callback function in the event the callback function is invoked.

Figure 19:
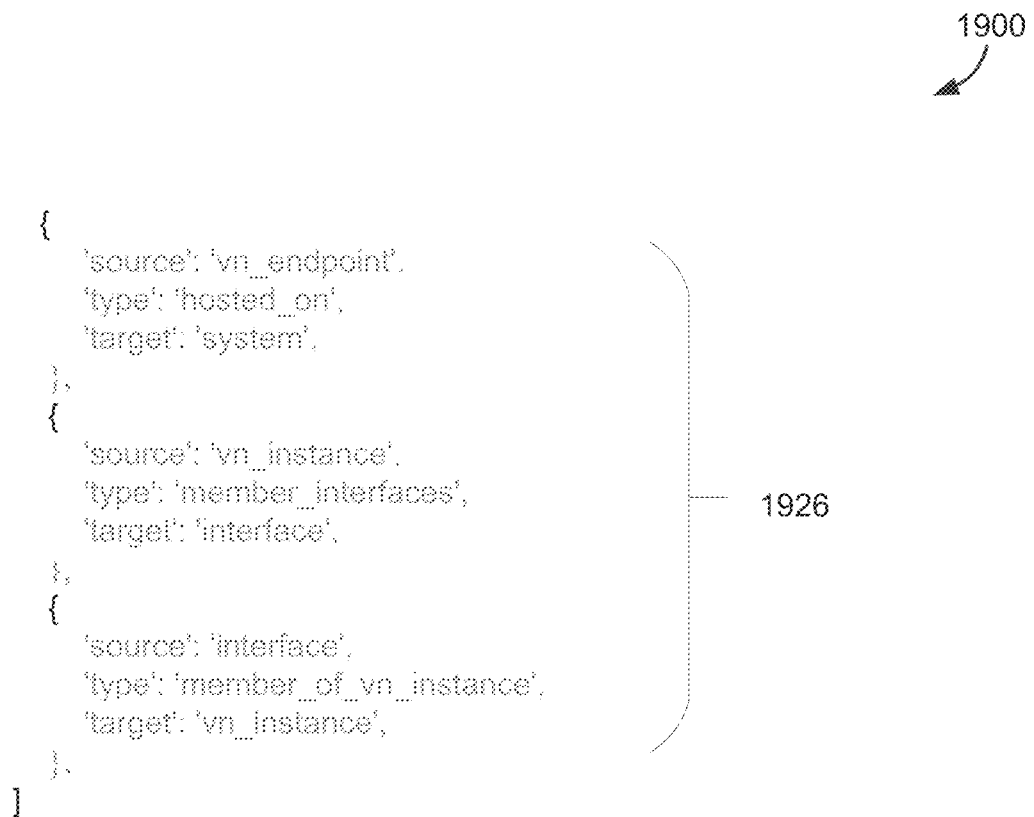
FIG. 19 shows an example of a model schema (e.g., in Python format) for a graph model.

FIG. 19 shows an example of a model schema (e.g., in Python format) for a graph model. In some embodiments, a graph model of a network has an associated graph model schema. Valid nodes, edges, and relationships between nodes and edges may be defined in the schema. For example, only nodes of a first type may be allowed to share an edge with nodes of a second type. Invalid relationships or nodes may invoke a callback function. For example, the callback function may provide an error to a user or discard the last received change in intent. The schema may be domain-specific; different schemas may exist for different network architectures.

Model schema 1900 is written in Python, but any computer language may be used to implement the model schema. The example shows a graph model schema for typical leaf-spine network architecture. The disclosed system may treat individual design schemas as opaque and operates only at the graph meta model comprising of just nodes and relationships. As shown, model schema 1900 describes allowed data types and values. As shown, 1920, 1922, 1924, and 1926 comprise allowed relationships under the schema. For example, an edge of type "composed_of" must have a source node of type "link" and a target node of type "link." An edge of type "part_of" must have a source node of type "link" and a target node of type "link." An edge of type "hosted_interfaces" must have a source node of type "system" and a target node of type "interface."

Figure 20A:
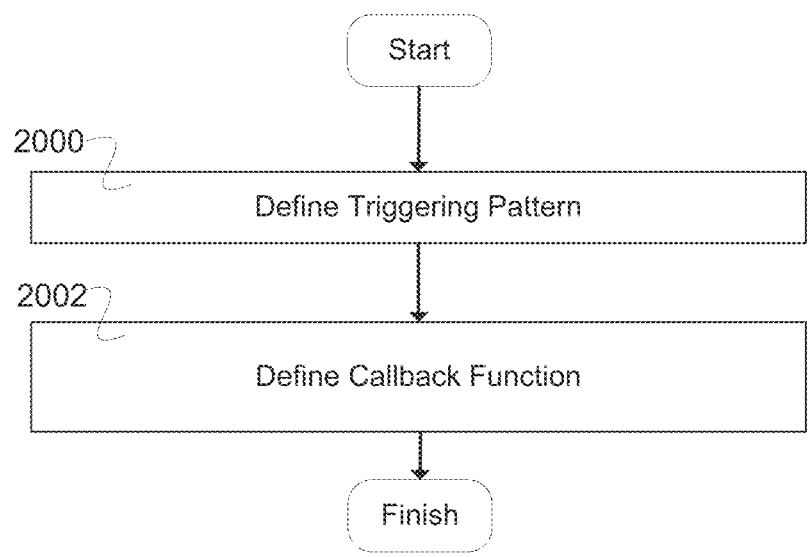
FIG. 20A is a flowchart illustrating an embodiment of an agent creation flow.

FIG. 20A is a flowchart illustrating an embodiment of an agent creation flow. In some embodiments, an agent is created to perform a callback function based on a triggering pattern. Multiple agents, each tracking a different triggering pattern, may work together to configure the network appropriately based on changes in a graph model of computing infrastructure. In some embodiments, a modular method of using separate agents increases efficiency in processing changes in intent.

In some embodiments, a set of pre-created agents is associated with a specific network architecture (e.g., leaf-spine architecture). For example, a set of agents and a schema may be associated with a network with leaf-spine architecture. Each network architecture type may have a corresponding schema and set of agents. In some embodiments, a schema or set of agents is customized for a network. Features may be added to the network configuration system by creating or modifying agents. For example, the system may be easily scaled by writing logic to add agents.

The example shown illustrates a process to create an agent. At 2000, a triggering pattern is defined. The triggering pattern may comprise a portion of a graph model of computing infrastructure. An agent may be triggered by edges, nodes, properties, or any aspect of the network configuration graph. In some embodiments, an agent comprises multiple triggering patterns. In some embodiments, each agent has a single triggering pattern. An agent may inject its triggering pattern as a query to a query engine in the management server (e.g., management server 902 of FIG. 9). At 2002, a callback function is defined. In some embodiments, the callback function defines an action to be taken based on the triggering pattern. For example, an agent may be associated with a triggering pattern of a node of type "link" and with a callback function that assigns an IP address. The agent may cause a callback function to assign an IP address in the event a node of type "link" is added to the graph model. In some embodiments, a callback function takes nodes or edges of the graph model as input. For example, the function is executed based at least in part on a node or edge in a portion of the graph model that matches the triggering pattern.

In some embodiments, an agent comprises a collection of callback functions. For example, different functions may be executed based on whether a portion of a graph model associated with the triggering pattern was added to, modified in, or deleted from the graph model (e.g., whether a portion of the graph model is changed to match the triggering pattern, a property of an edge or node in a portion of the graph model that matches the triggering pattern is changed, or a portion of the graph model matching the triggering pattern is changed to no longer match the triggering pattern). The agent may store multiple functions, wherein the functions are executed based on a type of change in a portion of a graph model associated with the triggering pattern (e.g., "added," "modified," or "deleted"), a type of a changed data structure, a position of a changed data structure, a reference/path to a data structure, or any other factor. For example, a triggering pattern may comprise a node of type device with an edge of type link connecting it to a node of type link. One callback function may define an action to be executed in the event the node of type device changes properties, whereas another callback function defines an action to be executed in the event the node of type link is deleted. In the event a triggering pattern defines a pattern comprising two nodes of a same type, different callback functions may be called based on which node is changed.

Agents may serve various roles in configuring the network. In some embodiments, a resource allocation agent is associated with a triggering pattern that represents one or more network elements that require resources to be allocated when the one or more elements are present in a network. A callback function associated with the resource allocation agent may execute actions that allocate resources required for the one or more network elements. For example, a networking configuration graph may be changed to add a cable to the network. A resource allocation agent associated with a triggering pattern of the specific nodes and edges that are created to add a cable is invoked. A callback function associated with the resource allocation agent is invoked, causing allocation of resources required for the cable.

In some embodiments, an agent is used to determine whether changes in the graph are consistent with a graph schema associated with the graph. A semantic validation agent may determine whether the graph is ready for downstream processing based on the graph schema. In the event the graph does not fulfill rules stated in the graph schema, the changes may be inapplicable. For example, certain device configurations cannot be rendered in the event IP addresses are unassigned or invalid. For example, a semantic validation agent may be associated with a triggering pattern of an edge type "instantiated by." The graph schema may indicate that edges of type "instantiated_by" must have a source node of type "virtual_network" and a target node of type "vn_instance." In the event an edge of type "instantiated by" is added to the graph model, the semantic validation agent may be triggered. An associated callback function of the semantic validation agent may determine whether a source node of the edge is of type "virtual network" and whether a target node of the edge is of type "vn_instance." In the event the source and target nodes are not of expected types as defined in the graph schema, an error message may be provided to a user.

In some embodiments, an agent performs checks associated with a triggering pattern once the pattern is detected. For example, an agent performs a check on nodes and edges surrounding a node of type "switch" to ensure required nodes and edges are present. In some embodiments, an agent raises alerts or adjusts the network configuration in the event a network component is operating at undesired ranges. For example, an agent is associated with a triggering pattern of a property of a node of type "server." In the event a change in a property of the node indicates the server is operating at a high temperature, an associated callback function of the telemetry data agent may be invoked to shut down the server associated with the node of type "server."

Figure 20B:
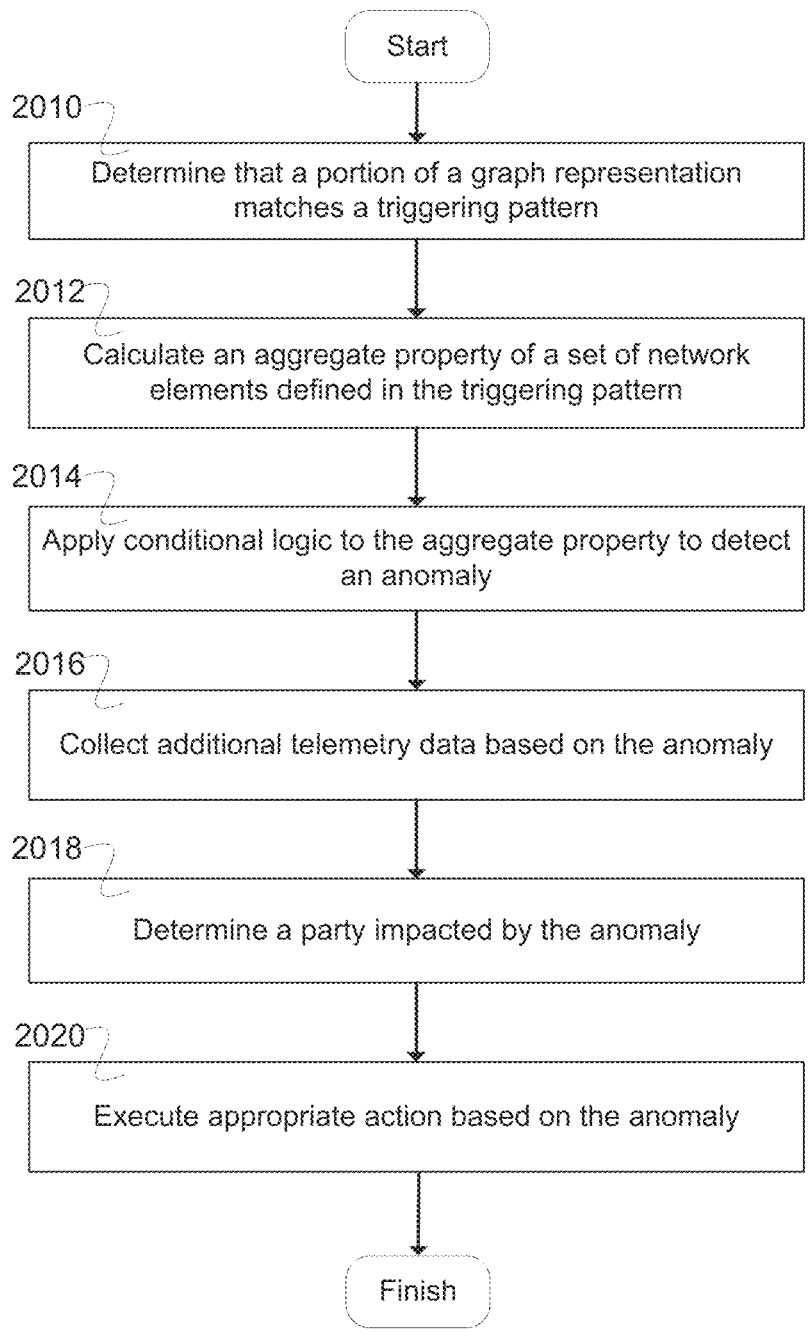
FIG. 20B is a flow diagram illustrating an embodiment of a process to detect and respond to an anomaly.

FIG. 20B is a flow diagram illustrating an embodiment of a process to detect and respond to an anomaly. In some embodiments, the system is used to collect network telemetry data, analyze the network, and respond appropriately in a closed loop. Anomalies, actionable signals, impact analysis, or any other appropriate information may be extracted from raw telemetry data. For example, detecting a service, device, or functional component outage (e.g. via telemetry data) is followed up with a determination of affected consumers or a determination and collection of additional telemetry data collection required. Based on the analysis, appropriate actions to inform impacted parties or remedy the anomaly may be executed.

At 2010, it is determined that a portion of a graph representation matches a triggering pattern. In some embodiments, the triggering pattern defines a set of managed network elements, wherein the managed network elements are monitored for an anomaly. For example, the triggering pattern comprises a set of links that traffic belonging to a specific virtual network of a specific tenant traverses. At 2012, an aggregate property of the set of network elements is calculated. In various embodiments, a standard deviation, minimum, maximum, average, or any appropriate statistic or property is calculated. For example, a recent history time series for the traffic on each link may be created and run through a watermark aggregator to determine the number of links running over 80% utilization for more than 30 seconds. At 2014, conditional logic is applied to the result to detect an anomaly. In some embodiments, pre-defined conditional logic comprises a threshold value (e.g. maximum or minimum) for the aggregate property and an anomaly is detected in the event the calculated aggregate property is abnormal based on the threshold value. For example, an anomaly is generated in the event more than five percent of links in the set of links are running over 80% utilization for more than 30 seconds. At 2016, additional telemetry data is collected based on the anomaly. For example, a complete set of tenants that contribute to traffic on the set of links is determined. At 2018, a party impacted by the anomaly is determined. For example, other virtual networks and tenants that are impacted by the anomaly are identified. At 2020, appropriate action based on the anomaly is executed. For example, traffic is redirected to different links or impacted tenants are asked to decrease utilization of the links.

In some embodiments, the closed-loop telemetry collection, analysis, and response process is automated. In some embodiments, the aggregate property of the set of network elements is continuously monitored based on a time interval (e.g. calculated every five seconds).

In some embodiments, an agent is associated with a triggering pattern that defines a set of managed elements. In some embodiments, the triggering pattern also defines a property of the set of managed elements. For example, "transmitted_bytes," referring to a number of transmitted bytes, is a property of a node of type "link." An agent's associated triggering pattern specifies transmitted bytes of a set of links that traffic belonging to a specific virtual network of a specific tenant traverses by specifying the "transmitted_bytes" property of the set of links. In some embodiments, a function is executed based on a property specified in the triggering pattern to calculate an aggregate property. For example, the agent associated with a triggering pattern that specifies the "transmitted bytes" property of a set of specified nodes of type "link" is associated with a callback function that determines the percentage of links (out of links represented by the set of specified nodes of type "link") running over 80% utilization for more than 30 seconds.

In some embodiments, the agent is associated with a set of functions that calculate an aggregate property of the managed elements, apply conditional logic to the aggregate property, detect an anomaly, and store the anomaly data (e.g. information relaying an anomaly exists or relaying details on the anomaly, such as percentage of links that are running over 80% utilization for more than 30 seconds) in the graph representation. For example, a callback function may determine whether the percentage of links running over 80% utilization for more than 30 seconds is over a threshold. In the event the percentage is determined to be over the threshold, an anomaly may be determined to exist and the anomaly data stored. For example, anomaly data is stored as a property of a node (e.g. "aggregated_traffic" is a property of a node of type "link" that refers to the percentage of links that are running over 80% utilization for more than 30 seconds). In some embodiments, the anomaly data triggers an additional agent. For example, the additional agent is associated with a triggering pattern that specifies the "aggregated_traffic" property of a set of links that traffic belonging to the specific virtual network of the specific tenant traverses. The additional agent may trigger additional telemetry. For example, a function associated with the additional agent is defined to determine a complete set of tenants that contribute to traffic on the set of links. In some embodiments, a separate agent is associated with a triggering pattern that specifies a set of impacted parties. For example, the triggering pattern specifies tenants that have virtual networks that have endpoints that are hosted on servers that are connected via links that have aggregated traffic over a threshold value (e.g. nodes of type "tenant" that share an edge with a node of type "virtual_network," wherein the node of type "virtual_network" shares an edge with a node of type "endpoint" that shares an edge of type "hosted_on" with a node of type "server," wherein the node of type "server" shares an edge with a node of type "link," wherein the node of type "link" has a property of "aggregated_traffic.") The separate agent may execute an associated function that alerts the tenants.

In some embodiments, the aggregate property is saved (e.g. as a node property) regardless of whether an anomaly is detected or not. Callback functions that are triggered based on the aggregate property may comprise conditionality (e.g. the function will not be called in the event the aggregate property value is not determined to be an anomaly).

In some embodiments, 2012, 2014, 2016, 2018, and 2020 are represented in a graph representation. In some embodiments, a workflow of processing stages (e.g. the steps described at 2012, 2014, 2016, 2018, and 2020) is represented in a directed acyclic graph. In some embodiments, each step is represented as a node. The order of the flow as shown is represented via directional edges. For example, a node of type "process_step" comprises information on calculating an aggregate property of network elements and has a directional edge that points to another node of type "process_step" comprising information on applying conditional logic to the aggregate property, causing the aggregate property calculation step to be performed before the conditional logic step. In some embodiments, the workflow of processing stages (e.g. the steps described at 2012, 2014, 2016, 2018, and 2020) is represented as a portion of a graph representation and is part of a graph representation of computing infrastructure. In some embodiments, the sequence of steps is represented in a separate graph.

Agents may subscribe to graph elements representing stages and react to them by executing processing that is required. In some embodiments, an agent is associated with a triggering pattern of graph elements representing a processing stage or step. In some embodiments, the agent has an associated callback function that executes processing that is defined or parametrized by the graph elements. For example, in the event of a request for data analytics on a specified node of type "link," a series of nodes of type "process_step" may be created that stem from the specified node of type "link." The series of nodes may comprise a single chain. For example, an edge that points from the specified node of type "link" is created and joins the specified node of type "link" with a subsequently newly created node of type "process_step," wherein the newly created node of type "process_step" has a node property that describes a formula to calculate an aggregate property. Following creation of the node of type "process_step" with a node property that describes a formula to calculate an aggregate property, a new edge that points from the aggregate property calculation node is created and joins the aggregate property calculation node with a subsequently created node of type "process_step" which has a node property that comprises a threshold value. In some embodiments, creation of the nodes of type "process_step" cause agents that are associated with triggering patterns that specify the nodes of type "process_step" to be triggered. The creation of the nodes of type "process_step" may occur one at a time, triggering the agents in a desired order.

For example, an agent with an associated triggering pattern of a property of "transmitted bytes" of the specified node of type "link" may be associated with a callback function that determines whether the specified node of type "link" has an outgoing edge that points to a node of type "process_step" and in the event the specified node of type "link" does share an outgoing edge with a node of type "process_step," saves the "transmitted_bytes" property value of the node of type "link" to a property of the node of type "process_step." The "transmitted_bytes" property value may be saved under a property of "base_calculation_value" of the node of type "process_step." In some embodiments, calculation of the aggregate property is parametrized by the triggering pattern (e.g. a property conveying transmitted bytes is defined in the triggering pattern and is used as input to calculation of percentage of over-utilized links). For example, an agent associated with a triggering pattern that specifies the "base_calculation_value" property of the node of type "process_step" may cause a callback function associated with the agent to execute a calculation of an aggregate property based on the value saved under the "base_calculation_value" property and a formula saved under a "formula" property of the node of type "process_step." In some embodiments, the aggregate property is saved as a property of the node (e.g. as an "aggregate_property" property value). In some embodiments, values are passed between processing stages by saving them as node or edge properties.

The creation of the second node of type "process_step" that has a node property that specifies a threshold value may trigger an agent that is associated with a triggering pattern that specifies a property of "threshold_value" of the node. A callback function associated with the agent may determine whether an anomaly is present based on the "threshold value" property value of the second node of type "process_step" and the "aggregate_property" property value of the first node of type "process_step." In the event an anomaly is detected, an "anomaly" property of the second node of type "process_step" may be updated to indicate that an anomaly is present. In various embodiments, processing steps are executed by various configurations of graphical elements (e.g. nodes, properties, and edges) and agents.

Figure 21A:
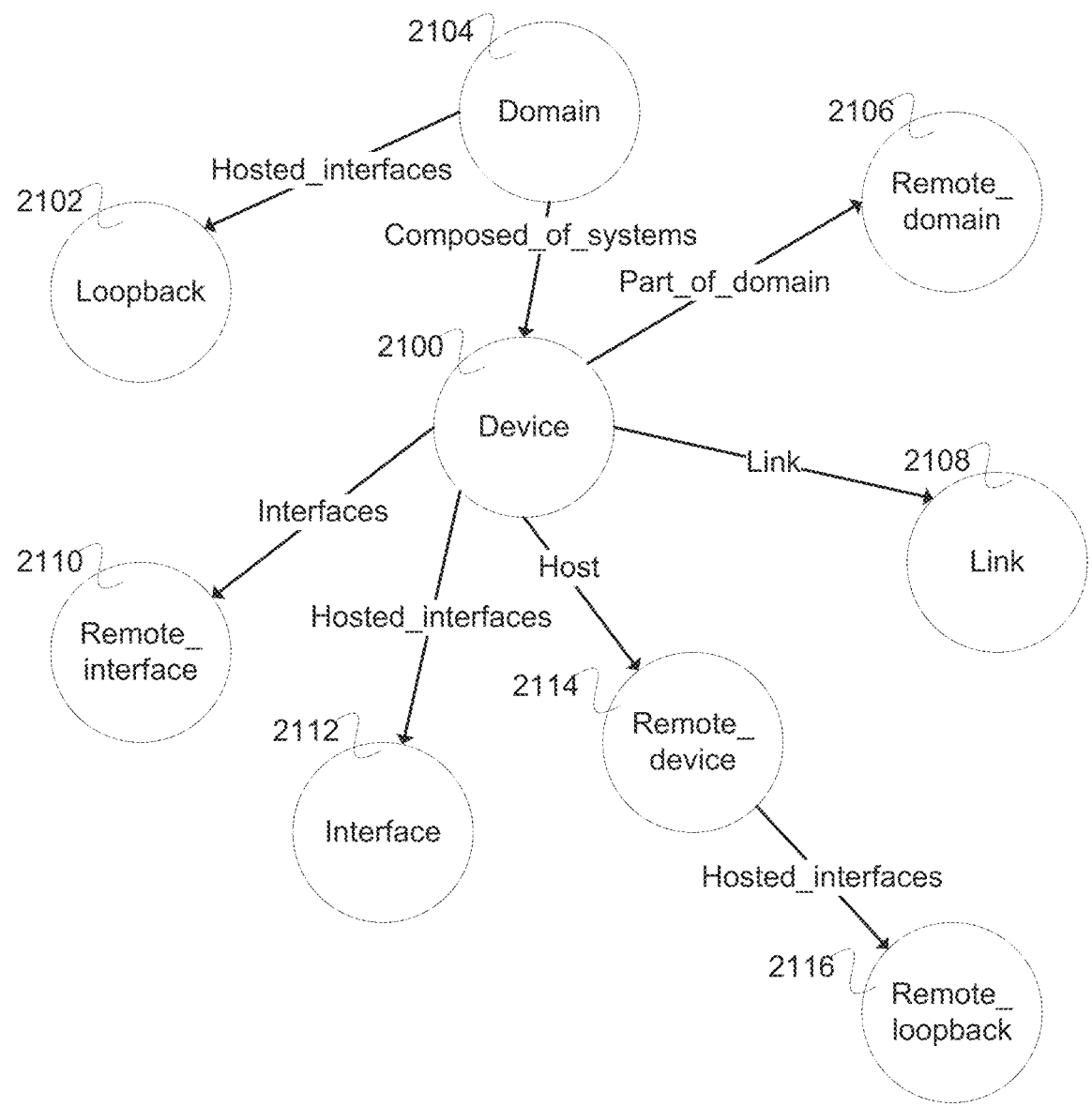
FIG. 21A is a diagram illustrating an embodiment of a portion of a graph model comprising branches.

FIG. 21A is a diagram illustrating an embodiment of a portion of a graph model comprising branches. The graph model portion illustrates a tree pattern of network devices and components. In the example, labels of nodes are shown and types of edges are shown. Domain node (e.g., node with label "domain") 2104 has outgoing edges (e.g., node 2104 is the source node of the edges) of types "hosted_interfaces" and "composed_of_systems" with loopback node 2102 and device node 2100 respectively. Device node 2100 has outgoing relationships of types "interfaces" with remote_interfaces node 2110, "hosted_interfaces" with interface node 2112, "host" with remote_device node 2114, "link" with link node 2108, and "part_of_domain" with remote_domain node 2106. Remote_device node 2114 has an outgoing edge of type "hosted_interfaces" with remote_loopback node 2116.

FIG. 21B shows an example of an implementation of an agent. In some embodiments, FIG. 21B implements an agent that is associated with a triggering pattern that matches the graph model portion shown in FIG. 21A. For example, in the event the graph model portion shown in FIG. 21A is detected in the graph model, the callback function shown will be invoked. Although the following example utilizes the Python programming language, other programming languages may be utilized in various other embodiments. In the example shown, a triggering pattern and a callback function are defined.

At 2156, the triggering pattern is defined. In the example shown, nodes labeled "domain" and "device" are defined at 2150 and 2153 respectively. The nodes correspond with nodes 2104 and 2100 as shown in FIG. 21A. In the example shown, nodes that have no outgoing edges are not separately declared outside of being part of the definition of another node. For example, "node('domain', name='domain', domain type='autonomous_system')" at 2150 declares domain node 2104 of FIG. 21A, ".out('composed_of_systems')" at 2151 defines outgoing edge of type "composed_of_systems" from domain node 2104 of FIG. 21A, and ".node('system', name='device')" at 2152 defines node

2100 of FIG. 21A as being the target node of the edge of type "composed_of_systems." In the example shown, labels are used to refer back to a defined data structure. For example, "node(name='device')" at 2153 is used to refer to the node first defined in the line reading ".node('system', name='device')" at 2152.

The code declares a node, its outgoing edges, and the target nodes of the outgoing edges. For example, the second line in the example shown declares a node of type "domain" and name (e.g., label) "domain." Lines beginning with "node" declare a node. Lines beginning with ".out," ".node," and ".where" follow a line beginning with "node" and refer to the node declared in the line beginning with "node." Lines beginning with ".out" indicate an outgoing edge from the node. Lines beginning with ".node" follow lines beginning with ".out" and indicate a target node of the edge defined in the line beginning with ".out." Lines beginning with ".where" describe details referring to nodes.

At 2170, a callback function is defined. In some embodiments, the callback function is executed in the event a portion of a graph model matching the triggering pattern defined at 2156 is added to, modified in, or deleted from the graph model.

Figure 22A:
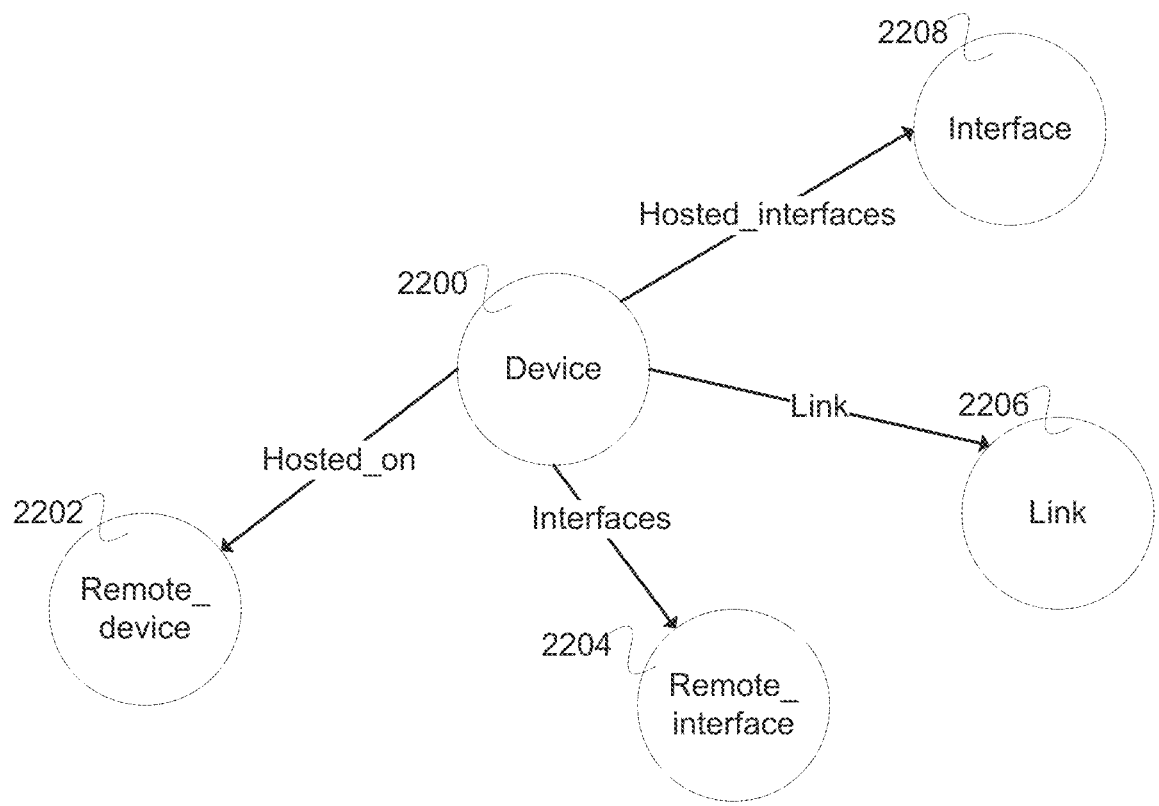
FIG. 22A is a diagram illustrating an embodiment of a portion of a graph model.

FIG. 22A is a diagram illustrating an embodiment of a portion of a graph model. Device node (e.g., node with label "device") 2200 has outgoing edges of types "hosted_on" with remote_device node 2202, "interfaces" with remote interface node 2204, "link" with link node 2206, and "hosted_interfaces" with interface node 2208.

FIG. 22B shows an example of an implementation of an agent. A class that implements the agent is identified at 2200, wherein the agent can have one or more triggering patterns. The class shown defines various reusable functions. While the example is written in Python, there are no limits on programming language features an agent uses. The triggering pattern is identified at 2220. In some embodiments, the triggering pattern matches the portion of a graph model shown in FIG. 22A. For example, "node('system', name='device')" at 2250 describes device node 2200 of FIG. 22A; ".out('hosted_interfaces')" at 2252 describes edge of type "hosted_interfaces" of FIG. 22A; and ".node ('interface', name='interface')" at 2254 describes interface node 2208 of FIG. 22A. A callback function associated with the agent is defined at 2256. In some embodiments, the callback function is invoked whenever a portion of the graph model matching the triggering pattern defined at 2220 is added to, removed from, or updated in the graph.

Figure 23:
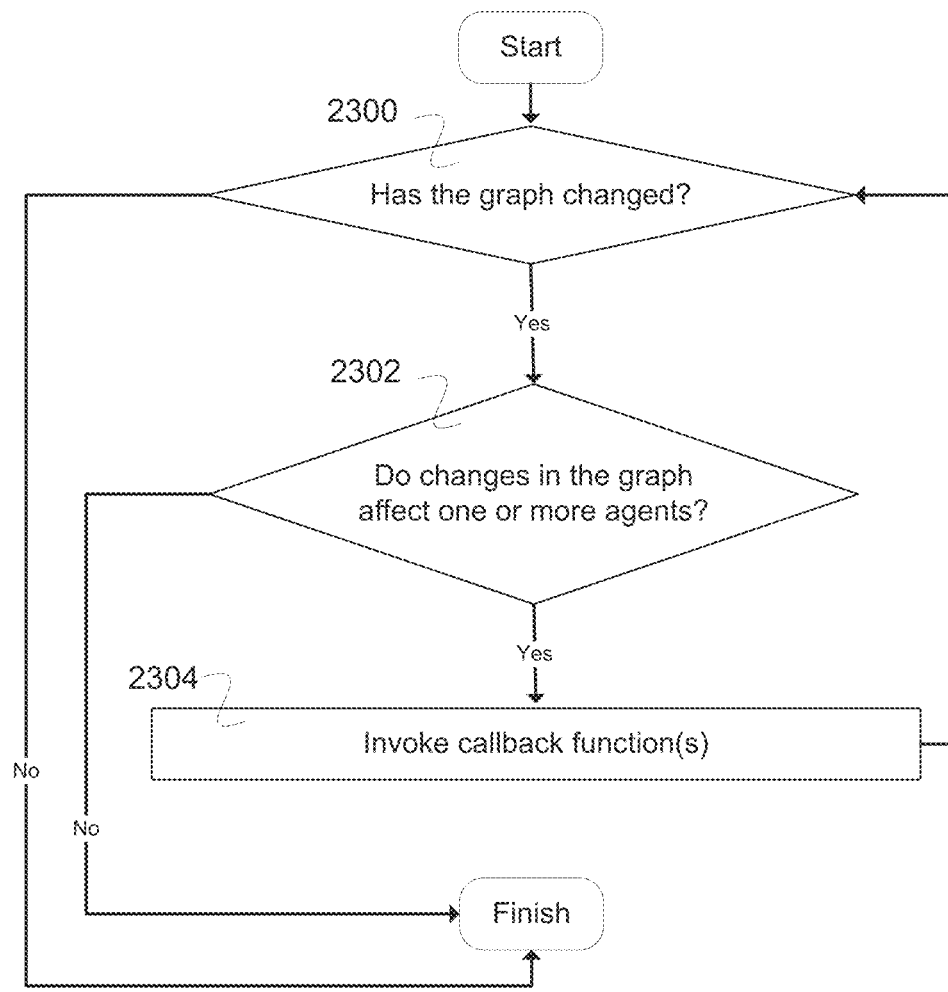
FIG. 23 is a flow diagram illustrating an embodiment of a process for invoking callback functions.

FIG. 23 is a flow diagram illustrating an embodiment of a process for invoking callback functions. In some embodiments, the process implements 1604 and 1606 of FIG. 16. In some embodiments, the process is implemented by agent manager 2402 of FIG. 24. At 2300, it is determined whether the graph has changed. The graph may change based on a received intent or based on invoked callback functions. In some embodiments, changes to the graph caused by one agent trigger another agent. In the event the graph has not changed, the process is finished. In some embodiments, the process is repeated while the network is active (e.g., desired to be configured). In the event the graph has changed, at 2302, it is determined whether changes in the graph affect one or more agents.

In some embodiments, changes to the graph representation invoke an agent in the event a portion of the graph representation associated with a triggering pattern of the agent is detected in, added to, updated in, or removed from the graph representation. In some embodiments, a detection or addition of a portion of the graph representation matching the specific triggering pattern to the graph representation occurs in the event changes to the graph representation cause a portion of the graph representation to match the specific triggering pattern, wherein the portion of the graph representation did not previously match the specific triggering pattern. For example, a portion of the graph representation matching the specific triggering pattern is detected in the graph representation in the event existing nodes and edges in the graph are modified such that a portion of the graph matches the specific triggering pattern. A portion of the graph representation matching the specific triggering pattern is added to the graph representation in the event a new graph portion matching the specific triggering pattern is added to the existing graph.

In some embodiments, a portion of the graph representation matching the triggering pattern in the graph representation is updated in the event the change in the graph representation modifies a node or edge within a portion of the graph representation that matched the specific triggering pattern prior to the change and the portion continues to match the specific triggering pattern following the change.

In some embodiments, a portion of the graph representation associated with the triggering pattern is deleted from the graph representation in the event a change to the graph representation modifies the portion of the graph representation that previously matched the triggering pattern such that the portion of the graph representation no longer matches the triggering pattern. For example, a node or edge may be deleted from the portion of the graph that previously matched the triggering pattern, a node or edge in the portion of the graph that previously matched the triggering pattern may be altered (e.g., an attribute such as type is changed), or the portion of the graph that previously matched the triggering pattern may be deleted in entirety.

In the event changes in the graph do not affect one or more agents, the process is finished. In the event changes in the graph affect one or more agents, at 2304, callback function(s) are invoked. For example, one or more callback functions associated with the one or more agents are invoked. In some embodiments, the callback function is provided an indication of whether a portion of the graph representation associated with a triggering pattern is detected in, added to, updated in, or removed from the graph representation. In some embodiments, different callback functions are called based on the indication in order to perform different actions based on the indication. For example, in the event a specific node-relationship pattern is added to the network configuration graph, the callback function allocates resources (e.g., allocating an IP address for a node of type "link"). In the event the pattern is removed, the callback function removes the resource request for the node.

Figure 24:
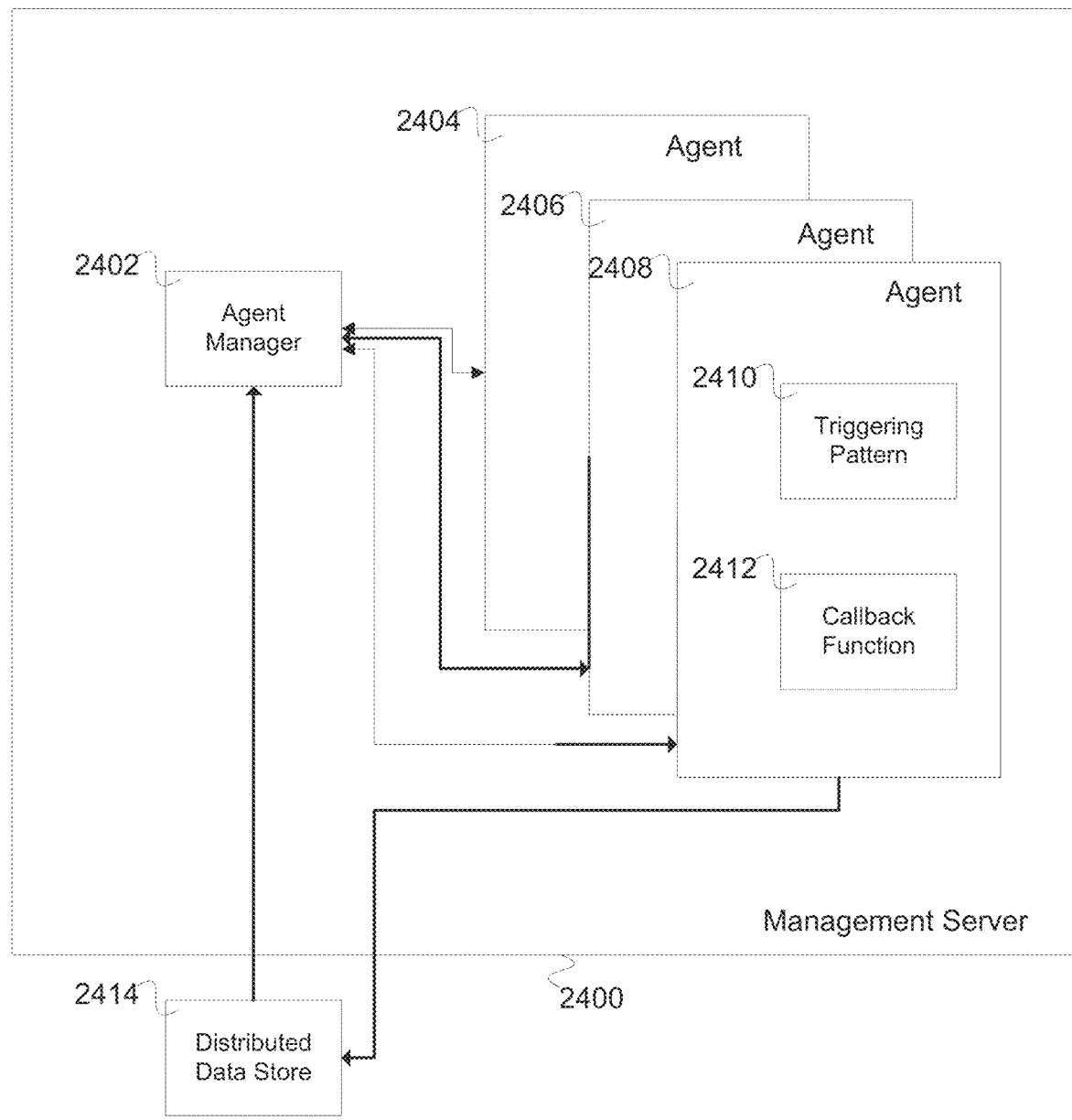
FIG. 24 is a diagram illustrating an embodiment of a management server.

FIG. 24 is a diagram illustrating an embodiment of a management server. Management server 2400 may be used to implement management server 902 of FIG. 9. In the example shown, management server 2400 comprises agent manager 2402 and agents 2404, 2406, and 2408. In various embodiments, the management server comprises 60, 200, 1000, or any appropriate number of agents. An agent may comprise a triggering pattern and corresponding callback function to be called in the event a triggering pattern is present. As shown, agent 2408 is associated with triggering pattern 2410 and callback function 2412.

In some embodiments, a central software component such as agent manager 2402 is used to track all changes to a network configuration by tracking changes to a graph representation of the network configuration, wherein the graph representation accurately represents a real-time state of the network. In some embodiments, agent manager 2402 comprises a query engine. As shown, agent manager 2402 receives inputs from distributed data store 2414. In some embodiments, the graphical representation of the network configuration is stored in the distributed data store. The inputs may comprise a current network configuration graph (e.g., graphical representation of the network configuration). In some embodiments, agent manager 2402 compares a current state of the network configuration graph to a previous state of the network configuration graph to determine changes in the graph. In some embodiments, agent manager 2402 implements 1604 (detect portions of the graph representation that affect triggering patterns or agents) of FIG. 16. In the event a network configuration graph has changed, agent manager 2402 notifies only relevant agents of the change. Relevant agents are determined based on their triggering patterns (e.g., whether a change in the graph affects a triggering pattern of an agent). For example, a "publish-subscribe" model is utilized wherein an agent is subscribed to changes in the graph that affect a triggering pattern associated with the agent. In some embodiments, agents are invoked based on triggering patterns in lieu of a central change logging component.

Various actions may be required to be performed based on the network configuration graph. In various embodiments, changes in the graph cause state to be collected from a device, a link to be deleted, a node to be created, or any other appropriate action. The actions may be performed via callback functions. In some embodiments, a query of a specific triggering pattern is run one time. After a triggering pattern is specified, an associated agent is only notified of a change in the graph in the event its triggering pattern is matched in the graph model. In some embodiments, the live querying and graphical representation allow the system to be robust and scalable. In some embodiments, the framework of the system is not changed; agents, nodes, or edges are added to implement new features.

In the example shown, agents provide input to distributed data store 2414. The agents may cause changes to the network configuration when associated callback functions are invoked. The changes may be stored in the network configuration graph. In some embodiments, agents implement 1608 of FIG. 16 (update the graph representation, if applicable, based on processing results of the agent callback functions).

Although the foregoing embodiments have been described in some detail for purposes of clarity of understanding, the invention is not limited to the details provided. There are many alternative ways of implementing the invention. The disclosed embodiments are illustrative and not restrictive.

The invention claimed is:

1. A method comprising:
    generating a model representation of faults for a network based on an intent model for the network;
    determining one or more declarative requirements for the network based on the model representation of faults for the network, wherein the one or more declarative requirements indicate a desired configuration of a plurality of network elements of the network;
    determining one or more network elements from the plurality of network elements for telemetry monitoring based on the model representation of faults for the network and the one or more declarative requirements;
    determining a symptom representation for the network based on telemetry data for the one or more network elements of the network; and
    providing the model representation of the faults and the symptom representation to a root cause analysis engine to determine one or more root causes of one or more detected symptoms of the network.

2. The method of claim 1, wherein generating the model representation of faults for the network includes representing at least a portion of the network as a graph representation of at least a portion of the set of network elements.

3. The method of claim 2, wherein the graph representation comprises a plurality of nodes and at least one edge specifying a relationship between nodes.

4. The method of claim 1, wherein the model representation of faults for the network models one or more faults associated with at least one of the following network elements: a switch, an interface, a link, or a protocol.

5. The method of claim 1, wherein generating the model representation of faults for the network comprises deriving model representation of faults for the network at least in part from a representation that at least represents connections between the set of network elements.

6. The method of claim 1, wherein at least a portion of the model representation of faults for the network is at least in part specified based on one or more network elements from a behavior specification repository.

7. The method of claim 1, wherein at least a portion of the model representation of faults for the network is specified with a collection of elements that represents more than one distinct collection of underlying network elements.

8. The method of claim 1, wherein at least a portion of the model representation of faults for the network is specified with elements that combine one or more relationships between network elements in a graph representation.

9. The method of claim 1, wherein the telemetry data is collected by one or more processing agents upon a determination that one or more triggering patterns has occurred.

10. The method of claim 1, wherein the telemetry data of the one or more network elements includes temporally aggregated data.

11. The method of claim 1, wherein the telemetry data of the one or more network elements includes data of a first network element of the set of network elements that is combined with data of a second network element of the set of network elements.

12. The method of claim 1, wherein the one or more network elements, for which the telemetry data is collected, are selected based at least in part on a service class determination for the one or more network elements.

13. The method of claim 1, wherein determining the symptom representation for the network is further based on one or more root causes associated with a lack of connectivity between two connection endpoints.

14. The method of claim 1, wherein a domain specific language specifies at least one of the following: the model representation of faults for the network, the symptom representation for the network, a behavior specification repository, or specified declarative intent for forming the network.

15. The method of claim 1, wherein the network is at least in part configured using one or more processing agents.

16. The method of claim 15, wherein one or more callback functions are used by the one or more processing agents upon a determination that one or more triggering patterns associated with the one or more callback functions has occurred.

17. The method of claim 1, wherein the set of network elements is configured based on the intent model.

18. A system comprising:
a processor configured to:
- generate a model representation of faults for a network based on an intent model for the network;
- determine one or more declarative requirements for the network based on the model representation of faults for the network, wherein the one or more declarative requirements indicate a desired configuration of a plurality of network elements of the network;
- determine one or more network elements from the plurality of network elements for telemetry monitoring based on the model representation of faults for the network and the one or more declarative requirements;
- determine a symptom representation for the network based on telemetry data for the one or more network elements of the network; and
- provide the model representation of faults for the network and the symptom representation to a root cause analysis engine to determine one or more root causes of one or more detected symptoms of the network; and a memory coupled to the processor and configured to provide the processor with instructions.

19. A non-transitory computer-readable medium comprising instructions for causing a processor to:
- generate a model representation of faults for a network based on an intent model for the network;
- determine one or more declarative requirements for the network based on the model representation of faults for the network, wherein the one or more declarative requirements indicate a desired configuration of a plurality of network elements of the network;
- determine one or more network elements from the plurality of network elements for telemetry monitoring based on the model representation of faults for the network and the one or more declarative requirements;
- determine a symptom representation for the network based on telemetry data for the one or more network elements of the network; and
- provide the model representation of faults for the network and the symptom representation to a root cause analysis engine to determine one or more root causes of one or more detected symptoms of the network.

* * * * *